(12) United States Patent
Ozeki et al.

(10) Patent No.: US 8,704,868 B2
(45) Date of Patent: Apr. 22, 2014

(54) VIDEO CONFERENCING SYSTEM, VIDEO CONFERENCING APPARATUS, VIDEO CONFERENCING CONTROL METHOD, AND VIDEO CONFERENCING CONTROL PROGRAM

(75) Inventors: Hidekatsu Ozeki, Gifu (JP); Shinya Kadono, Hyogo (JP)

(73) Assignee: Panasonic Corporation, Osaka (JP)

( * ) Notice: Subject to any disclaimer, the term of this patent is extended or adjusted under 35 U.S.C. 154(b) by 412 days.

(21) Appl. No.: 13/125,681

(22) PCT Filed: Aug. 11, 2010

(86) PCT No.: PCT/JP2010/005033
§ 371 (c)(1),
(2), (4) Date: Apr. 22, 2011

(87) PCT Pub. No.: WO2011/024401
PCT Pub. Date: Mar. 3, 2011

(65) Prior Publication Data
US 2011/0205328 A1    Aug. 25, 2011

(30) Foreign Application Priority Data

Aug. 24, 2009  (JP) ................................ 2009-193698

(51) Int. Cl.
*H04N 7/14* (2006.01)

(52) U.S. Cl.
USPC .................. 348/14.08; 348/14.01; 348/14.07; 348/14.1; 348/14.11

(58) Field of Classification Search
USPC .......... 348/14.01, 14.02, 14.03, 14.04, 14.05, 348/14.06, 14, 7, 14.08, 14.09, 14.1, 14.11, 348/14.12, 14.13, 14.14, 15.15, 14.16
See application file for complete search history.

(56) References Cited

U.S. PATENT DOCUMENTS

| | | | | |
|---|---|---|---|---|
| 5,786,846 A | * | 7/1998 | Hiroaki | 348/14.16 |
| 5,835,788 A | * | 11/1998 | Blumer et al. | 710/23 |
| 6,073,192 A | * | 6/2000 | Clapp et al. | 710/65 |

(Continued)

FOREIGN PATENT DOCUMENTS

| JP | 2002-335502 | 11/2002 |
|---|---|---|
| JP | 2003-244193 | 8/2003 |

(Continued)

OTHER PUBLICATIONS

International Search Report issued Sep. 14, 2010 in corresponding International Application No. PCT/JP2010/005033.

*Primary Examiner* — Khai N Nguyen
(74) *Attorney, Agent, or Firm* — Wenderoth, Lind & Ponack, L.L.P.

(57) ABSTRACT

To provide a video conferencing system that a user can continue to use even when the user leaves for a different location. The video conferencing system includes: a takeover information generation unit which generates takeover information including configuration information on a screen layout used in a video conference held between a first video conferencing apparatus and a second video conferencing apparatus; a sending unit which sends the takeover information; a receiving unit which receives the takeover information; and a takeover setting unit which sets a screen layout of the third video conferencing apparatus using the takeover information received by the receiving unit, so that the third video conferencing apparatus takes over the screen layout and has the video conference with the second video conferencing apparatus after participation of the third video conferencing apparatus in the video conference is approved.

18 Claims, 61 Drawing Sheets

(56) References Cited

U.S. PATENT DOCUMENTS

| | | | |
|---|---|---|---|
| 6,519,662 B2* | 2/2003 | Clapp et al. | 710/60 |
| 8,125,571 B2* | 2/2012 | Guermoud et al. | 348/719 |
| 8,161,179 B2* | 4/2012 | Dote et al. | 709/232 |
| 2002/0018124 A1* | 2/2002 | Mottur et al. | 348/211 |
| 2002/0126201 A1* | 9/2002 | Schmitt et al. | 348/14.09 |
| 2003/0001878 A1* | 1/2003 | Matsumoto | 345/716 |
| 2005/0157164 A1* | 7/2005 | Eshkoli et al. | 348/14.07 |
| 2005/0195273 A1* | 9/2005 | Yamamoto | 348/14.02 |
| 2006/0092268 A1* | 5/2006 | Ahn et al. | 348/14.08 |
| 2006/0192846 A1* | 8/2006 | Gruber | 348/14.01 |
| 2007/0097964 A1* | 5/2007 | Kashimoto | 370/352 |
| 2008/0273077 A1* | 11/2008 | Cowherd | 348/14.06 |
| 2009/0231413 A1* | 9/2009 | Dunko | 348/14.08 |
| 2010/0002069 A1* | 1/2010 | Eleftheriadis et al. | 348/14.08 |

FOREIGN PATENT DOCUMENTS

| | | |
|---|---|---|
| JP | 2005-260348 | 9/2005 |
| JP | 2005-295385 | 10/2005 |
| JP | 2007-318556 | 12/2007 |
| JP | 2008-211549 | 9/2008 |
| JP | 2009-81593 | 4/2009 |

* cited by examiner

FIG. 20

| |
|---|
| Transfer information (transfer is necessary or unnecessary) |
| if (transfer information == transfer is necessary){ |
|    Address of transfer destination |
| } |
| Number of connected sites |
| Screen layout |
| IP address (site B) |
| Resolution (site B) |
| Bit rate (site B) |
| Frame rate (site B) |
| IP address (site C) |
| Resolution (site C) |
| Bit rate (site C) |
| Frame rate (site C) |
| IP address (site D) |
| Resolution (site D) |
| Bit rate (site D) |
| Frame rate (site D) |
| Connection time length |
| Shared information (none, memory card, or file) |
| Playback time length |

FIG. 21

| |
|---|
| Transfer information (transfer is necessary) |
| Address of transfer destination (site E) |
| Number of connected sites |
| Screen layout |
| IP address (site B) |
| Resolution (site B) |
| Bit rate (site B) |
| Frame rate (site B) |
| IP address (site C) |
| Resolution (site C) |
| Bit rate (site C) |
| Frame rate (site C) |
| IP address (site D) |
| Resolution (site D) |
| Bit rate (site D) |
| Frame rate (siteD) |
| Connection time length |
| Shared information (none, memory card, or file) |
| Playback time length |

FIG. 22

| Transfer information (transfer is unnecessary) |
|---|
| Number of connected sites |
| Screen layout |
| IP address (site B) |
| Resolution (site B) |
| Bit rate (site B) |
| Frame rate (site B) |
| IP address (site C) |
| Resolution (site C) |
| Bit rate (site C) |
| Frame rate (site C) |
| IP address (site D) |
| Resolution (site D) |
| Bit rate (site D) |
| Frame rate (site D) |
| Connection time length |
| Shared information (none, memory card, or file) |
| Playback time length |

FIG. 23

| |
|---|
| Server information type (connected-site change / server change) |
| if (server information type == connected-site change){ |
| Address of taken-over site |
| Address of taking-over site |
| Validity period for takeover |
| }else if (server information type == server change){ |
| connected-site change classification (change in connected sites / no change in connected sites) |
| if (connected-site change classification == change in connected sites){ |
| Address of taken-over site |
| Address of taking-over site |
| Validity period for takeover |
| } |
| Address of connected site |
| Address of connected site |
| Address of connected site |
| } |

FIG. 24

| Server information type (connected-site change) |
|---|
| IP address (site A) |
| IP address (site E) |
| 5 minutes |

FIG. 25

| Server information type (server change) |
|---|
| connected-site change classification (change in connected sites) |
| IP address (site A) |
| IP address (site E) |
| 5 minutes |
| IP address (site B) |
| IP address (site C) |
| IP address (site D) |

FIG. 60

| Transfer information (transfer is unnecessary) |
|---|
| Number of connected sites |
| Screen layout |
| IP address (site B) |
| Resolution (site B) |
| Bit rate (site B) |
| Frame rate (site B) |

VIDEO CONFERENCING SYSTEM, VIDEO CONFERENCING APPARATUS, VIDEO CONFERENCING CONTROL METHOD, AND VIDEO CONFERENCING CONTROL PROGRAM

TECHNICAL FIELD

The present invention relates to a video conferencing system, a video conferencing apparatus, and a control method thereof which implement interactive video conferencing communication.

BACKGROUND ART

A video conferencing system has been proposed such that a call from the video conferencing system is received using a mobile terminal device so that audio communication is established based on the received call, for a case where a user of the video conferencing system needs to leave the location of a video conference.

The technology disclosed in Patent Literature 1, for example, is known as such a conventional technology.

CITATION LIST

Patent Literature

[PTL 1]
Japanese Unexamined Patent Application Publication No. 2002-335502

SUMMARY OF INVENTION

Technical Problem

With the video conferencing system using the interactive video communication technology, however, when the user of the video conferencing system leaves the location, it is not easy to continue the video conferencing communication in such a way as to see images of the other end. For example, suppose a method whereby, when the user leaves the video conference temporarily, the user participates again in the video conference using a video conferencing apparatus placed in a different location. When using this method, connection needs to be newly established. Also, with this method, information regarding the conference having proceeded thus far and configuration information including an image output method and a connection condition cannot be taken over.

Moreover, in the case of a video conference in which only particular participants are allowed to take part, user authentication may be performed when the user participates in the video conference. Here, when a room of the video conference is changed, this means that an IP (Internet Protocol) address changes. Thus, when the user newly establishes connection, the other users cannot know whether this user participates in the video conference by mistake or not. In other words, when the user newly establishes the connection using a different video conferencing apparatus, it cannot be determined whether this new connection is established by the same user who was in the video conference previously or by another user. On account of this, the use of the video conferencing system cannot be continued.

The present invention is conceived in view of the stated problem, and has an object to provide a video conferencing system capable of being continuously used even when a user of the video conferencing system leaves for a different location.

Solution to Problem

In order to achieve the aforementioned object, the video conferencing system in an aspect of the present invention is a video conferencing system including a first video conferencing apparatus, a second video conferencing apparatus, and a third video conferencing apparatus, wherein the first video conferencing apparatus includes: a takeover information generation unit which generates takeover information that includes configuration information on a screen layout used in a video conference held between the first video conferencing apparatus and the second video conferencing apparatus; and a sending unit which sends the takeover information generated by the takeover information generation unit of the first video conferencing apparatus, and the third video conferencing apparatus includes: a receiving unit which receives the takeover information; and a takeover setting unit which sets a screen layout of the third video conferencing apparatus using the takeover information received by the receiving unit of the third video conferencing apparatus, so that the third video conferencing apparatus takes over the screen layout used in the video conference and has the video conference with the second video conferencing apparatus after participation of the third video conferencing apparatus in the video conference is approved.

With this, even when the user of the video conferencing system leaves for a different location, the video conferencing system can be continuously used.

Also, the takeover information generation unit of the first video conferencing apparatus may generate the takeover information which includes information identifying the second video conferencing apparatus, and the takeover setting unit of the third video conferencing apparatus may further set a connection destination of the third video conferencing apparatus using the takeover information, so that the third video conferencing apparatus has the video conference with the second video conferencing apparatus identified based on the takeover information.

With this, the video conferencing apparatus at the taking-over site can establish connection with the video conferencing apparatus to which the video conferencing apparatus at the taken-over site has been connected, using the takeover information.

Moreover, when a physical screen characteristic of the third video conferencing apparatus is a same as that of the first video conferencing apparatus, the takeover setting unit of the third video conferencing apparatus may set the screen layout of the third video conferencing apparatus using the takeover information.

With this, the video conferencing apparatus at the taking-over site can successfully take over the screen layout.

Furthermore, the second video conferencing apparatus may further include: a receiving unit which receives the takeover information; a takeover information storage unit which stores the takeover information received by the receiving unit of the second video conferencing apparatus; and a sending unit which sends the takeover information stored in the takeover information storage unit of the second video conferencing apparatus, the sending unit of the first video conferencing apparatus may send the takeover information to the second video conferencing apparatus when the third video conferencing apparatus is incapable of receiving the takeover information, and the sending unit of the second video conferencing apparatus may send the takeover information to the third video conferencing apparatus after the third video conferencing apparatus becomes capable of receiving the takeover information.

With this, even when the power of the taking-over site is off, the takeover processing is performed after the power is turned on.

Also, when a length of time from when the receiving unit of the second video conferencing apparatus receives the takeover information to when the third video conferencing apparatus becomes capable of receiving the takeover information is within a predetermined time limit, the sending unit of the second video conferencing apparatus may send the takeover information to the third video conferencing apparatus, and when the length of time from when the receiving unit of the second video conferencing apparatus receives the takeover information to when the third video conferencing apparatus becomes capable of receiving the takeover information exceeds the predetermined time limit, the takeover information storage unit of the second video conferencing apparatus may erase the takeover information.

With this, security can be ensured.

Moreover, the sending unit of the first video conferencing apparatus may send, to the second video conferencing apparatus, a connected-site change notice indicating a takeover from the first video conferencing apparatus to the third video conferencing apparatus, the third video conferencing apparatus may further include a sending unit which sends a connection request to the second video conferencing apparatus after the receiving unit of the third video conferencing apparatus receives the takeover information, and the second video conferencing apparatus may further include: a receiving unit which receives the connected-site change notice and the connection request; and a server unit which approves the participation of the third video conferencing apparatus when the third video conferencing apparatus indicated as a taking-over apparatus in the connected-site change notice sent from the first video conferencing apparatus agrees with the third video conferencing apparatus from which the connection request is received.

With this, whether it is an approved taking-over site or not can be verified.

Furthermore, the server unit of the second video conferencing apparatus may approve the participation of the third video conferencing apparatus when: the third video conferencing apparatus indicated as the taking-over apparatus in the connected-site change notice sent from the first video conferencing apparatus agrees with the third video conferencing apparatus from which the connection request is received; and a length of time from when the connected-site change notice is received to when the connection request is received is within a predetermined time limit.

With this, an unauthorized access is restricted.

Also, the first video conferencing apparatus may further include a server unit which operates as a server that authenticates participation in the video conference, the sending unit of the first video conferencing apparatus may send, to the second video conferencing apparatus, information instructing the second video conferencing apparatus to operate as the server, the server unit of the first video conferencing apparatus may stop operating as the server, and the second video conferencing apparatus may further include: a receiving unit which receives the information instructing the second video conferencing apparatus to operate as the server; and a server unit which starts operating as the server when the receiving unit of the second video conferencing apparatus receives the information instructing the second video conferencing apparatus to operate as the server.

With this, even when the taken-over site operates as the server of the video conferencing system, the takeover can be executed.

Moreover, the second video conferencing apparatus may further include: an image output unit which displays an image captured by the third video conferencing apparatus; an authentication information input unit which receives information for authenticating the participation of the third video conferencing apparatus in the video conference, after the image captured by the third video conferencing apparatus is displayed; and a sending unit which sends an image captured by the second video conferencing apparatus to the third video conferencing apparatus, after the information for authenticating the participation of the third video conferencing apparatus in the video conference is received by the authentication information input unit of the second video conferencing apparatus.

With this, the authentication can be performed using the screen. That is, the authentication can be performed more reliably, thereby ensuring the security.

Furthermore, the video conferencing system may further include a fourth video conferencing apparatus, wherein the fourth video conferencing apparatus includes a sending unit which sends an image captured by the fourth video conferencing apparatus to the third video conferencing apparatus, after the second video conferencing apparatus approves the participation of the third video conferencing apparatus.

This allows collective authentication to be performed.

Also, the video conferencing system may further include a fourth video conferencing apparatus, wherein the fourth video conferencing apparatus includes: an image output unit which displays an image captured by the third video conferencing apparatus; an authentication information input unit which receives information for authenticating the participation of the third video conferencing apparatus in the video conference, after the image captured by the third video conferencing apparatus is displayed; and a sending unit which sends an image captured by the fourth video conferencing apparatus to the third video conferencing apparatus, after the information for authenticating the participation of the third video conferencing apparatus in the video conference is received by the authentication information input unit of the fourth video conferencing apparatus.

This allows each of the video conferencing apparatuses to perform more flexible authentication.

Moreover, the video conferencing apparatus in another aspect of the present invention may be a video conferencing apparatus used as a first video conferencing apparatus in a video conferencing system which includes the first video conferencing apparatus and a second video conferencing apparatus, the first video conferencing apparatus including: a takeover information generation unit which generates takeover information that includes configuration information on a screen layout used in a video conference held between the first video conferencing apparatus and the second video conferencing apparatus; and a sending unit which sends the takeover information generated by the takeover information generation unit of the first video conferencing apparatus.

With this, information for continuing to use the video conferencing system is outputted.

The video conferencing apparatus in another aspect of the present invention may be a video conferencing apparatus used as a third video conferencing apparatus in a video conferencing system which includes a first video conferencing apparatus, a second video conferencing apparatus, and the third video conferencing apparatus, the third video conferencing apparatus including: a receiving unit which receives takeover information that includes configuration information on a screen layout used in a video conference held between the first video conferencing apparatus and the second video conferencing apparatus; and a takeover setting unit which sets a screen layout of the third video conferencing apparatus using the takeover information received by the receiving unit of the third video conferencing apparatus, so that the third video conferencing apparatus takes over the screen layout used in the video conference and has the video conference with the second video conferencing apparatus after participation of the third video conferencing apparatus in the video conference is approved.

With this, the video conferencing apparatus is configured so that the video conferencing system can be continuously used.

The video conferencing control method in another aspect of the present invention may be a video conferencing control method used by a video conferencing system which includes a first video conferencing apparatus, a second video conferencing apparatus, and a third video conferencing apparatus, the video conferencing control method including: generating, by the first video conferencing apparatus, takeover information which includes configuration information on a screen layout used in a video conference held between the first video conferencing apparatus and the second video conferencing apparatus; sending, by the first video conferencing apparatus, the takeover information generated in the generating; receiving, by the third video conferencing apparatus, the takeover information; and setting, by the third video conferencing apparatus, a screen layout of the third video conferencing apparatus using the takeover information received in the receiving, so that the third video conferencing apparatus takes over the screen layout used in the video conference and has the video conference with the second video conferencing apparatus after participation of the third video conferencing apparatus in the video conference is approved.

With this, even when the user of the video conferencing system leaves for a different location, the video conferencing system can be continuously used.

The video conferencing control method in another aspect of the present invention may be a video conferencing control method used by a video conferencing system which includes a first video conferencing apparatus and a second video conferencing apparatus, the video conferencing control method including: generating, by the first video conferencing apparatus, takeover information which includes configuration information on a screen layout used in a video conference held between the first video conferencing apparatus and the second video conferencing apparatus; and sending, by the first video conferencing apparatus, the takeover information generated in the generating.

With this, information for continuing to use the video conferencing system is outputted.

The video conferencing control method in another aspect of the present invention may be a video conferencing control method used by a video conferencing system which includes a first video conferencing apparatus, a second video conferencing apparatus, and a third video conferencing apparatus, the video conferencing control method including: receiving, by the third video conferencing apparatus, takeover information which includes configuration information on a screen layout used in a video conference held between the first video conferencing apparatus and the second video conferencing apparatus; and setting, by the third video conferencing apparatus, a screen layout of the third video conferencing apparatus using the takeover information received in the receiving, so that the third video conferencing apparatus takes over the screen layout used in the video conference and has the video conference with the second video conferencing apparatus after participation of the third video conferencing apparatus in the video conference is approved.

With this, the video conferencing apparatus is configured so that the video conferencing system can be continuously used.

It should be noted that the program in another aspect of the present invention may be a program causing a computer to execute the steps included in the video conferencing control method.

Accordingly, the video conferencing control method is implemented as a program.

Advantageous Effects of Invention

According to the present invention, even when the user of the video conferencing system leaves for a different location, the video conferencing system can be continuously used.

BRIEF DESCRIPTION OF DRAWINGS

FIG. 1 is a schematic diagram showing a video conferencing system in a first embodiment.
FIG. 2 is a conceptual diagram showing takeover processing performed in the first embodiment.
FIG. 3 is a diagram showing a configuration of a video conferencing apparatus at a site A in the first embodiment.
FIG. 4 is a diagram showing a configuration of a video conferencing apparatus at a site B in the first embodiment.
FIG. 5 is a diagram showing a configuration of a video conferencing apparatus at a site E in the first embodiment.
FIG. 6 is a diagram showing a configuration of a video conferencing apparatus at each of sites C and D in the first embodiment.
FIG. 7 is a sequence diagram showing takeover processing performed in the first embodiment.
FIG. 8 is a sequence diagram showing takeover processing performed in the first embodiment.
FIG. 9 is a sequence diagram showing takeover processing performed in the first embodiment.
FIG. 10 is a sequence diagram showing takeover processing performed in the first embodiment.
FIG. 11 is a sequence diagram showing takeover processing performed in the first embodiment.
FIG. 12 is a flowchart showing processing performed at the site A in the first embodiment.
FIG. 13 is a flowchart showing processing performed at the site A in the first embodiment.

FIG. 14 is a flowchart showing processing performed at the site B in the first embodiment.
FIG. 15 is a flowchart showing processing performed at the site B in the first embodiment.
FIG. 16 is a flowchart showing processing performed at each of the sites C and D in the first embodiment.
FIG. 17 is a flowchart showing processing performed at the site E in the first embodiment.
FIG. 18 is a diagram showing a data structure of an RTP packet in the first embodiment.
FIG. 19 is a diagram showing a data structure of an IP packet in the first embodiment.
[FIG. 20]
FIG. 20 is a diagram showing a data structure of takeover information in the first embodiment.
[FIG. 21]
FIG. 21 is a diagram showing a data structure of takeover information in the first embodiment.
[FIG. 22]
FIG. 22 is a diagram showing a data structure of takeover information in the first embodiment.
[FIG. 23]
FIG. 23 is a diagram showing a data structure of server information in the first embodiment.
[FIG. 24]
FIG. 24 is a diagram showing a data structure of server information in the first embodiment.
[FIG. 25]
FIG. 25 is a diagram showing a data structure of server information in the first embodiment.
FIG. 26 is a diagram showing a takeover selection screen at the site A in the first embodiment.
FIG. 27 is a diagram showing a display screen at the site B during the takeover processing in the first embodiment.
FIG. 28 is a diagram showing a display screen at the site B after the takeover is completed, in the first embodiment.
FIG. 29 is a diagram showing transitions of the display screen in the first embodiment.
FIG. 30 is a sequence diagram showing takeover processing performed in a modification of the first embodiment.
FIG. 31 is a sequence diagram showing the takeover processing performed in the modification of the first embodiment.
FIG. 32 is a diagram showing transitions of the display screen in the modification of the first embodiment.
FIG. 33 is a schematic diagram showing a video conferencing system in a second embodiment.
FIG. 34 is a diagram showing a display screen at a site A before the takeover is executed, in the second embodiment.

FIG. 35 is a diagram showing a configuration of a video conferencing apparatus at the site A in the second embodiment.
FIG. 36 is a diagram showing a configuration of a video conferencing apparatus at each of sites B, C, and D in the second embodiment.
FIG. 37 is a diagram showing a configuration of a video conferencing apparatus at a site E in the second embodiment.
FIG. 38 is a sequence diagram showing takeover processing performed in the second embodiment.
FIG. 39 is a flowchart showing processing performed at the site A in the second embodiment.
FIG. 40 is a flowchart showing processing performed at the site A in the second embodiment.
FIG. 41 is a flowchart showing processing performed at each of the sites B, C, and D in the second embodiment.
FIG. 42 is a flowchart showing processing performed at the site E in the second embodiment.
FIG. 43 is a diagram showing a display screen at the site E immediately after the takeover is completed, in the second embodiment.
FIG. 44 is a schematic diagram showing a video conferencing system in a third embodiment.
FIG. 45 is a diagram showing a configuration of a video conferencing apparatus at a site A in the third embodiment.
FIG. 46 is a diagram showing a configuration of a video conferencing apparatus at a site B in the third embodiment.
FIG. 47 is a diagram showing a configuration of a video conferencing apparatus at a site E in the third embodiment.
FIG. 48 is a sequence diagram showing takeover processing performed in the third embodiment.
FIG. 49 is a flowchart showing processing performed at the site A in the third embodiment.
FIG. 50 is a flowchart showing processing performed at the site B in the third embodiment.
FIG. 51 is a flowchart showing processing performed at the site E in the third embodiment.
FIG. 52 is a schematic diagram showing a video conferencing system in a fourth embodiment.
FIG. 53 is a diagram showing a configuration of a video conferencing apparatus at a site A in the fourth embodiment.
FIG. 54 is a diagram showing a configuration of a video conferencing apparatus at a site B in the fourth embodiment.
FIG. 55 is a diagram showing a configuration of a video conferencing apparatus at a site E in the fourth embodiment.

FIG. 56 is a sequence diagram showing takeover processing performed in the fourth embodiment.
FIG. 57 is a flowchart showing processing performed at the site A in the fourth embodiment.
FIG. 58 is a flowchart showing processing performed at the site B in the fourth embodiment.
FIG. 59 is a flowchart showing processing performed at the site E in the fourth embodiment.
[FIG. 60]
FIG. 60 is a diagram showing a data structure of takeover information in the fourth embodiment.
FIG. 61 is a diagram showing a configuration of a video conferencing system in a fifth embodiment.
FIG. 62 is a flowchart showing processing performed by the video conferencing system in the fifth embodiment.

DESCRIPTION OF EMBODIMENTS (First Embodiment)
The following is a description of the first embodiment according to the present invention, with reference to the drawings.

In a video conferencing system of the first embodiment, a site E takes over settings made for a video conference at a site A, and thus continues the video conference.

Figure 1:
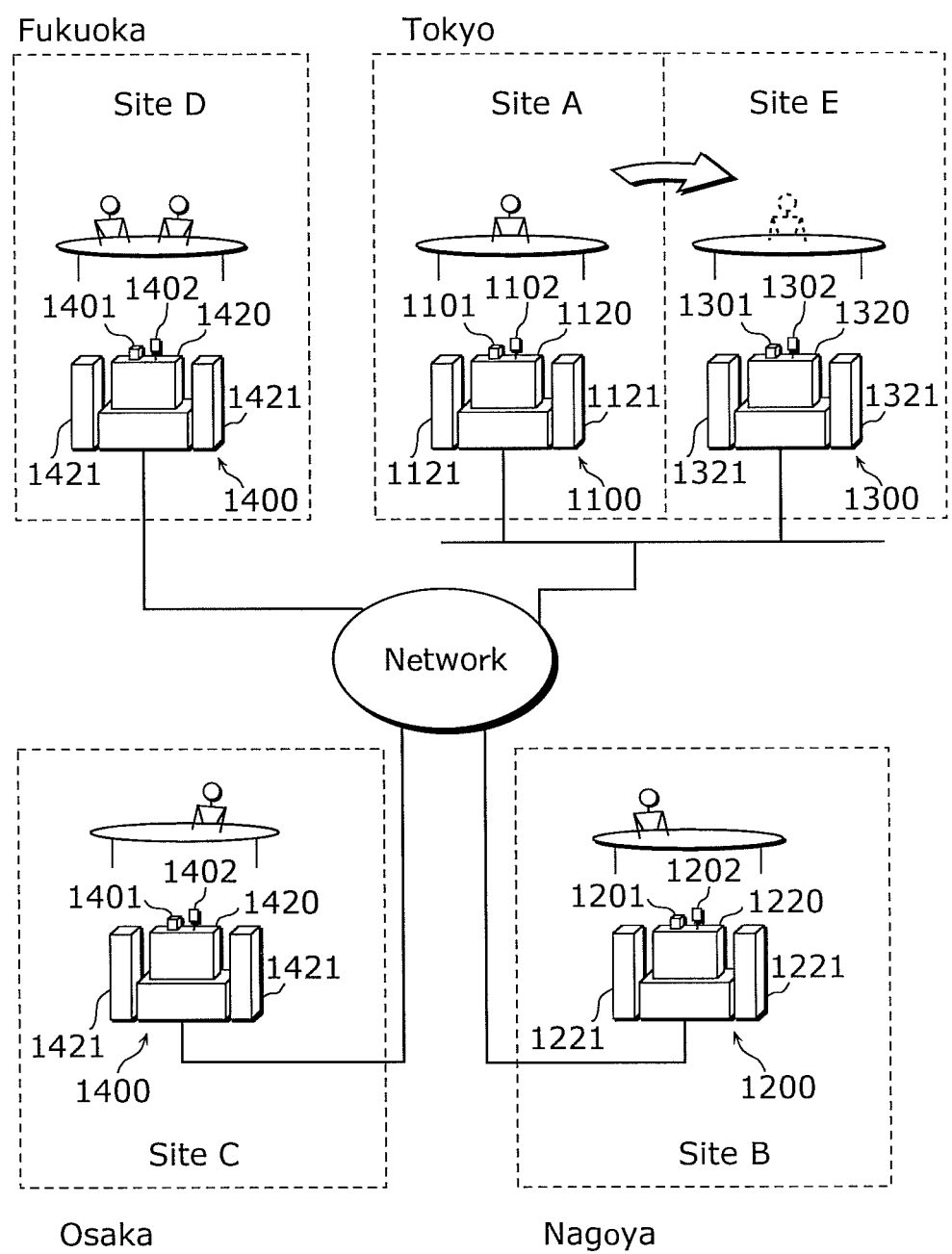
[FIG. 1]

FIG. 1 is a schematic diagram showing the video conferencing system in the first embodiment. FIG. 1 shows an example where a video conference is held among sites A, B, C, and D which represent locations in Tokyo, Nagoya, Osaka, and Fukuoka, respectively. As shown in FIG. 1, the first embodiment assumes that a user who participates in the video conference at the site A leaves for the site E and then continues to participate in this video conference at the site E.

A video conferencing apparatus 1100 is placed in the site A. A video conferencing apparatus 1200 is placed in the site B. A video conferencing apparatus 1400 is placed in each of the sites C and D. A video conferencing apparatus 1300 is placed in the site E. These video conferencing apparatuses are interconnected via a network.

The video conferencing apparatus 1100 includes an image input unit 1101, an audio input unit 1102, an image output unit 1120, and an audio output unit 1121. The video conferencing apparatus 1200 includes an image input unit 1201, an audio input unit 1202, an image output unit 1220, and an audio output unit 1221. The video conferencing apparatus 1400 includes an image input unit 1401, an audio input unit 1402, an image output unit 1420, and an audio output unit 1421. The video conferencing apparatus 1300 includes an image input unit 1301, an audio input unit 1302, an image output unit 1320, and an audio output unit 1321.

When the user who participates in the video conference at the site A leaves for the site E, the video conferencing apparatus 1300 placed in the site E takes over the settings of the video conferencing apparatus 1100 placed in the site A. As a result, the user can continue to participate in the video conference at the site E.

It should be noted that, in the following description, when operations performed by the video conferencing apparatuses placed in the sites A, B, C, D, and E are described, these operations may be mentioned as those performed by the sites A, B, C, D, and E, for the sake of simplicity. Also note that moving image data used by the video conferencing system includes audio data.

Figure 2:
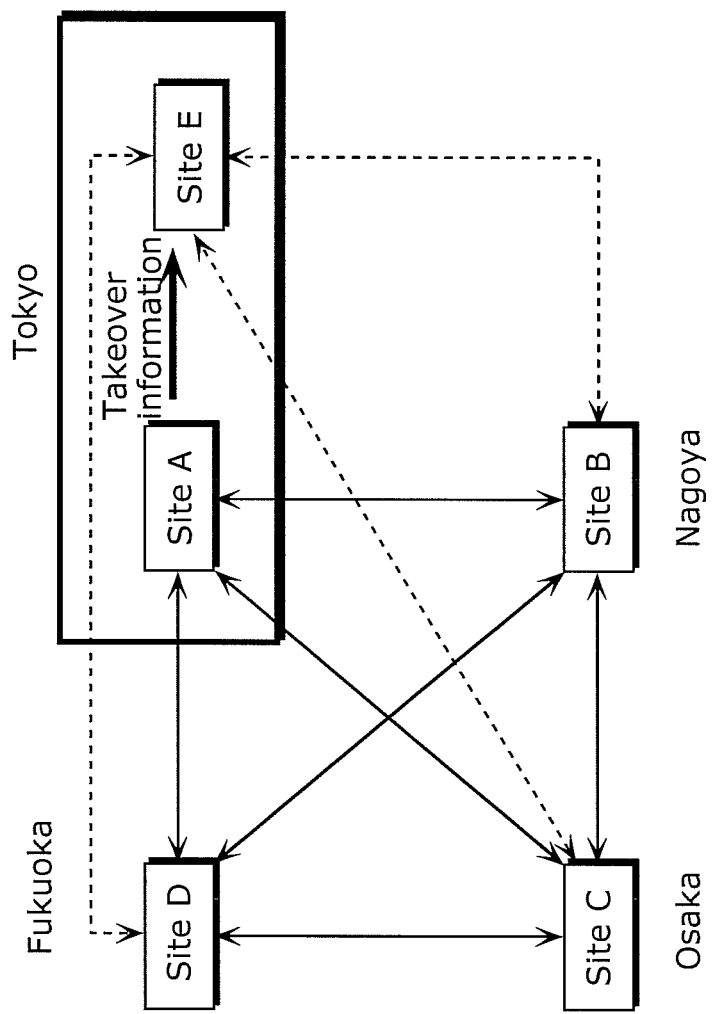
[FIG. 2]

FIG. 2 is a conceptual diagram showing takeover processing performed in the first embodiment shown in FIG. 1. At first, video conferencing communication is established among the sites A, B, C, and D. Then, the video conferencing system in the first embodiment transfers takeover information which is configuration information for establishing the video conferencing communication, from the site A to the site E. As a result, the video conferencing communication is established among the sites E, B, C, and D.

Figure 3:
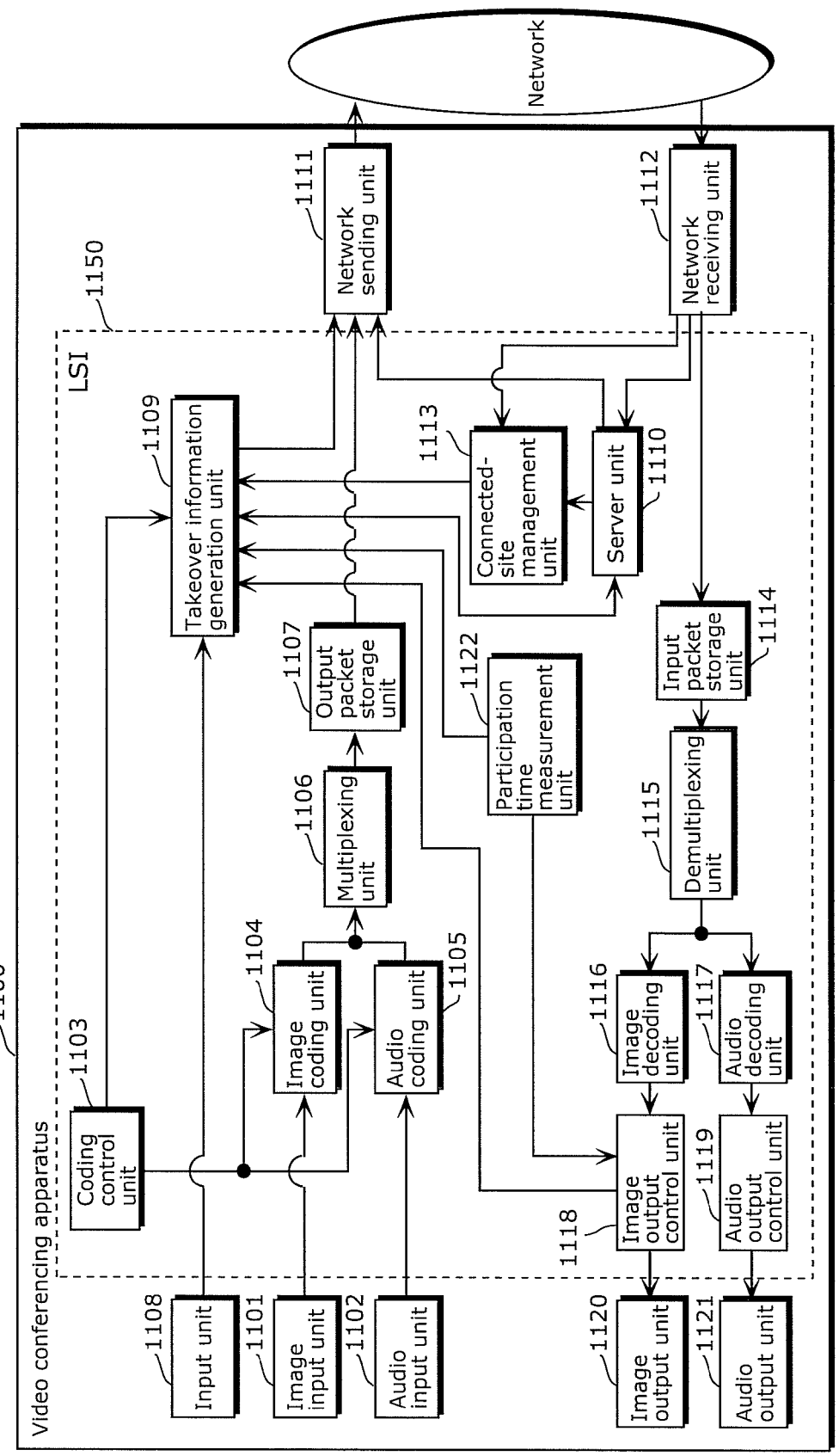
[FIG. 3]

FIG. 3 is a diagram showing a configuration of the video conferencing apparatus at the site A in the first embodiment shown in FIG. 1.

The video conferencing apparatus 1100 shown in FIG. 3 includes the image input unit 1101, the audio input unit 1102, a coding control unit 1103, an image coding unit 1104, an audio coding unit 1105, a multiplexing unit 1106, an output packet storage unit 1107, an input unit 1108, a takeover information generation unit 1109, a server unit 1110, a network sending unit 1111, a network receiving unit 1112, a connected-site management unit 1113, an input packet storage unit 1114, a demultiplexing unit 1115, an image decoding unit 1116, an audio decoding unit 1117, an image output control unit 1118, an audio output control unit 1119, the image output unit 1120, the audio output unit 1121, and a participation time measurement unit 1122.

Note that the coding control unit 1103, the image coding unit 1104, the audio coding unit 1105, the multiplexing unit 1106, the output packet storage unit 1107, the takeover information generation unit 1109, the server unit 1110, the connected-site management unit 1113, the input packet storage unit 1114, the demultiplexing unit 1115, the image decoding unit 1116, the audio decoding unit 1117, the image output control unit 1118, the audio output control unit 1119, and the participation time measurement unit 1122 may be implemented as an LSI (Large Scale Integration) 1150.

The image input unit 1101 converts an image captured by a camera into an input video signal.

The image coding unit 1104 performs coding on, for example, the input video signal obtained by the image input unit 1101, according to MPEG (Moving Picture Experts Group)-4 AVC (Advanced Video Coding)/H.264 on the basis of a coding condition set by the coding control unit 1103. Then, the image coding unit 1104 outputs a coded video stream.

The audio input unit 1102 converts audio received by a microphone into an input audio signal.

The audio coding unit 1105 performs coding on, for example, the input audio signal obtained by the audio input unit 1102, according to MPEG-4 AAC (Advanced Audio Coding)-LD (Low Delay) on the basis of a coding condition set by the coding control unit 1103. Then, the audio coding unit 1105 outputs a coded audio stream.

Figure 18:
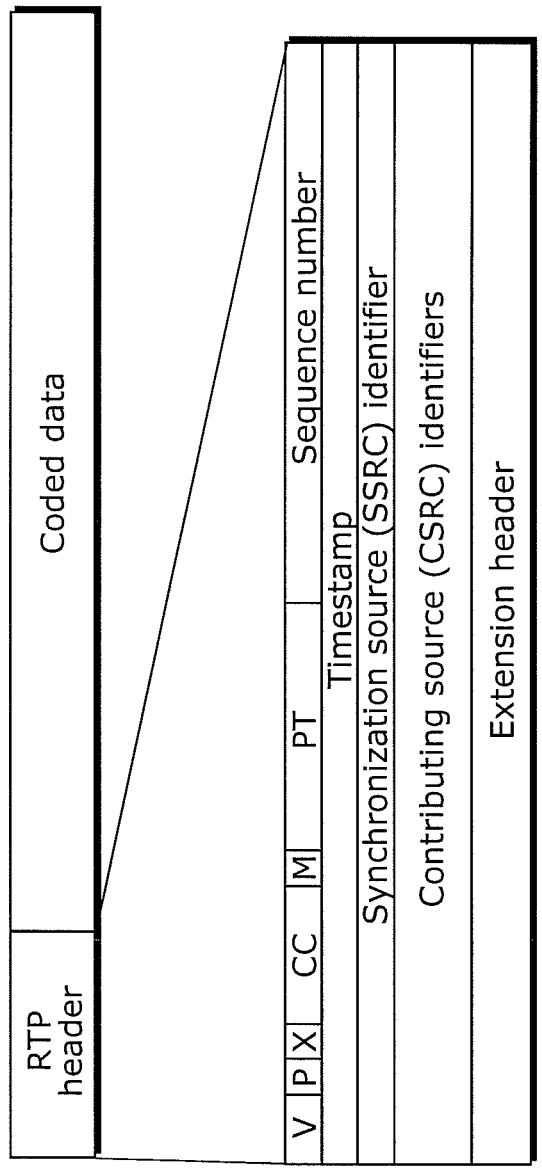
[FIG. 18]

The multiplexing unit 1106 packetizes the coded video stream obtained by the image coding unit 1104 and the coded audio stream obtained by the audio coding unit 1105 into an RTP (Real-time Transport Protocol) packet, and outputs this RTP packet. Here, the RTP packet may have a data structure as shown in FIG. 18, for example.

The output packet storage unit 1107 stores the RTP packet obtained by the multiplexing unit 1106.

The input unit 1108 is a remote control, a keyboard, or the like to receive inputs regarding a connection destination, a taking-over site, and a takeover request.

In response to the takeover request received by the input unit 1108, the takeover information generation unit 1109 generates the takeover information for the site E on the basis of: an IP address of a site managed by the connected-site management unit 1113; a resolution, a bit rate, and a frame rate set by the coding control unit 1103; and a connection time length measured by the participation time measurement unit 1122. Here, the takeover information may have a data structure as shown in FIG. 20, for example.

When the server function is being activated, that is, when the video conferencing apparatus 1100 is operating as a server of the video conferencing system, the takeover information generation unit 1109 generates server information indicating a server change, in order for another site to take over the server function. Moreover, when the server function is not being activated, that is, when the video conferencing apparatus 1100 is not operating as the server of the video conferencing system, the takeover information generation unit 1109 generates server information indicating a connected-site change, in order to notify the video conferencing apparatus operating as the server about the connected-site change.

The server unit 1110 operates as the server of the video conferencing system. For example, in response to access from another site, the server unit 1110 authenticates participation of this site in the video conference. Moreover, the server unit 1110 manages server information including IP addresses of the sites which are allowed to participate in the video conference, the number of the currently-connected sites, and the IP addresses of the currently-connected sites.

Furthermore, the server unit 1110 updates the server information, based on the server information that indicates the connected-site change and is received by the network receiving unit 1112. In this case, the server unit 1110 outputs the information regarding the connected-site change to the connected-site management unit 1113, and also sends a connected-site change notice to the other sites via the network sending unit 1111.

It should be noted that the server unit 1110 operates when the server function is being activated, that is, when the video conferencing apparatus 1100 is operating as the server of the video conferencing system. On the other hand, the server unit 1110 does not operate when the server function is not being activated, that is, when the video conferencing apparatus 1100 is not operating as the server of the video conferencing system.

Here, the server function is switchable between "ON" and "OFF". For example, when the server information indicating the serve change is received from the network receiving unit 1112 while the server function is OFF, the server function is activated and thus the server unit 1110 starts operating.

The network sending unit 1111 sends, to the network, the connected-site change notice generated by the server unit 1110 and the takeover information and server information generated by the takeover information generation unit 1109. Also, the network sending unit 1111 encapsulates the RTP packet stored in the output packet storage unit 1107 into an IP packet, and then sends the IP packet to the sites managed by the connected-site management unit 1113 via the network.

The network receiving unit 1112 receives data from another site via the network. When the received data is video or audio data, the network receiving unit 1112 extracts a UDP (User Datagram Protocol) packet from the IP packet and further extracts the RTP packet. Then, the network receiving unit 1112 sends the extracted RTP packet to the input packet storage unit 1114. When receiving the server information indicating the connected-site change from the sites B, C, and D, the network receiving unit 1112 sends the received server information to the server unit 1110. Moreover, when receiving the connected-site change notice from another video conferencing apparatus serving as the server, the network receiving unit 1112 sends the notice to the connected-site management unit 1113.

The connected-site management unit 1113 manages information on the connected sites among which the video conferencing communication is established. On the basis of the information on the managed connected-sites, the connected-site management unit 1113 controls a destination to be connected in the video conferencing communication. Also, when receiving the information on the connected-site change from the server unit 1110 or the network receiving unit 1112, the connected-site management unit 1113 changes the information on the connected sites.

The input packet storage unit 1114 stores the RTP packet received by the network receiving unit 1112.

The demultiplexing unit 1115 reads the RTP packet from the input packet storage unit 1114, and then analyzes an RTP header included in the RTP packet. When a payload type (PT) representing a type of the coded data indicates video, the demultiplexing unit 1115 extracts a coded video stream from an RTP payload which is the coded data, and then outputs the coded video stream to the image decoding unit 1116. On the other hand, when the payload type (PT) indicates audio, the demultiplexing unit 1115 extracts a coded audio stream from the RTP payload, and then outputs the coded audio stream to the audio decoding unit 1117.

The image decoding unit 1116 decodes the coded video stream extracted by the demultiplexing unit 1115, and outputs the decoded video data to the image output control unit 1118.

The image output control unit 1118 performs control so as to cause the image output unit 1120 to display the decoded video data at a timing based on a timestamp written in the RTP header. Also, the image output control unit 1118 performs control so as to cause the image output unit 1120 to display the decoded video data in a preset screen layout. Moreover, the image output control unit 1118 performs control so as to cause the image output unit 1120 to display, as necessary, a time length of participation in the video conference that is measured by the participation time measurement unit 1122.

The image output unit 1120 is a screen or a display device, for example, and displays an image according to the control performed by the image output control unit 1118.

The audio decoding unit 1117 decodes the coded audio stream extracted by the demultiplexing unit 1115, and outputs the decoded audio data to the audio output control unit 1119.

The audio output control unit 1119 performs control so as to cause the audio output unit 1121 to output the decoded audio data as audio at a timing based on the timestamp written in the RTP header.

The audio output unit 1121 is a speaker, for example, and outputs the audio data as audio according to the control performed by the audio output control unit 1119.

The participation time measurement unit 1122 measures a length of time that has elapsed since a connection was established with a first site. Also, the participation time measurement unit 1122 may measure a length of time that has elapsed since the site A started participating in the video conference. Then, the measured time length is displayed by the image output unit 1120 via the image output control unit 1118, as necessary.

Figure 4:
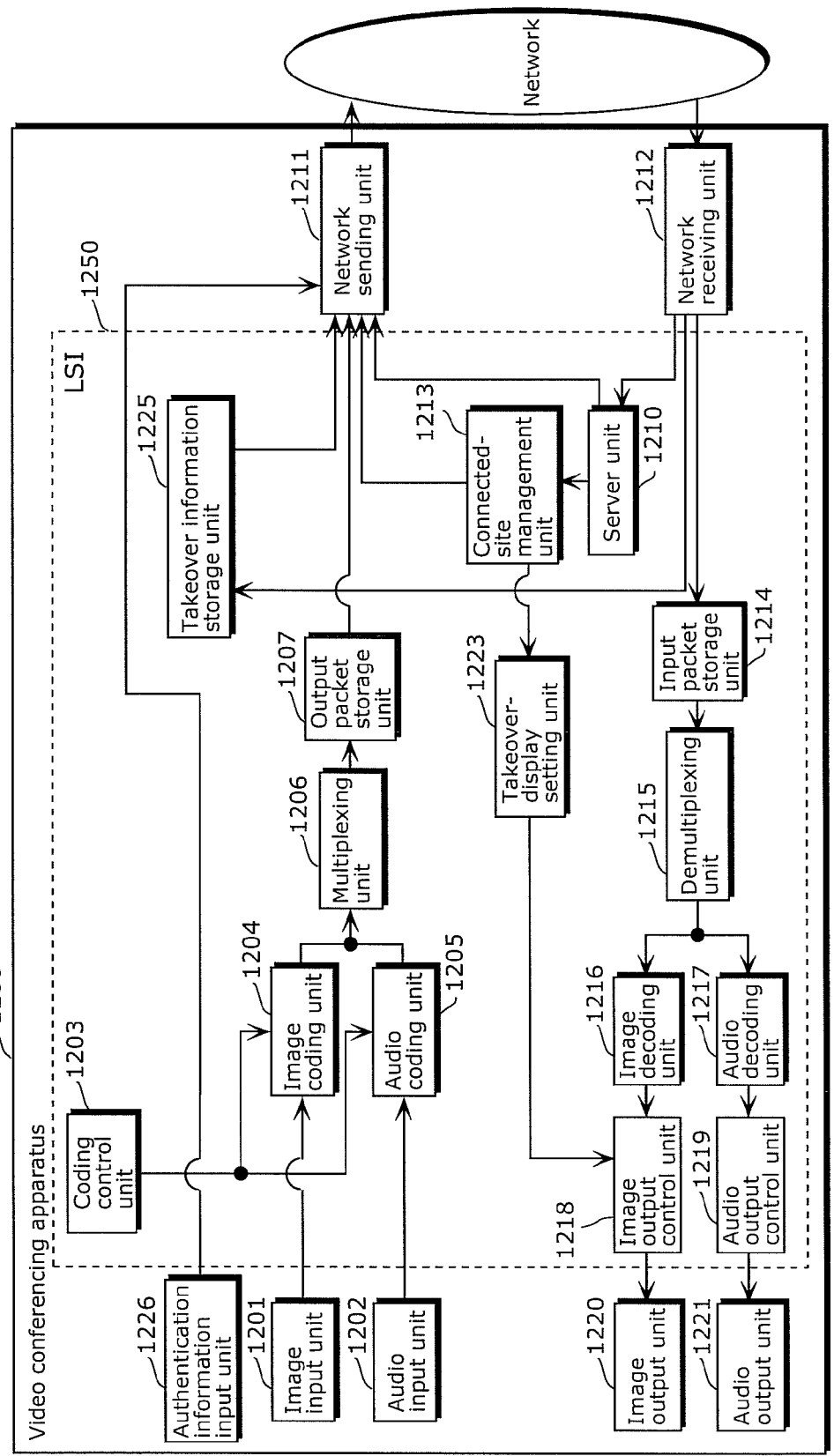
[FIG. 4]

FIG. 4 is a diagram showing a configuration of the video conferencing apparatus at the site B in the first embodiment shown in FIG. 1.

The video conferencing apparatus 1200 shown in FIG. 4 includes the image input unit 1201, the audio input unit 1202, a coding control unit 1203, an image coding unit 1204, an audio coding unit 1205, a multiplexing unit 1206, an output packet storage unit 1207, a server unit 1210, a network sending unit 1211, a network receiving unit 1212, a connected-site management unit 1213, an input packet storage unit 1214, a demultiplexing unit 1215, an image decoding unit 1216, an audio decoding unit 1217, an image output control unit 1218, an audio output control unit 1219, the image output unit 1220, the audio output unit 1221, a takeover-display setting unit 1223, and a takeover information storage unit 1225.

Note that the coding control unit 1203, the image coding unit 1204, the audio coding unit 1205, the multiplexing unit 1206, the output packet storage unit 1207, the server unit 1210, the connected-site management unit 1213, the input packet storage unit 1214, the demultiplexing unit 1215, the image decoding unit 1216, the audio decoding unit 1217, the image output control unit 1218, the audio output control unit 1219, the takeover-display setting unit 1223, and the takeover information storage unit 1225 may be implemented as an LSI 1250.

The image input unit 1201, the audio input unit 1202, the coding control unit 1203, the image coding unit 1204, the audio coding unit 1205, the multiplexing unit 1206, the output packet storage unit 1207, the server unit 1210, the network sending unit 1211, the network receiving unit 1212, the connected-site management unit 1213, the input packet storage unit 1214, the demultiplexing unit 1215, the image decoding unit 1216, the audio decoding unit 1217, the image output control unit 1218, the audio output control unit 1219, the image output unit 1220, and the audio output unit 1221 included in the video conferencing apparatus 1200 perform the same operations that are performed, respectively, by the image input unit 1101, the audio input unit 1102, the coding control unit 1103, the image coding unit 1104, the audio coding unit 1105, the multiplexing unit 1106, the output packet storage unit 1107, the server unit 1110, the network sending unit 1111, the network receiving unit 1112, the connected-site management unit 1113, the input packet storage unit 1114, the demultiplexing unit 1115, the image decoding unit 1116, the audio decoding unit 1117, the image output control unit 1118, the audio output control unit 1119, the image output unit 1120, and the audio output unit 1121 included in the video conferencing apparatus 1100 shown in FIG. 3.

When receiving the takeover information to be transferred to another site, the network receiving unit 1212 outputs the received takeover information to the takeover information storage unit 1225.

The takeover information storage unit 1225 stores the takeover information to be transferred to another site, such as the site E. Then, when connection with the site E becomes available, the takeover information storage unit 1225 sends the stored takeover information to the site E via the network sending unit 1211.

The takeover-display setting unit 1223 obtains information on a change in the connected sites managed by the connected-site management unit 1213. Also, the takeover-display setting unit 1223 outputs a takeover-screen display instruction to the image output control unit 1218 so that a message indicating that the takeover processing is currently being performed is shown in a display region for the site A which is a taken-over site.

Figure 27:
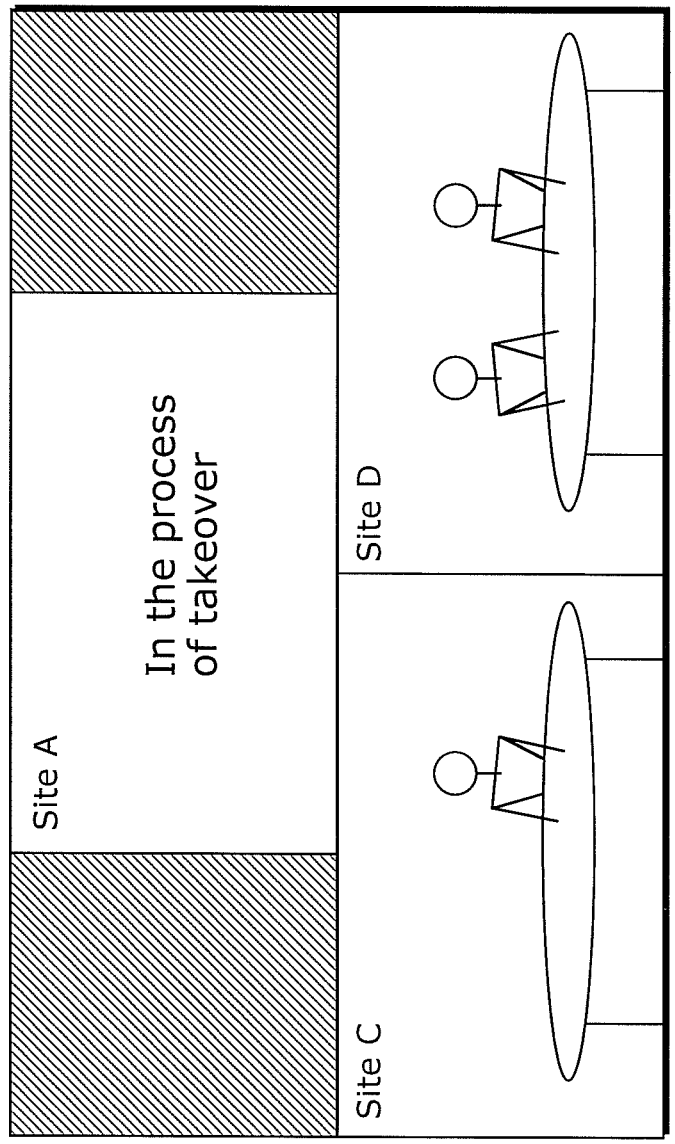
[FIG. 27]
Figure 28:
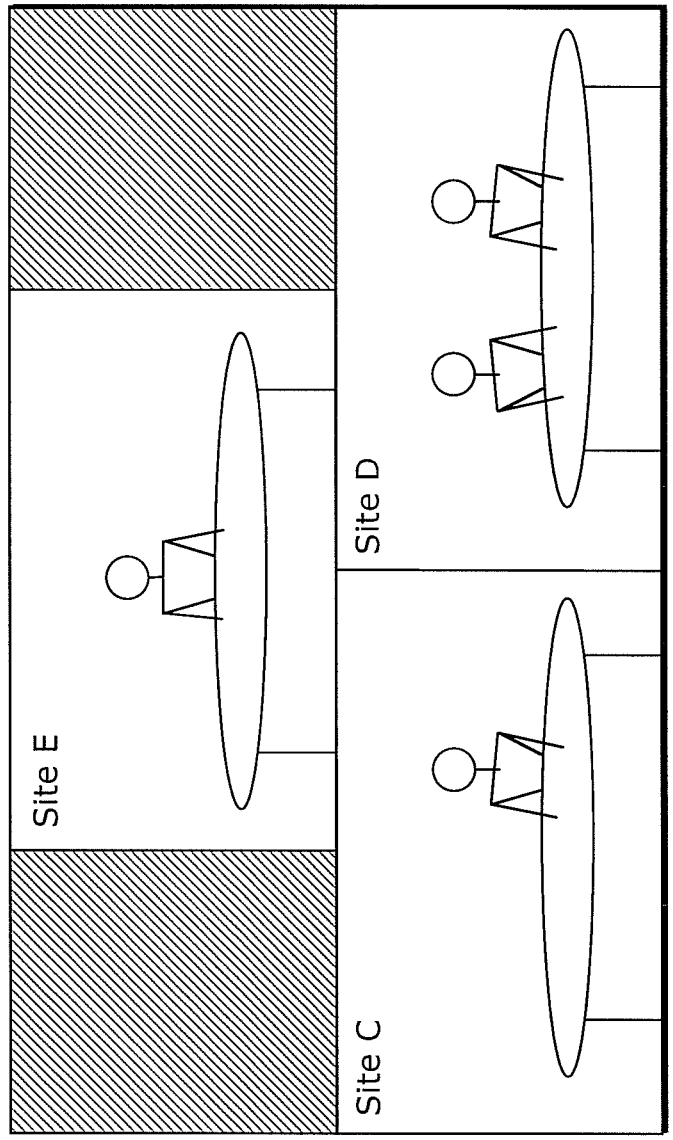
[FIG. 28]

In response to the takeover-screen display instruction from the takeover-display setting unit 1223, the image output control unit 1218 performs control so as to cause the image output unit 1220 to display "In the process of takeover" in the display region for the site A while maintaining the screen layout, as shown in FIG. 27. Then, after the video conferencing communication with the site E is started, the image output control unit 1218 performs control so as to cause the image output unit 1220 to display the site E in the display region having shown the site A, as shown in FIG. 28.

The video conferencing apparatus 1200 may include an authentication information input unit 1226. The authentication information input unit 1226 is an interface unit for receiving information to authenticate the participation of the site E in the video conference.

For example, the user at the site B first verifies an image from the site E which is a taking-over site, and then enters information to authenticate the participation of the site E in the video conference via the authentication information input unit 1226. The network sending unit 1211 does not send the image of the site B to the site E until the participation is approved. That is, the network sending unit 1211 sends the image of the site B to the site E after the participation is approved. Here, the network sending unit 1211 may send an alternative image to the site E until the participation is approved. With this, security can be ensured.

Figure 5:
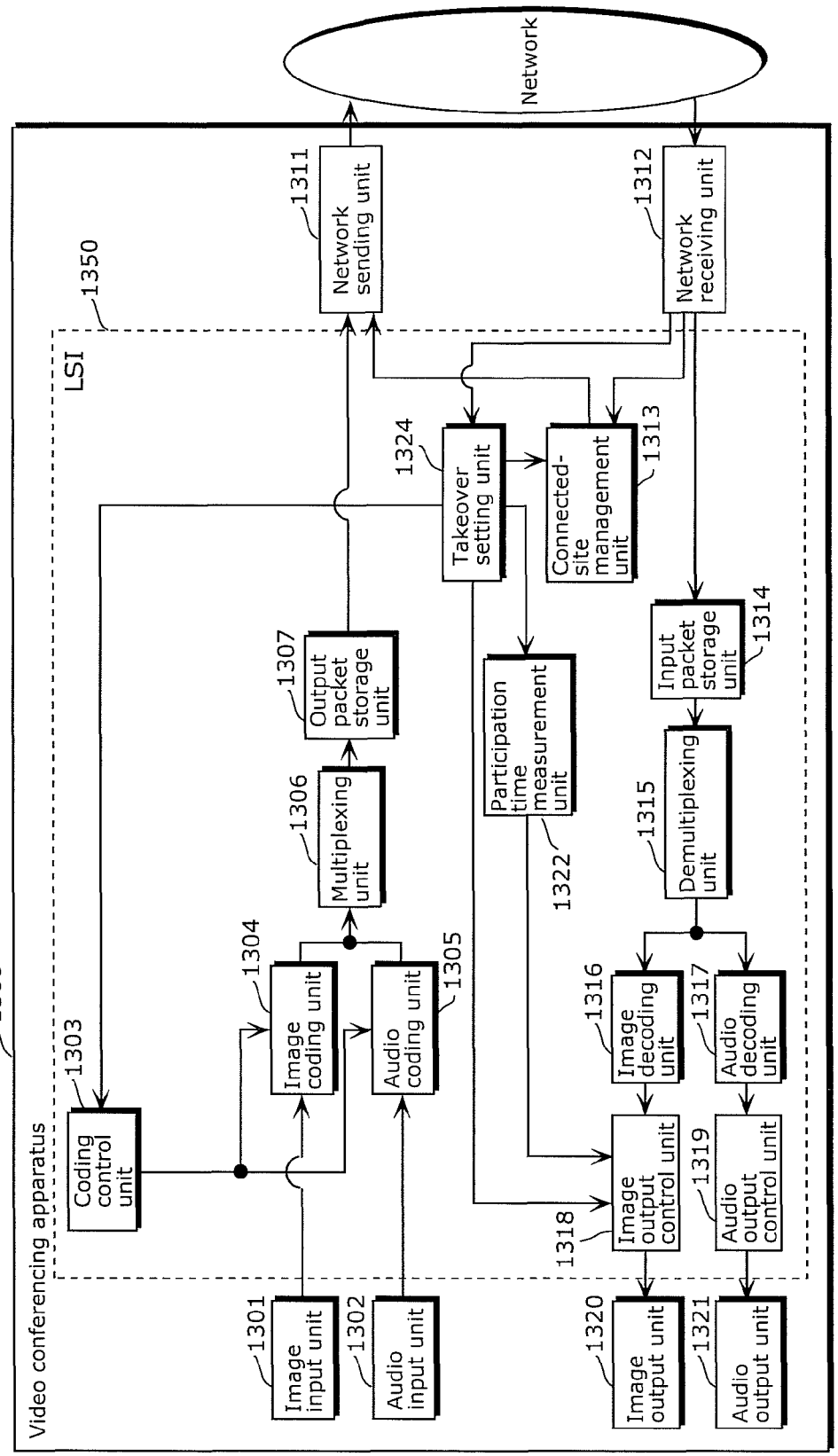
[FIG. 5]

FIG. 5 is a diagram showing a configuration of the video conferencing apparatus at the site E in the first embodiment shown in FIG. 1.

The video conferencing apparatus 1300 shown in FIG. 5 includes the image input unit 1301, the audio input unit 1302, a coding control unit 1303, an image coding unit 1304, an audio coding unit 1305, a multiplexing unit 1306, an output packet storage unit 1307, a network sending unit 1311, a network receiving unit 1312, a connected-site management unit 1313, an input packet storage unit 1314, a demultiplexing unit 1315, an image decoding unit 1316, an audio decoding unit 1317, an image output control unit 1318, an audio output control unit 1319, the image output unit 1320, the audio output unit 1321, a participation time measurement unit 1322, and a takeover setting unit 1324.

Note that the coding control unit 1303, the image coding unit 1304, the audio coding unit 1305, the multiplexing unit 1306, the output packet storage unit 1307, the connected-site management unit 1313, the input packet storage unit 1314, the demultiplexing unit 1315, the image decoding unit 1316, the audio decoding unit 1317, the image output control unit 1318, the audio output control unit 1319, the participation time measurement unit 1322, and the takeover setting unit 1324 may be implemented as an LSI 1350.

The image input unit 1301, the audio input unit 1302, the coding control unit 1303, the image coding unit 1304, the audio coding unit 1305, the multiplexing unit 1306, the output packet storage unit 1307, the network sending unit 1311, the network receiving unit 1312, the connected-site management unit 1313, the input packet storage unit 1314, the demultiplexing unit 1315, the image decoding unit 1316, the audio decoding unit 1317, the image output control unit 1318, the audio output control unit 1319, the image output unit 1320, the audio output unit 1321, and the participation time measurement unit 1322 included in the video conferencing apparatus 1300 perform the same operations that are performed, respectively, by the image input unit 1101, the audio input unit 1102, the coding control unit 1103, the image coding unit 1104, the audio coding unit 1105, the multiplexing unit 1106, the output packet storage unit 1107, the network sending unit 1111, the network receiving unit 1112, the connected-site management unit 1113, the input packet storage unit 1114, the demultiplexing unit 1115, the image decoding unit 1116, the audio decoding unit 1117, the image output control unit 1118, the audio output control unit 1119, the image output unit 1120, the audio output unit 1121, and the participation time measurement unit 1122 included in the video conferencing apparatus 1100 shown in FIG. 3.

When the data received from the network is the takeover information from the site A, the network receiving unit 1312 outputs the takeover information to the takeover setting unit 1324.

The takeover setting unit 1324 extracts, from the takeover information received by the network receiving unit 1312, the IP address of the site which is accessing the site E, and then outputs the extracted IP address to the connected-site management unit 1313. The takeover setting unit 1324 also extracts the resolution, bit rate, and frame rate from the takeover information, and outputs this extracted information to the coding control unit 1303. Moreover, the takeover setting unit 1324 extracts the connection time length from the takeover information, and outputs the extracted connection time length to the participation time measurement unit 1322. Furthermore, the takeover setting unit 1324 extracts the screen layout from the takeover information, and outputs the extracted screen layout to the image output control unit 1318.

The participation time measurement unit 1322 measures a time length of participating in the video conference, using the connection time length obtained by the takeover setting unit 1324 as an initial value.

The image output control unit 1318 performs control so as to cause the image output unit 1320 to display the moving image data from the other sites according to the screen layout obtained by the takeover setting unit 1324.

Figure 6:
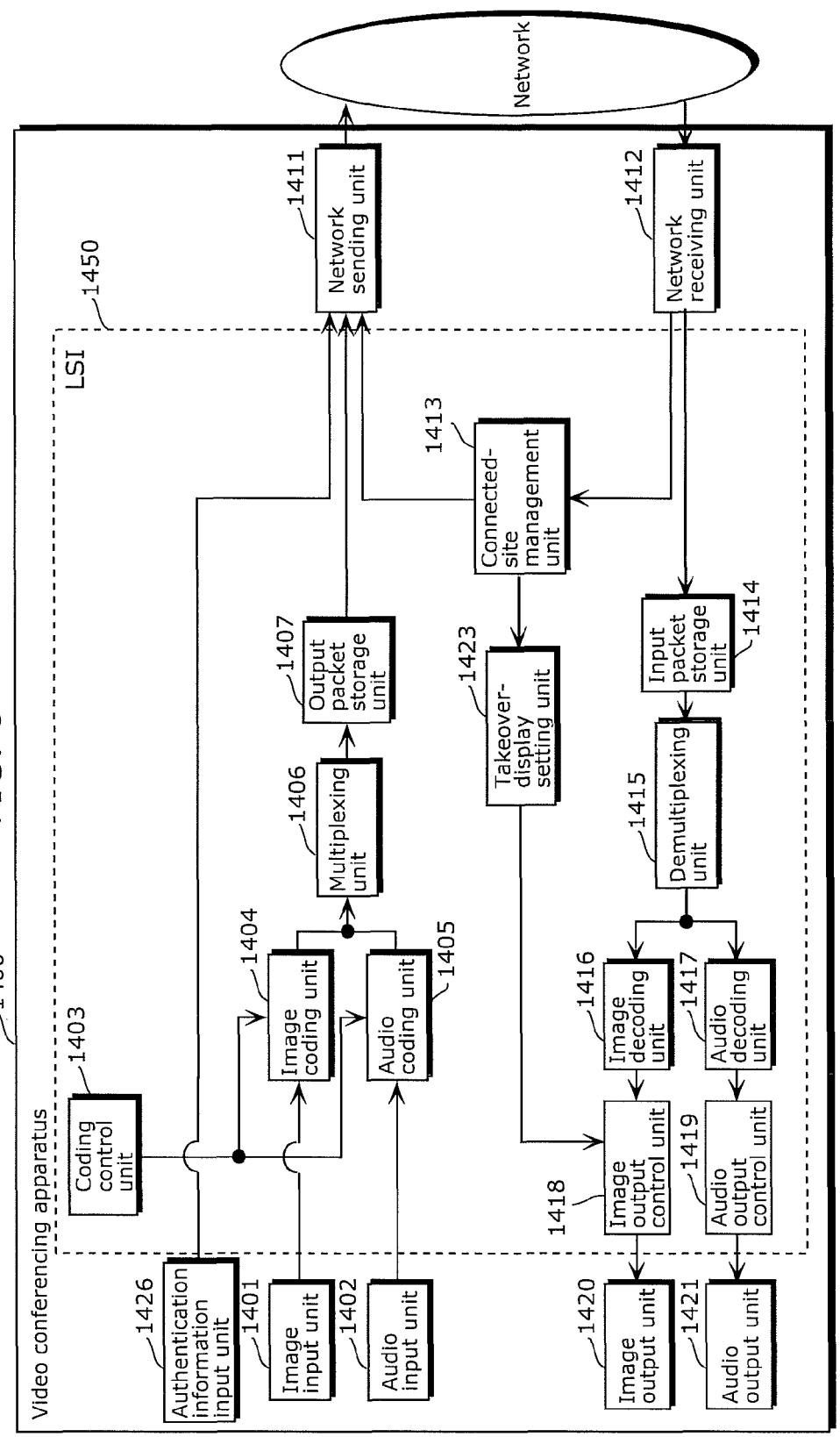
[FIG. 6]

FIG. 6 is a diagram showing a configuration of the video conferencing apparatus at each of the sites C and D in the first embodiment shown in FIG. 1.

The video conferencing apparatus 1400 shown in FIG. 6 includes the image input unit 1401, the audio input unit 1402, a coding control unit 1403, an image coding unit 1404, an audio coding unit 1405, a multiplexing unit 1406, an output packet storage unit 1407, a network sending unit 1411, a network receiving unit 1412, a connected-site management unit 1413, an input packet storage unit 1414, a demultiplexing unit 1415, an image decoding unit 1416, an audio decoding unit 1417, an image output control unit 1418, an audio output control unit 1419, the image output unit 1420, the audio output unit 1421, and a takeover-display setting unit 1423.

Note that the coding control unit 1403, the image coding unit 1404, the audio coding unit 1405, the multiplexing unit 1406, the output packet storage unit 1407, the connected-site management unit 1413, the input packet storage unit 1414, the demultiplexing unit 1415, the image decoding unit 1416, the audio decoding unit 1417, the image output control unit 1418, the audio output control unit 1419, and the takeover-display setting unit 1423 may be implemented as an LSI 1450.

The image input unit 1401, the audio input unit 1402, the coding control unit 1403, the image coding unit 1404, the audio coding unit 1405, the multiplexing unit 1406, the output packet storage unit 1407, the network sending unit 1411, the network receiving unit 1412, the connected-site management unit 1413, the input packet storage unit 1414, the demultiplexing unit 1415, the image decoding unit 1416, the audio decoding unit 1417, the image output control unit 1418, the audio output control unit 1419, the image output unit 1420, the audio output unit 1421, and the takeover-display setting unit 1423 included in the video conferencing apparatus 1400 perform the same operations that are performed, respectively, by the image input unit 1201, the audio input unit 1202, the coding control unit 1203, the image coding unit 1204, the audio coding unit 1205, the multiplexing unit 1206, the output packet storage unit 1207, the network sending unit 1211, the network receiving unit 1212, the connected-site management unit 1213, the input packet storage unit 1214, the demultiplexing unit 1215, the image decoding unit 1216, the audio decoding unit 1217, the image output control unit 1218, the audio output control unit 1219, the image output unit 1220, the audio output unit 1221, and the takeover-display setting unit 1223 included in the video conferencing apparatus 1200 shown in FIG. 4.

The network receiving unit 1412 outputs the connected-site change notice received from the site B, to the connected-site management unit 1413.

The connected-site management unit 1413 changes the information on the connected sites on the basis of the connected-site change notice received by the network receiving unit 1412.

The video conferencing apparatus 1400 may include an authentication information input unit 1426. The authentication information input unit 1426 is an interface unit for receiving information to authenticate the participation of the site E in the video conference.

For example, the user at the site C or D first verifies an image from the site E which is the taking-over site, and then enters information to authenticate the participation of the site E in the video conference via the authentication information input unit 1426. The network sending unit 1411 does not send the image of the site C or D to the site E until the participation is approved. That is, the network sending unit 1411 sends the image of the site C or D to the site E after the participation is approved. Here, the network sending unit 1411 may send an alternative image to the site E until the participation is approved. With this, security can be ensured.

Up to this point, the configurations of the video conferencing apparatuses placed in the sites in the first embodiment have been explained. The first embodiment assumes that the site A or B is operating as the server of the video conferencing system. Also, the first embodiment assumes that the site E, which is the taking-over site, is in an ON or OFF state.

Next, a takeover operation performed by the video conferencing apparatuses configured as described thus far is explained.

The first embodiment describes an operation on the assumption that the site A which establishes the video conferencing communication with the sites B, C, and D turns over the video conferencing communication to the site E which thus continues the video conferencing communication.

Here, when starting the video conferencing communication with the sites B, C, and D, the site A performs processing as follows. The site A selects the sites B, C, and D which are to be the connected sites in the video conference, and establishes connections with the sites B, C, and D. After receiving connection confirmations from the sites B, C, and D, the network receiving unit 1112 of the site A notifies the server unit 1110 of the connection confirmations. Receiving the connection confirmations, the server unit 1110 operates as a server that manages the connected sites participating in the video conference. The server unit 1110 also manages key information used for authenticating the connected sites.

It should be noted that the site B may operate as the server of the video conferencing system in place of the site A, by performing the operation described above.

Figure 7:
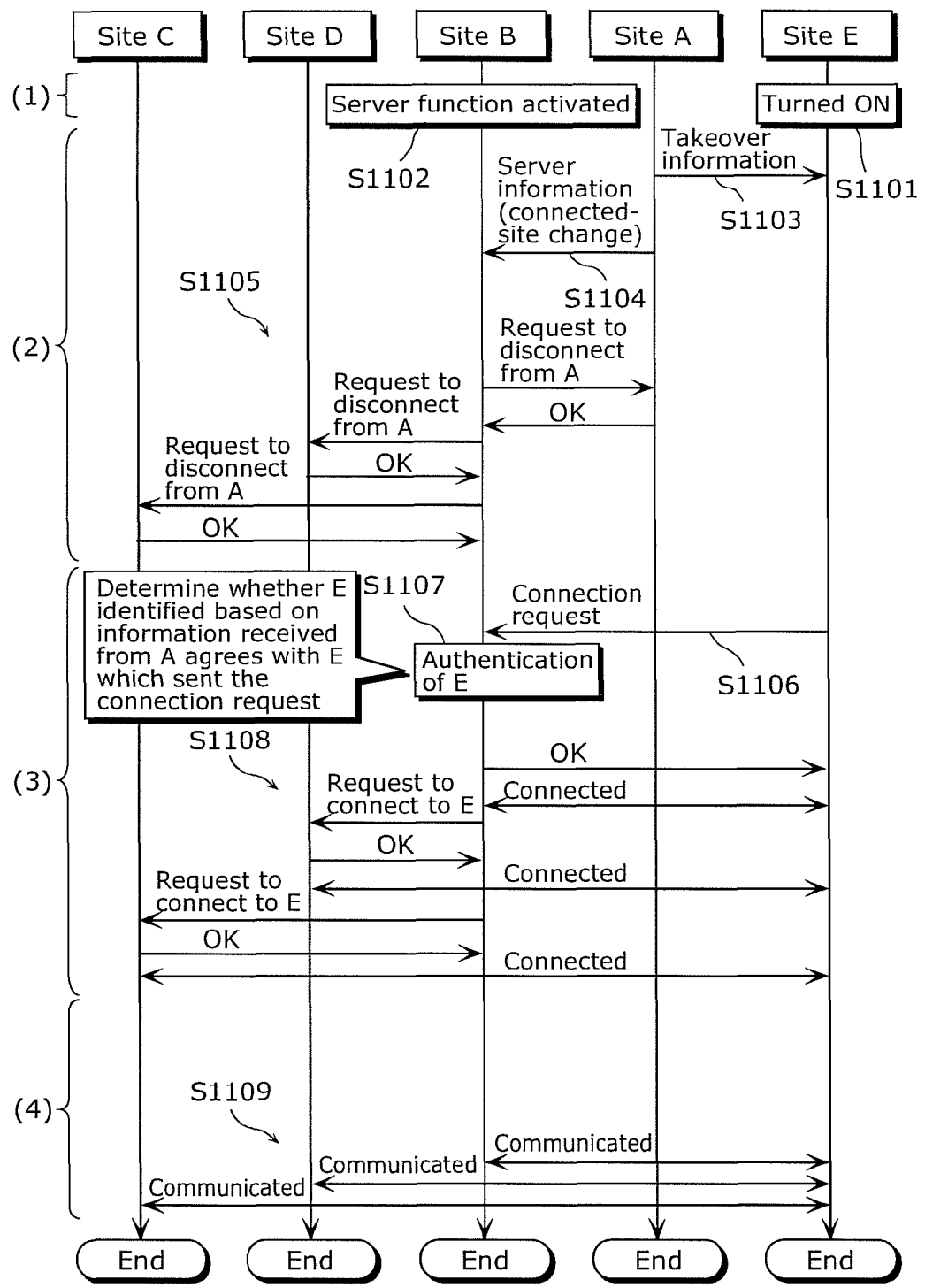
[FIG. 7]

FIG. 7 is a sequence diagram showing the processing of the takeover from the site A to the site E in the first embodiment shown in FIG. 1. The takeover processing shown in FIG. 7 is performed on the assumption that the site E is in the ON state (S1101) and that the server function of the site B is being activated (S1102).

In this case, the site A first sends the takeover information to the site E (S1103).

Next, the site A sends, to the site B, the server information indicating the connected-site change (S1104).

Following this, the site B sends a disconnection request to each of the other sites in order to disconnect each of the other sites from the site A which is the taken-over source (S1105). As a result, the connection with the site A is terminated.

Then, the site E sends a connection request to the site B (S1106).

Next, the site B performs authentication of the participation of the site E in the video conference (S1107). Here, the site B determines whether to approve the participation of the site E in the video conference by determining whether the site E identified based on the information received from the site A agrees with the site E from which the connection request was received. The information identifying the site E is the IP address, MAC address, telephone number, or serial number of the video conferencing apparatus, for example.

Also, at this time, the site B may verify whether or not the video conferencing apparatus at the site E is compliant with the video conferencing apparatus at the site A or whether the video conferencing apparatus at the site E is compatible with the video conferencing apparatus at the site A. Suppose here that: the site E identified based on the received information agrees with the site E from which the connection request was received; and also the video conferencing apparatus at the site E is compliant with the video conferencing apparatus at the site A or the video conferencing apparatus at the site E is compatible with the video conferencing apparatus at the site A. In this case, the site B may approve the participation of the site E.

Next, the site B establishes connection with the site E. Then, the site B sends a connection request to each of the sites C and D to establish connection with the site E. In response to this request, the sites C and D establish connections with the site E (S1108).

Thus, the sites B, C, and D start communication with the site E (S1109).

Accordingly, the site E takes over the video conferencing communication.

Figure 8:
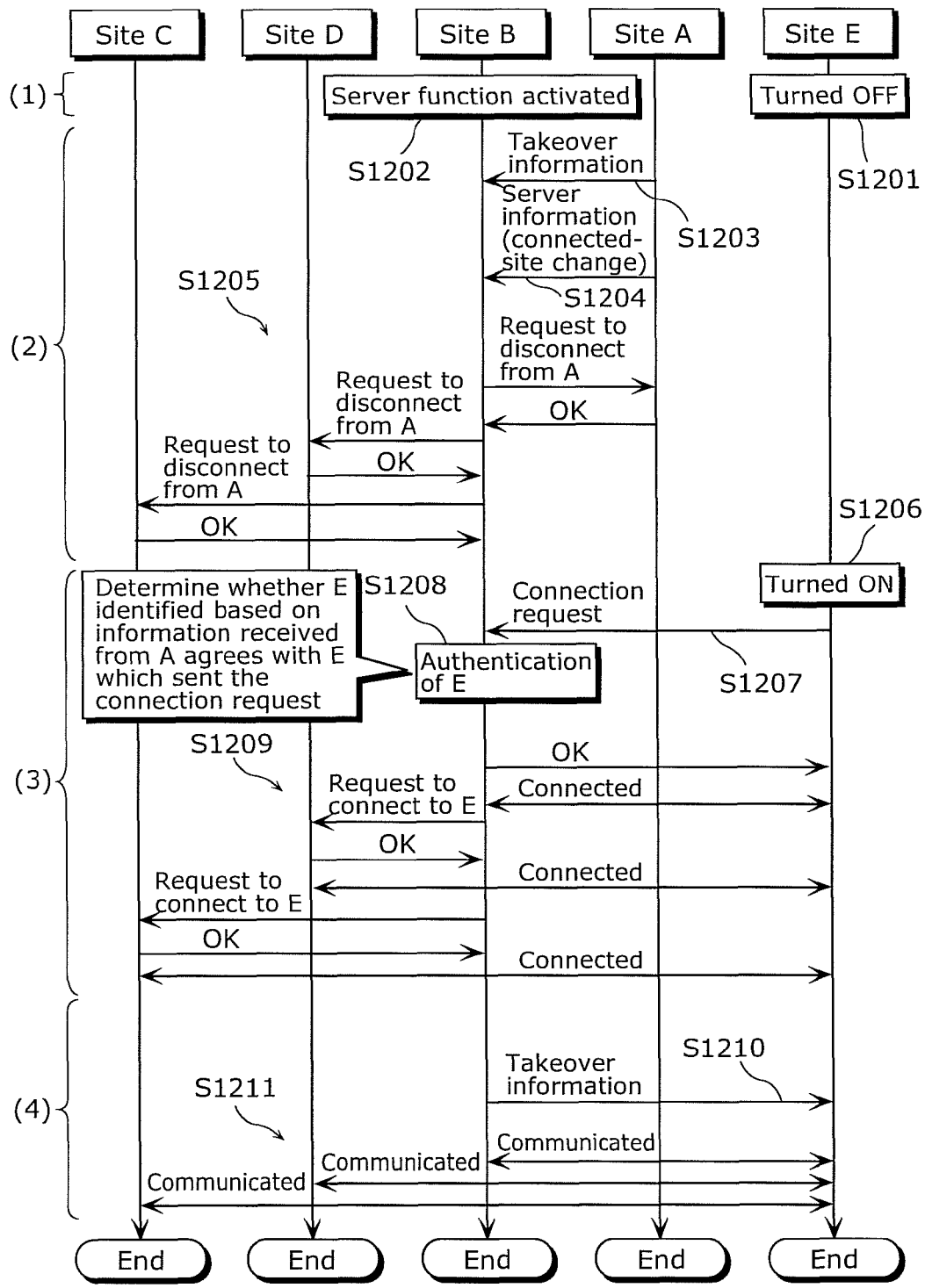
[FIG. 8]

FIG. 8 is a sequence diagram showing the processing of the takeover from the site A to the site E, as in the case of FIG. 7. The takeover processing shown in FIG. 8 is performed on the assumption that the site E is in the OFF state (S1201) and that the server function of the site B is being activated (S1202).

In this case, the site A first sends the takeover information to the site B (S1203).

Next, the site A sends, to the site B, the server information indicating the connected-site change (S1204).

Following this, the site B sends a disconnection request to each of the other sites in order to disconnect each of the other sites from the site A which is the taken-over source (S1205). As a result, the connection with the site A is terminated.

Here, the site E is turned on (S1206).

Then, the site E sends a connection request to the site B (S1207).

Next, the site B performs authentication of the participation of the site E in the video conference, as in the case shown as an example in FIG. 7 (S1208).

Following this, the site B establishes connection with the site E. Then, the site B sends a connection request to each of the sites C and D to establish connection with the site E. In response to this request, the sites C and D establish connections with the site E (S1209).

Then, the site B sends the takeover information to the site E (S1210).

Thus, the sites B, C, and D start communication with the site E (S1211).

Accordingly, even when the site E is in the OFF state, the takeover information can be received after the site E is turned on.

Figure 9:
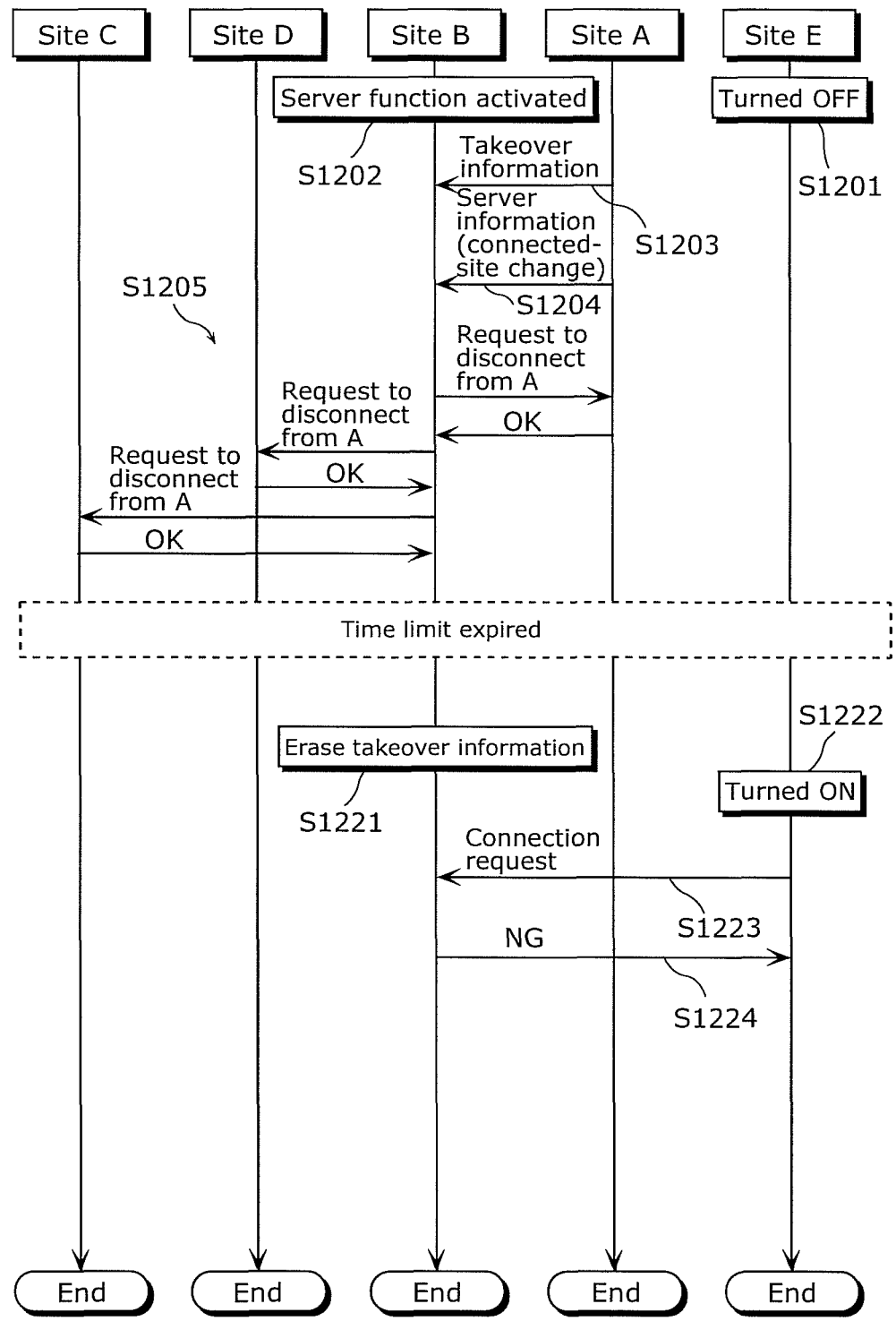
[FIG. 9]

FIG. 9 is a sequence diagram showing the processing of the takeover from the site A to the site E, as in the case of FIG. 7. The takeover processing shown in FIG. 9 is performed on the assumption that the site E is in the OFF state (S1201) and that the server function of the site B is being activated (S1202) as in the case of FIG. 8. Also, FIG. 9 shows a case where the connection request from the site E is delayed.

Firstly, the site A sends the takeover information to the site B (S1203).

Next, the site A sends, to the site B, the server information indicating the connected-site change (S1204).

Following this, the site B sends a disconnection request to each of the other sites in order to disconnect each of the other sites from the site A which is the taken-over source (S1205). As a result, the connection with the site A is terminated. Up to this point, the example shown in FIG. 9 is the same as the one shown in FIG. 8.

In the example shown in FIG. 9, the connection request is sent from the site E to the site B after the expiration of a time limit.

After the expiration of the time limit, the site B erases the takeover information (S1221).

Next, the site E is turned on (S1222).

Following this, the site E sends a connection request to the site B (S1223).

Then, the site B rejects the connection request (S1224).

To be more specific, after the expiration of the time limit, the site B does not perform authentication of the participation of the site E in order to ensure the security. Also, the takeover information is erased in order to ensure the security.

Figure 10:
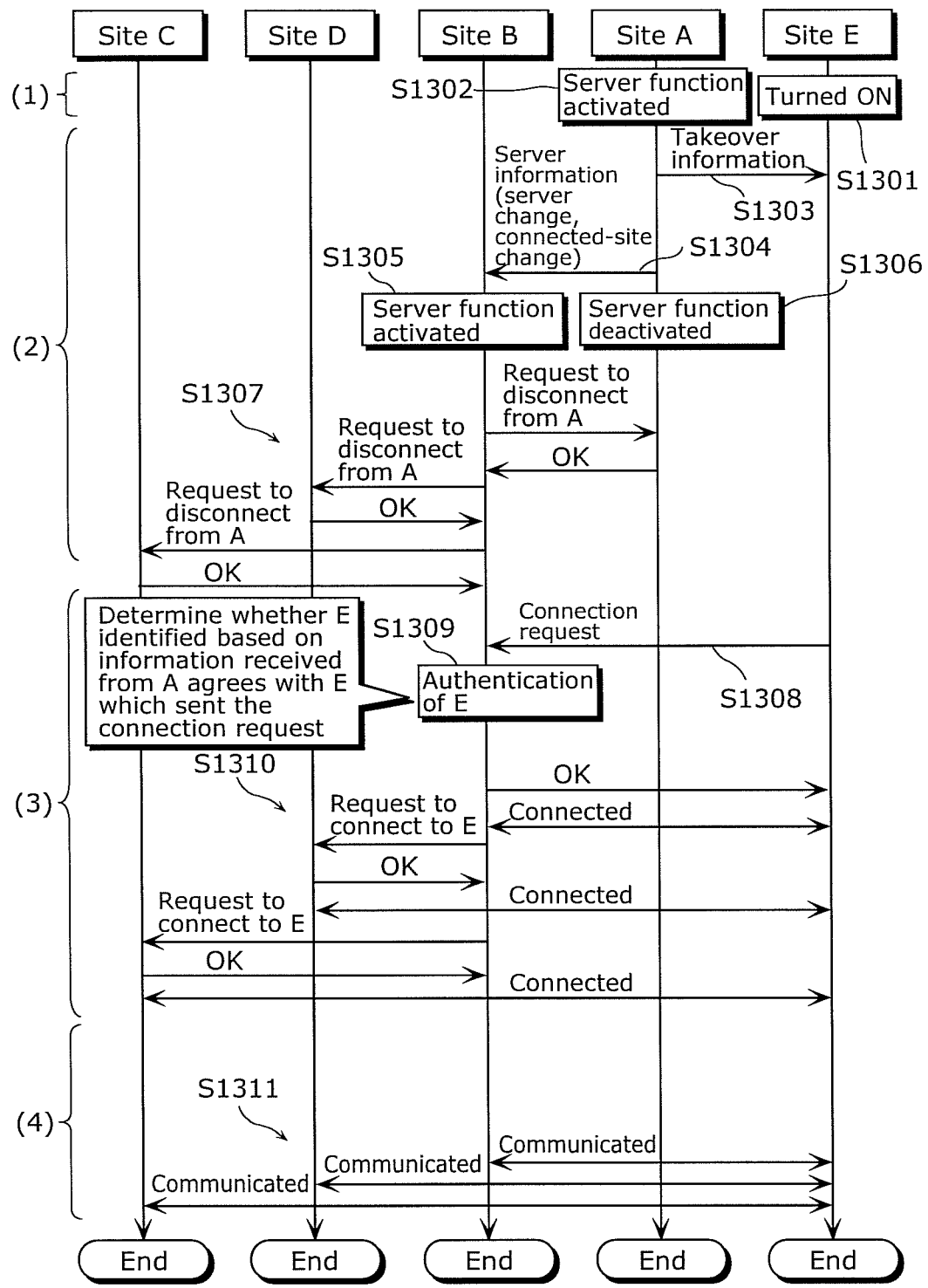
[FIG. 10]

FIG. 10 is a sequence diagram showing the processing of the takeover from the site A to the site E, as in the case of FIG. 7. The takeover processing shown in FIG. 10 is performed on the assumption that the site E is in the ON state (S1301) and that the server function of the site A is being activated (S1302).

In this case, the site A first sends the takeover information to the site E (S1303).

Next, the site A sends the server information indicating the server change and connected-site change, to the site B (S1304).

Following this, the server function of the site B is activated (S1305).

Then, the server function of the site A is deactivated (S1306).

Next, the site B sends a disconnection request to each of the other sites in order to disconnect each of the other sites from the site A which is the taken-over source (S1307). As a result, the connection with the site A is terminated.

Following this, the site E sends a connection request to the site B (S1308).

Then, the site B performs authentication of the participation of the site E in the video conference, as in the case shown as an example in FIG. 7 (S1309).

Next, the site B establishes connection with the site E. Then, the site B sends a connection request to each of the sites C and D to establish connection with the site E. In response to this request, the sites C and D establish connections with the site E (S1310).

Thus, the sites B, C, and D start communication with the site E (S1311).

In this way, even when operating as the server, the site A can turn over the operation as the server to the site B and also turn over the settings such as the screen layout to the site E.

Figure 11:
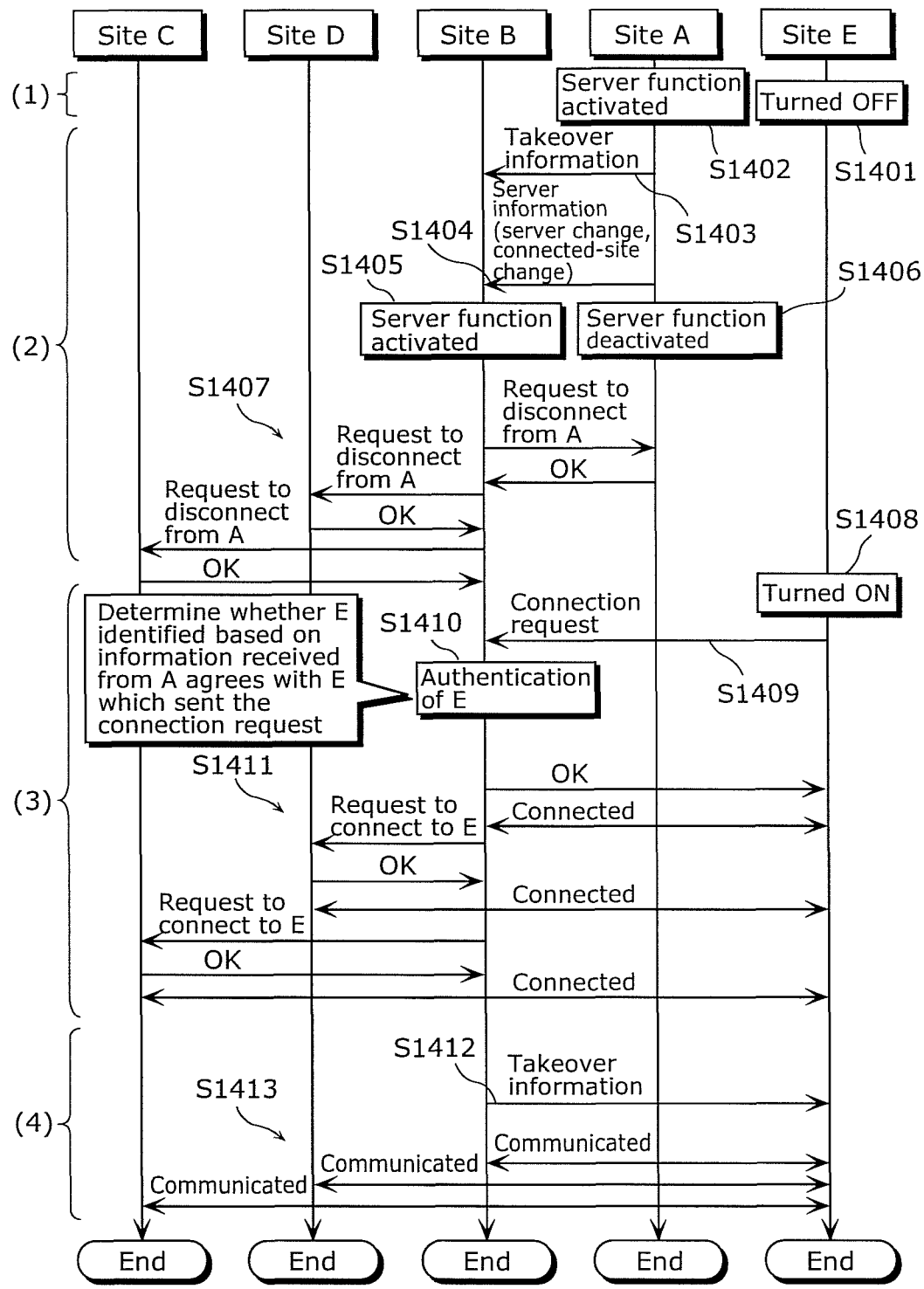
[FIG. 11]

FIG. 11 is a sequence diagram showing the processing of the takeover from the site A to the site E, as in the case of FIG. 7. The takeover processing shown in FIG. 10 is performed on the assumption that the site E is in the OFF state (S1401) and that the server function of the site A is being activated (S1402).

In this case, the site A first sends the takeover information to the site B (S1403).

Next, the site A sends the server information indicating the server change and connected-site change, to the site B (S1404).

Following this, the server function of the site B is activated (S1405).

Then, the server function of the site A is deactivated (S1406).

Next, the site B sends a disconnection request to each of the other sites in order to disconnect each of the other sites from the site A which is the taken-over source (S1407). As a result, the connection with the site A is terminated.

Following this, the site E is turned on (S1408).

Then, the site E sends a connection request to the site B (S1409).

Next, the site B performs authentication of the participation of the site E in the video conference, as in the case shown as an example in FIG. 7 (S1410).

Following this, the site B establishes connection with the site E. Then, the site B sends a connection request to each of the sites C and D to establish connection with the site E. In response to this request, the sites C and D establish connections with the site E (S1411).

Then, the site B sends the takeover information to the site E (S1412).

Thus, the sites B, C, and D start communication with the site E (S1413).

In this way, even when the site E is in the OFF state and the site A operates as the server, the video conferencing system can perform the takeover processing.

Figure 12:
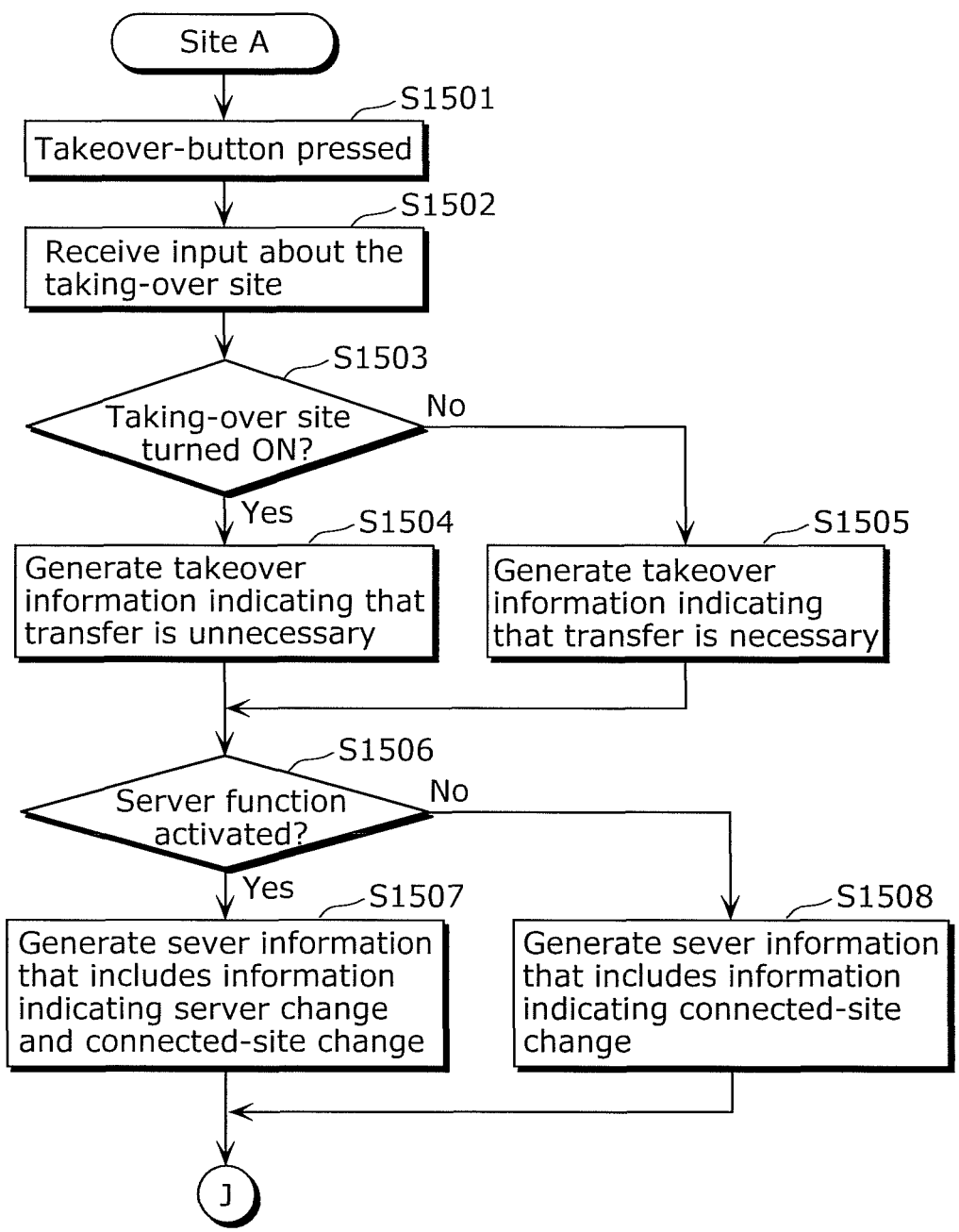
[FIG. 12]
Figure 13:
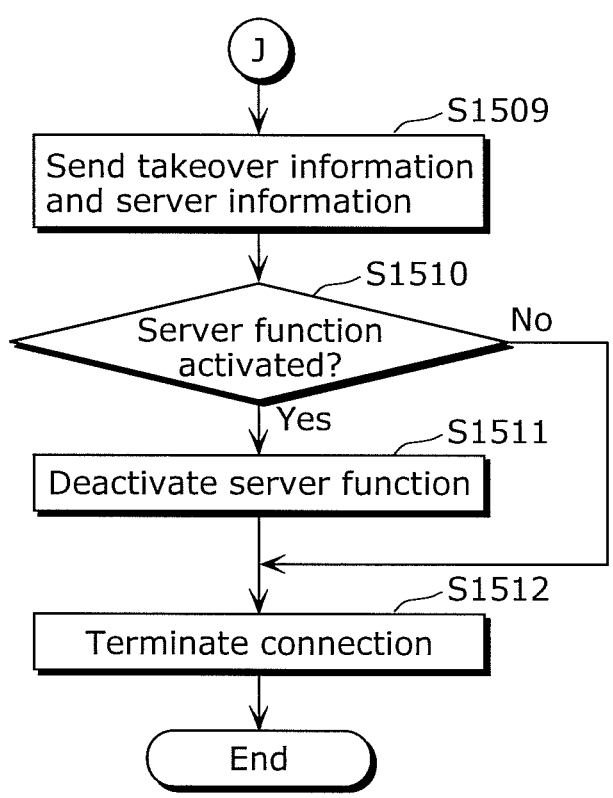
[FIG. 13]

FIG. 12 and FIG. 13 are flowcharts showing processing performed at the site A in the first embodiment shown in FIG. 1.

Firstly, at the site A which is in the video conference, the input unit 1108 receives a button press indicating a takeover of the video conference (S1501).

Figure 26:
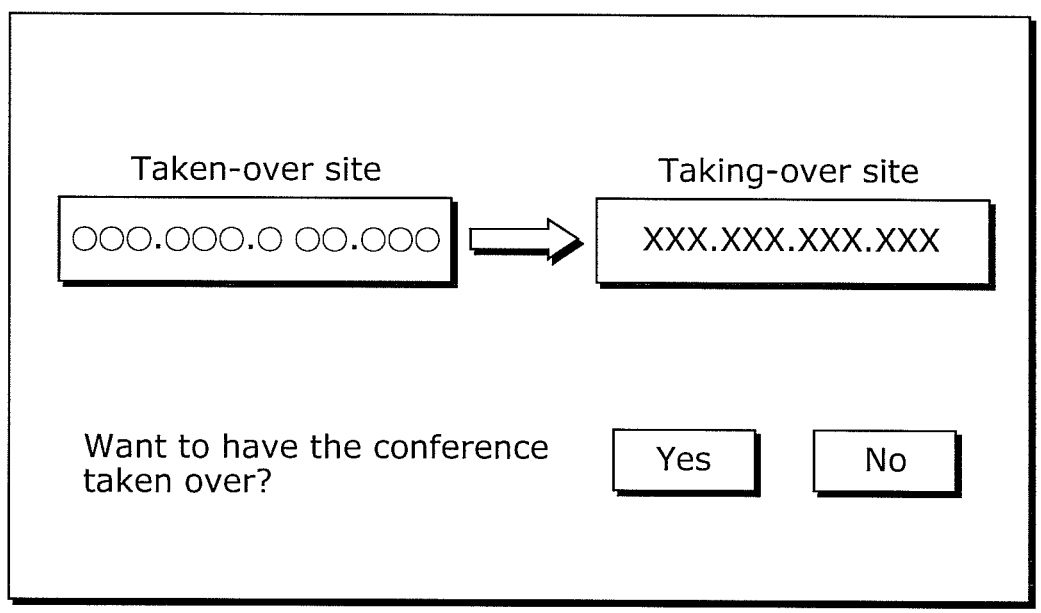
[FIG. 26]

Next, the image output control unit 1118 performs control so as to cause the image output unit 1120 to display the screen shown in FIG. 26. The input unit 1108 receives an input of the IP address of the site E, which is the taking-over site, in order to turn over the video conference to the site E (S1502). Also, the image output control unit 1118 receives a selection whether to perform the takeover processing.

The takeover information generation unit 1109 obtains the information received by the input unit 1108. Then, the takeover information generation unit 1109 determines whether or not the site E, which is the taking-over site, is in the ON state (S1503). For example, the takeover information generation unit 1109 sends a connection request to the site E via the network sending unit 1111, and determines whether or not the site E is in the ON state depending on whether the site E sends back a response.

When the taking-over site is in the ON state (Yes in S1503), the takeover information generation unit 1109 generates the takeover information indicating that the transfer is unnecessary as shown in FIG. 22 (S1504).

On the other hand, when the taking-over site is in the OFF state (No in S1503), the takeover information generation unit 1109 generates the takeover information indicating that the transfer is necessary as shown in FIG. 21 (S1505).

Here, the takeover information generation unit 1109 generates the takeover information shown in FIG. 21 or FIG. 22 on the basis of: the IP addresses of the sites B, C, and D managed by the connected-site management unit 1113; the connection time length measured by the participation time measurement unit 1122; and the screen layout controlled by the image output control unit 1118 (S1504 or S1505).

Next, the takeover information generation unit 1109 determines whether or not the server unit 1110 is operating, that is, whether or not the server function of the site A is being activated (S1506).

When the server function of the site A is being activated (Yes in S1506), the takeover information generation unit 1109 generates the server information that includes information indicating the server change and connected-site change as shown in FIG. 25 (S1507).

On the other hand, when the server function of the site A is not being activated (No in S1506), the takeover information generation unit 1109 generates the server information that includes information indicating the connected-site change as shown in FIG. 24 (S1508).

Next, the takeover information generation unit 1109 sends the generated takeover information and server information via the network sending unit 1111 (S1509).

Here, when the site E, which is the taking-over site, is in the ON state, the takeover information generation unit 1109 sends, to the site E, the takeover information indicating that the transfer is unnecessary via the network sending unit 1111. On the other hand, when the site E, which is the taking-over site, is not in the ON state, the takeover information generation unit 1109 sends, to the site B, the takeover information indicating that the transfer is necessary via the network sending unit 1111, for example.

When the server function of the site A is being activated, the takeover information generation unit 1109 sends, to the site B, the server information that includes the information indicating the server change and connected-site change via the network sending unit 1111. Note that when the takeover information generation unit 1109 sends, to the site C or D, the server information that includes the information indicating the server change, the site C or D becomes the server.

On the other hand, when the server function of the site A is not being activated, the takeover information generation unit 1109 sends, to the site B operating as the server, the server information that includes the information indicating the connected-site change via the network sending unit 1111.

Next, when the server function of the site A is being activated (Yes in S1510), the takeover information generation unit 1109 deactivates the server function of the site A (S1511). In other words, the server unit 1110 is deactivated.

Then, in response to the disconnection request from the site B, the site A disconnects from the sites to which the site A has been connected (S1512).

In this way, the site A sends the takeover information and then terminates the video conferencing communication with the sites B, C, and D.

Figure 14:
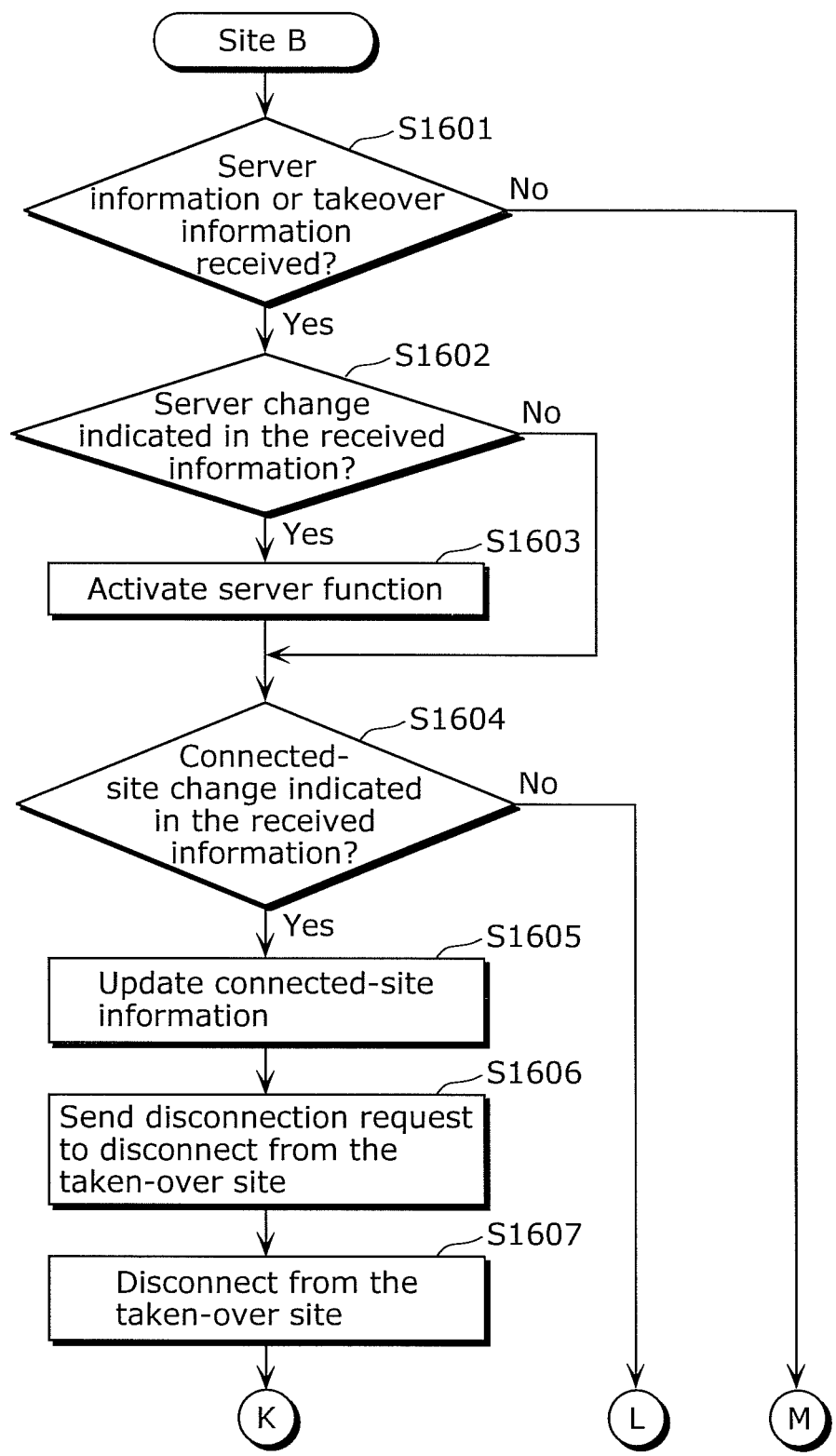
[FIG. 14]
Figure 15:
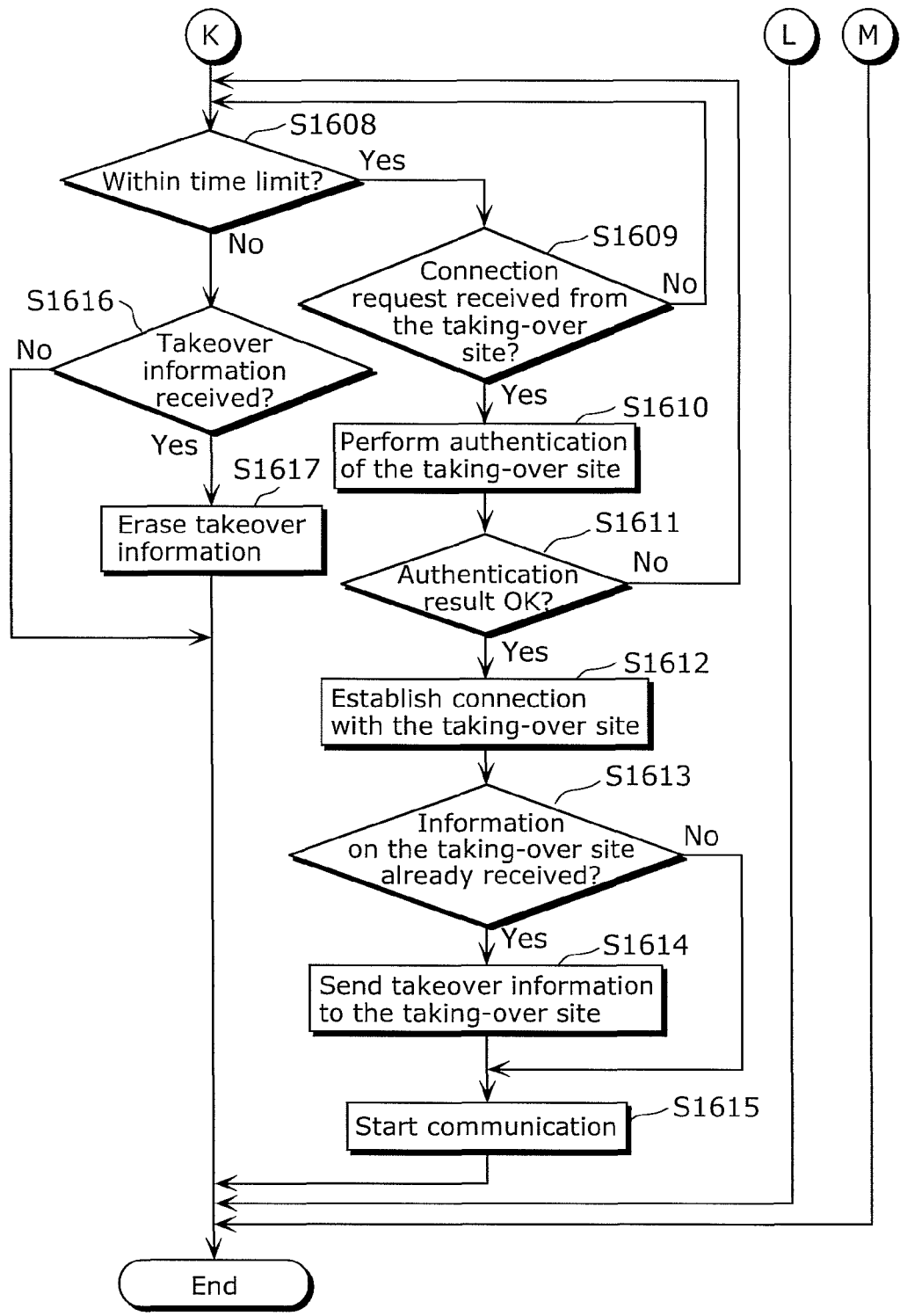
[FIG. 15]

FIG. 14 and FIG. 15 are flowcharts showing processing performed at the site B in the first embodiment shown in FIG. 1.

Firstly, the network receiving unit 1212 of the site B determines whether or not the server information or the takeover information has been received from the site A (S1601). It should be noted that when the network receiving unit 1212 receives the takeover information, the takeover information storage unit 1225 stores the takeover information.

Here, when the network receiving unit 1212 has not received the server information or the takeover information (No in S1601), the processing at the site B is terminated.

On the other hand, when receiving the server information or the takeover information (Yes in S1601), the network receiving unit 1212 determines whether or not the received information includes the information indicating the server change (S 1602).

When the received information includes the server information shown in FIG. 25, that is, when the received information includes the information indicating the server change (Yes in S1602), the server unit 1210 starts an operation to manage the server information. To be more specific, the server function of the site B is activated (S1603).

On the other hand, when the received information does not include the information indicating the server change (No in S1602), the site B performs a next process (i.e., S1604). It should be noted here that, in this case, the site B has already been operating as the server.

Next, the network receiving unit 1212 determines whether or not the received information includes the information indicating the connected-site change (S1604). When the received information does not include the information indicating the connected-site change (No in S1604), the processing at the site B is terminated.

On the other hand, when the received information includes the server information shown in FIG. 24 or FIG. 25, that is, when the received information includes the information indicating the connected-site change (Yes in S1604), the server unit 1210 updates the connected-site information managed as the server information, using the information received by the network receiving unit 1212 (S1605). Moreover, the server unit 1210 sends, to each of the sites C and D, a disconnection request to disconnect from the site A (S1606).

Next, the connected-site management unit 1213 obtains, from the server unit 1210, the information indicating the connected-site change, and accordingly updates the connected-site information. Then, the connected-site management unit 1213 sends a disconnection request to the site A, which is the taken-over site, via the network sending unit 1211. As a result, connection with the site A, which is the taken-over site, is terminated (S1607).

Following this, the server unit 1210 determines whether or not the elapsed time is within the time limit (S1608). When the elapsed time exceeds the time limit (No in S1608), the processing at the site B is terminated. Here, when the takeover information has already been received (Yes in S1616), the takeover information storage unit 1225 erases the takeover information (S1617).

When the elapsed time is within the time limit (Yes in S1608), the server unit 1210 determines whether or not the network receiving unit 1212 has received a connection request from the site E, which is the taking-over site (S1609). When the network receiving unit 1212 has not received the connection request (No in S1609), the server unit 1210 determines again whether or not the elapsed time is within the time limit (S1608).

When the network receiving unit 1212 receives the connection request (Yes in S1609), the server unit 1210 performs authentication of the participation of the site E in the video conference. Here, the server unit 1210 determines whether to approve the participation of the site E in the video conference by determining whether the site E identified based on the information received from the site A agrees with the site E from which the connection request was received. The information identifying the site E is the IP address, MAC address, telephone number, or serial number of the video conferencing apparatus, for example.

Also, at this time, the server unit 1210 may verify whether or not the video conferencing apparatus at the site E is compliant with the video conferencing apparatus at the site A or whether the video conferencing apparatus at the site E is compatible with the video conferencing apparatus at the site A. Suppose here that: the site E identified based on the received information agrees with the site E from which the connection request was received; and also the video conferencing apparatus at the site E is compliant with the video conferencing apparatus at the site A or the video conferencing apparatus at the site E is compatible with the video conferencing apparatus at the site A. In this case, the server unit 1210 may approve the participation of the site E.

Here, when the site E is not approved normally (No in S1611), the server unit 1210 determines again whether the elapsed time is within the time limit (S1608).

On the other hand, when the site E is approved normally (Yes in S1611), the site B establishes connection with the site E (S1612).

Next, the network receiving unit 1212 determines whether or not the received information includes the takeover information (S1613).

When the received information includes the takeover information shown in FIG. 21, that is, when the received information includes the takeover information to be transferred to the site E which is the taking-over site (Yes in S1613), the takeover information storage unit 1225 sends the takeover information to the site E which is the taking-over site via the network sending unit 1211 (S1614).

Then, the site B starts the video conferencing communication with the site E which is the taking-over site (S1615).

In this way, the site B establishes the video conferencing communication with the site E instead of the site A, and also operates as the server.

Figure 16:
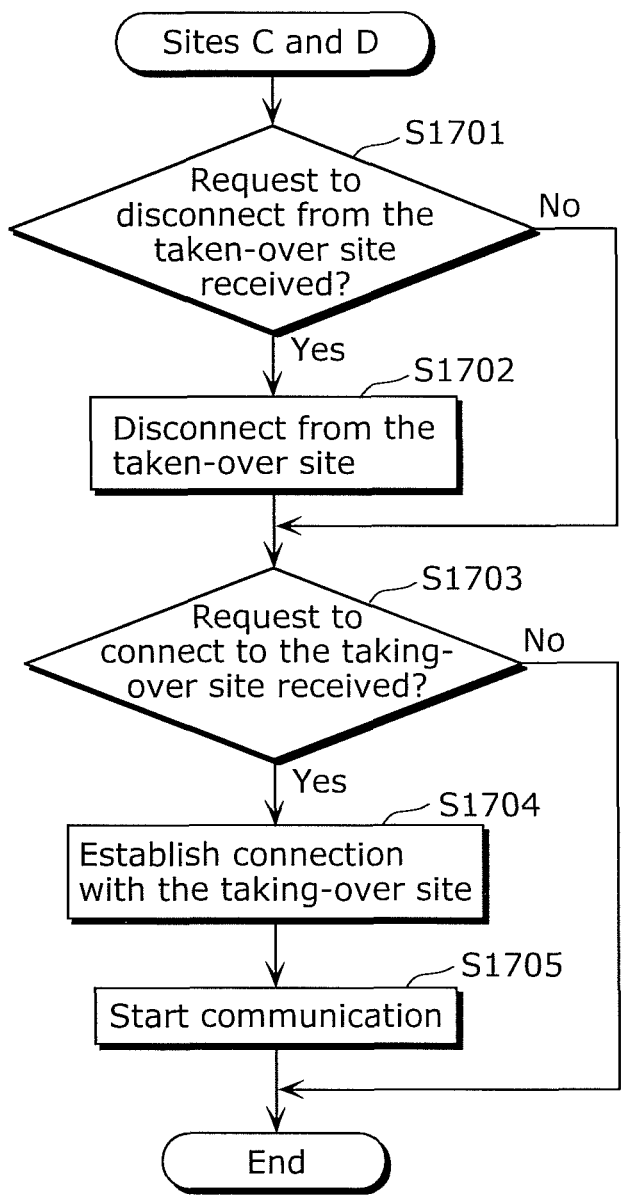
[FIG. 16]

FIG. 16 is a flowchart showing processing performed at each of the sites C and D in the first embodiment shown in FIG. 1.

Firstly, the network receiving unit 1412 determines whether or not the disconnection request to disconnect from the site A, which is the taken-over site, has been received (S1701).

When the network receiving unit 1412 receives the disconnection request (Yes in S1701), each of the sites C and D disconnects from the site A (S1702).

Next, the network receiving unit 1412 determines whether or not the connection request to connect to the site E, which is the taking-over site, has been received (S1703).

When the network receiving unit 1412 receives the connection request (Yes in S1703), each of the sites C and D establishes connection with the site E (S1704). Then, each of the sites C and D starts the video conferencing communication with the site E (S1705).

In this way, each of the sites C and D establishes the video conferencing communication with the site E instead of the site A.

Figure 17:
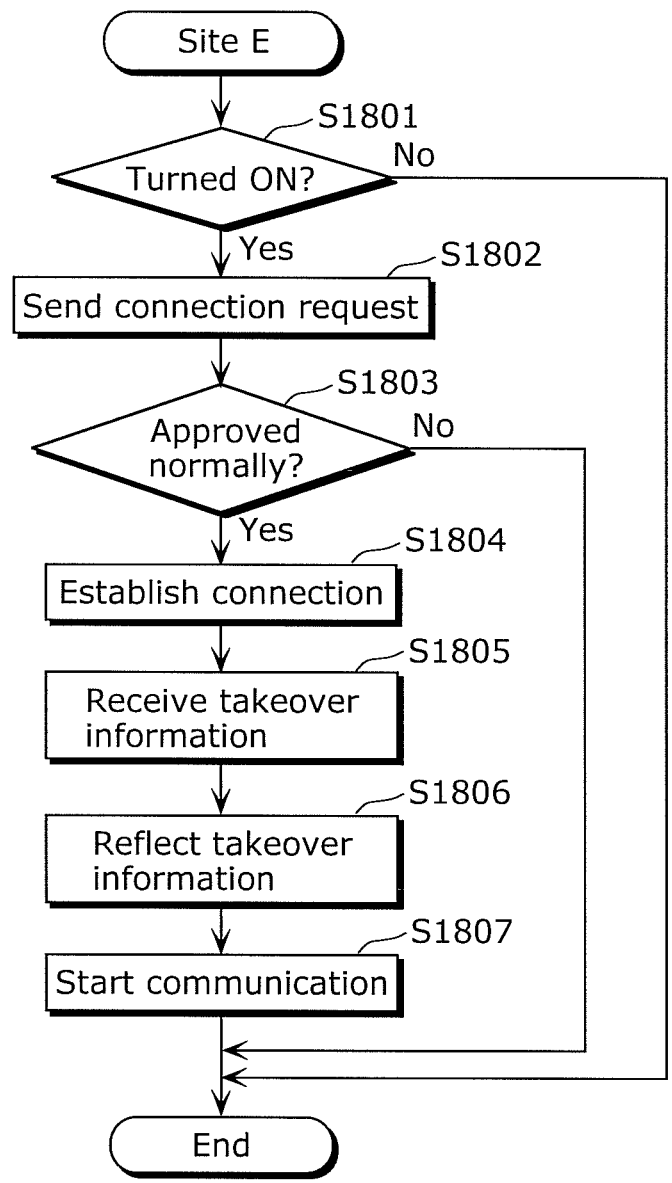
[FIG. 17]

FIG. 17 is a flowchart showing processing performed at the site E in the first embodiment shown in FIG. 1.

The processing to be performed depends on whether the site E is in the ON state or not (S1801).

When the site E is not in the ON state (No in S1801), the processing at the site E is terminated.

On the other hand, when the site E is in the ON state (Yes in S1801), the network sending unit 1311 sends a connection request to the site B operating as the server (S1802). Then, the participation of the site E is authenticated.

When the participation is not approved normally (No in S1803), the processing at the site E is terminated.

On the other hand, when the participation is normally approved (Yes in S1803), the site E establishes connection with each of the other sites (S1804).

Next, the network receiving unit 1312 receives the takeover information from the site B (S1805). In the example shown in FIG. 17, the site E obtains the takeover information from the site B after being approved. However, the site E may obtain the takeover information from the site A before being approved.

Following this, the takeover setting unit 1324 configures the video conferencing apparatus 1300 on the basis of the takeover information received by the network receiving unit 1312 (S1806).

To be more specific, the takeover setting unit 1324 outputs the bit rate, resolution, and frame rate included in the takeover information, to the coding control unit 1303. On the basis of the received bit rate, resolution, and frame rate, the coding control unit 1303 sets the coding conditions for the image coding unit 1304 and the audio coding unit 1305.

Also, the takeover setting unit 1324 outputs the connection time length included in the takeover information, to the participation time measurement unit 1322. The participation time measurement unit 1322 continues to measure the connection time length, using the connection time length obtained by the takeover setting unit 1324 as the initial value. Then, the image output control unit 1318 performs control so as to cause the image output unit 1320 to display the connection time length measured by the participation time measurement unit 1322.

Moreover, the takeover setting unit 1324 outputs the screen layout included in the takeover information, to the image output control unit 1318. Receiving the screen layout from the takeover setting unit 1324, the image output control unit 1318 performs control so as to cause the image output unit 1320 to display the data according to this screen layout.

Furthermore, the takeover setting unit 1324 outputs the connected-site information included in the takeover information, to the connected-site management unit 1313. Receiving the connected-site information from the takeover setting unit 1324, the connected-site management unit 1313 updates the information on the connected sites with which the video conferencing communication is established.

Next, the site E starts the video conferencing communication with each of the other sites (S1807).

In this way, the site E takes over the settings of the site A and starts the video conferencing communication.

More specifically, the image coding unit 1304 and the audio coding unit 1305 perform the coding operations under the control of the coding control unit 1303 which is configured as in the case of the site A. The multiplexing unit 1306 multiplexes the coded video and audio streams received from the image coding unit 1304 and the audio coding unit 1305 into an RTP packet. The output packet storage unit 1307 stores the RTP packet. The network sending unit 1311 sends the stored RTP packet to the sites B, C, and D.

Also, the network receiving unit 1312 receives the data on the video conference from the sites B, C, and D. The input packet storage unit 1314 stores the received data as RTP packets. The demultiplexing unit 1315 separates the stored RTP packet into the coded video and audio streams.

Then, the image decoding unit 1316 and the audio decoding unit 1317 decode the coded streams, respectively. The image output control unit 1318 and the audio output control unit 1319 perform controls, respectively, so as to cause the image output unit 1320 and the audio output unit 1321 to output the decoded data.

In this way, the site E continues the video conferencing communication with the sites with which the site A was having the video conference. Here, since the takeover setting unit 1324 reflects the settings at the site A in the site E, the site E can establish the video conferencing communication according to the same settings used at the site A.

FIG. 18 is a diagram showing a data structure of the RTP packet in the first embodiment shown in FIG. 1. As shown in FIG. 18, the RTP packet includes an RTP header and an RTP payload which is the coded data.

The RTP header includes: a version (V) indicating RTP version information; padding (P) indicating the presence or absence of padding data, an extension header (X) indicating the presence or absence of the extension header; a marker (M) indicating a start or resumption of the communication; a payload type (PT) indicating a type of the coded data to be transferred; a sequence number indicating a number of the RTP packet in the sequence; a timestamp indicating a playback timing; a synchronization source (SSRC) identifier representing a source that transfers the RTP packet; contributing source (CSRC) identifiers for identifying streams when multiple streams are sent together; and an extension header describing information required depending on the payload type.

Each of the video conferencing apparatuses 1100, 1200, 1300, and 1400 uses the RTP packet shown in FIG. 18 for processing the moving image data.

Figure 19:
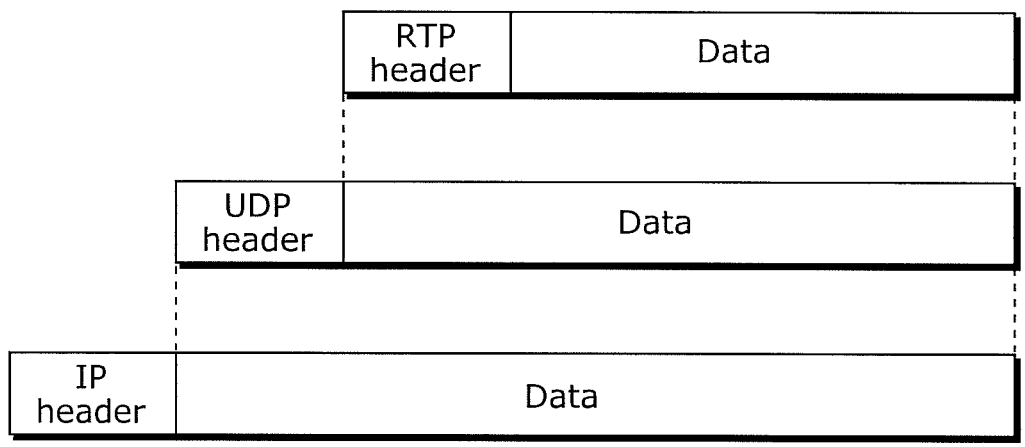
[FIG. 19]

FIG. 19 is a diagram showing a data structure of an IP packet into which the RTP packet has been encapsulated, in the first embodiment shown in FIG. 1.

The RTP packet includes the RTP header and the coded data. The UDP packet includes the RTP packet as data, and also includes a UDP header. The IP packet includes the UDP packet as data, and also includes an IP header.

Each of the video conferencing apparatuses 1100, 1200, 1300, and 1400 uses the IP packet shown in FIG. 19 for establishing the video conferencing communication.

FIG. 20 is a diagram showing an example of the data structure of the takeover information in the first embodiment shown in FIG. 1.

The takeover information shown in FIG. 20 includes transfer information which indicates whether the transfer is necessary or unnecessary. When the transfer information indicates that the transfer is necessary, the takeover information includes an address of a transfer destination. Also, the takeover information includes the number of connected sites to which the taken-over site has been connected and the screen layout having been used at the taken-over site.

Moreover, the takeover information includes the IP addresses of the sites to which the taken-over site has been connected. Furthermore, the takeover information includes the resolutions, bit rates, and frame rates corresponding to the sites to which the taken-over site has been connected. Also, the takeover information includes the connection time length which is a time length of participating in the video conference, for example.

Moreover, when the taken-over site has been using a memory card or an electronic file, for example, the takeover information may include shared information which indicates information on the memory card or the electronic file. Furthermore, when the taken-over site has been playing back the moving image data using the memory card or the electronic file, the takeover information may include a length of playback time indicating a length for which the playback has been performed.

Also, the takeover information may include zoom information on an image displayed by the video conferencing apparatus 1100. With this, an image displayed by the video conferencing apparatus 1300 is zoomed in the same manner as the image displayed by the video conferencing apparatus 1100.

FIG. 21 is a diagram showing an example of the data structure of the takeover information in the case where the transfer is necessary.

The takeover information shown in FIG. 21 includes the transfer information indicating that the transfer is necessary. Also, the takeover information includes the address of the transfer destination.

As is the case with the takeover information shown in FIG. 20, the takeover information shown in FIG. 21 includes the number of the connected sites and the screen layout.

Also, as is the case with the takeover information shown in FIG. 20, the takeover information shown in FIG. 21 includes the IP addresses, resolutions, bit rates, frame rates, and connection time length.

Moreover, as is the case with the takeover information shown in FIG. 20, the takeover information shown in FIG. 21 may include the shared information and the playback time length.

FIG. 22 is a diagram showing an example of the data structure of the takeover information in the case where the transfer is unnecessary.

The takeover information shown in FIG. 22 includes the transfer information indicating that the transfer is unnecessary.

As is the case with the takeover information shown in FIG. 20, the takeover information shown in FIG. 22 includes the number of the connected sites and the screen layout.

Also, as is the case with the takeover information shown in FIG. 20, the takeover information shown in FIG. 22 includes the IP addresses, resolutions, bit rates, frame rates, and connection time length.

Moreover, as is the case with the takeover information shown in FIG. 20, the takeover information shown in FIG. 22 may include the shared information and the playback time length.

FIG. 23 is a diagram showing an example of the data structure of the server information in the first embodiment.

The server information shown in FIG. 23 includes a server information type representing a connected-site change or a server change.

When the server information type represents the connected-site change, the server information includes the addresses of the taken-over site and taking-over site. Also, the server information may include a validity period for the takeover.

On the other hand, when the server information type represents the server change, the server information includes a connected-site change classification indicating change or no change in the connected sites. When the connected-site change classification indicates the change in the connected sites, the server information includes the addresses of the taken-over site and taking-over site. Moreover, the server information may include the takeover validity period.

When the server information type represents the server change, the server information also includes the addresses of the connected sites.

It should be noted that the server information may be used as the connected-site change notice which notifies about the takeover.

FIG. 24 is a diagram showing an example of the data structure of the server information that indicates the connected-site change.

The server information shown in FIG. 24 includes the server information type representing the connected-site change.

The server information includes the addresses of the taken-over site and taking-over site. Moreover, the server information may include the takeover validity period.

FIG. 25 is a diagram showing an example of the data structure of the server information that indicates the server change.

The server information shown in FIG. 25 includes the server information type representing the server change.

The server information includes the connected-site change classification indicating the change in the connected sites. Also, the server information includes the addresses of the taken-over site and taking-over site. Moreover, the server information may include the takeover validity period.

Furthermore, the server information includes the addresses of the connected sites.

FIG. 26 is a diagram showing a takeover selection screen at the site A in the first embodiment shown in FIG. 1. The video conferencing apparatus 1100 at the site A that is shown in FIG. 3 displays the takeover selection screen shown in FIG. 26.

To be more specific, when the input unit 1108 receives an input of the takeover request, the takeover information generation unit 1109 causes the image output unit 1120 to display the takeover selection screen shown in FIG. 26 via the image output control unit 1118.

As shown in the takeover selection screen in FIG. 26, the image output unit 1120 displays the IP address of the site A which is the taken-over site. Then, the input unit 1108 receives the input of the IP address of the site E which is the taking-over site.

Moreover, the image output unit 1120 displays a confirmation message on the takeover selection screen to confirm whether the takeover processing is to be performed or not. Then, the input unit 1108 receives an input as to whether to perform the takeover processing or not.

Accordingly, the input unit 1108 receives the input of the takeover request from the user.

FIG. 27 is a diagram showing a display screen at the site B during the takeover processing in the first embodiment shown in FIG. 1. The video conferencing apparatus 1200 at the site B that is shown in FIG. 4 displays the screen shown in FIG. 27.

To be more specific, the takeover-display setting unit 1223 of the video conferencing apparatus 1200 at the site B receives the connected-site change notice from the connected-site management unit 1213. Then, the takeover-display setting unit 1223 displays "In the process of takeover" in the display region having shown the image of the site A which is the taken-over site, via the image output control unit 1218 and the image output unit 1220.

Each of the video conferencing apparatuses 1400 at the sites C and D displays the same screen as shown in FIG. 27, according to the connected-site change. It should be noted that the sites B, C, and D may display the screens using different screen layouts.

FIG. 28 is a diagram showing a display screen at the site B after the takeover is completed, in the first embodiment. When the video conferencing communication with the site E which is the taking-over site becomes available after the screen shown in FIG. 27 is displayed according to the connected-site change, the video conferencing apparatus 1200 at the site B that is shown in FIG. 4 displays the screen shown in FIG. 28. It should be noted that each of the video conferencing apparatuses 1400 at the sites C and D displays the same screen as shown in FIG. 28. Also note that the sites B, C, and D may display the screens using different screen layouts.

Figure 29:
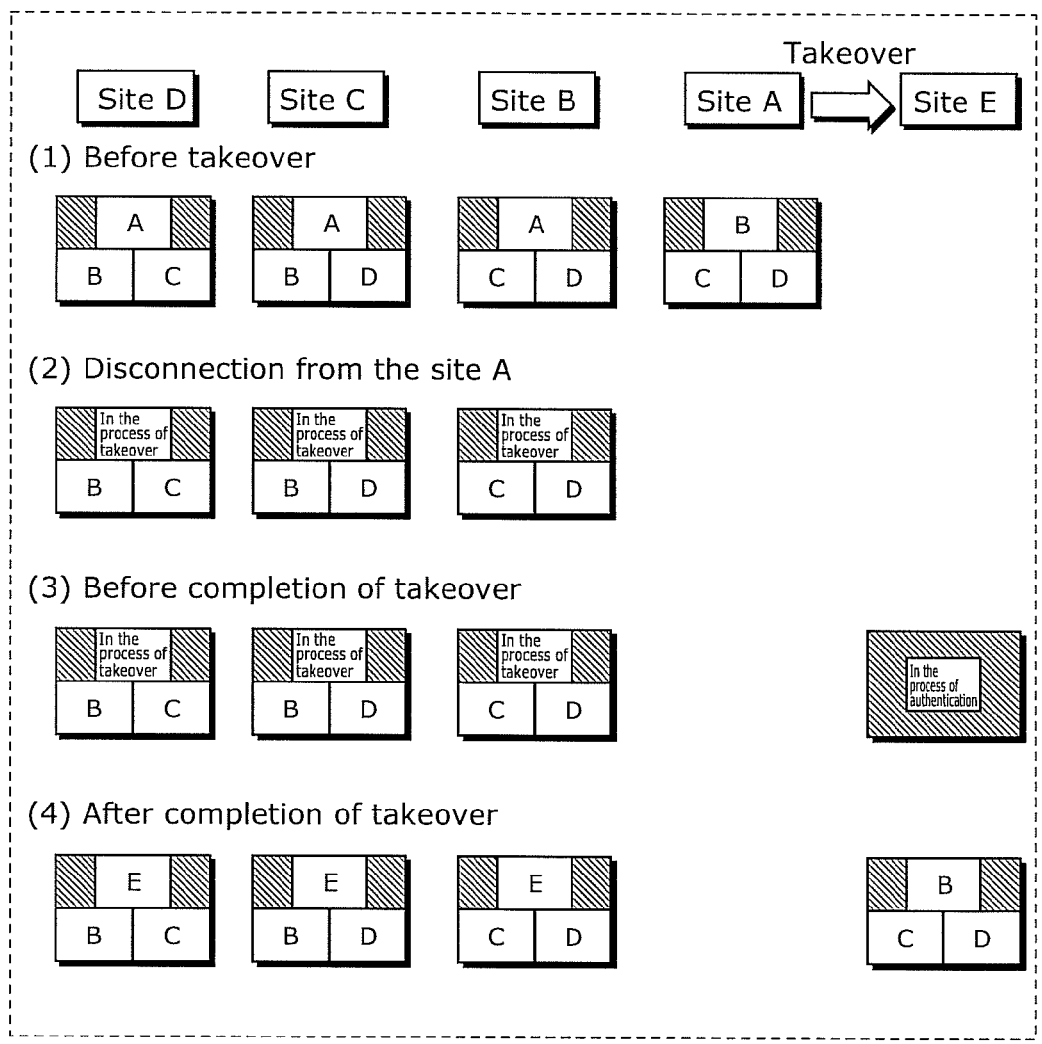
[FIG. 29]

FIG. 29 is a diagram showing transitions of the display screen in the first embodiment. Phases (1) to (4) shown in FIG. 29 correspond respectively to phases (1) to (4) shown in FIGS. 7, 8, 10, and 11.

Firstly, before the takeover processing is performed, each screen at the sites displays the sites other than its own site.

Next, when the site A is disconnected, each screen at the sites B, C, and D displays "In the process of takeover" in the display region having shown the site A.

Then, when the site E is about to participate in the video conference, the screen of the site E displays "In the process of authentication".

Next, the site E is approved and thus the screen having been displayed at the site A is displayed at the site E. Also, the site E is displayed in the display region having shown the site A, at the sites B, C, and D.

Accordingly, after the takeover from the site A to the site E is completed, the image of the site E is displayed at the sites B, C, and D in the display region having shown the image of the site A. Here, the site E takes over the screen layout used at the site A.

Figure 30:
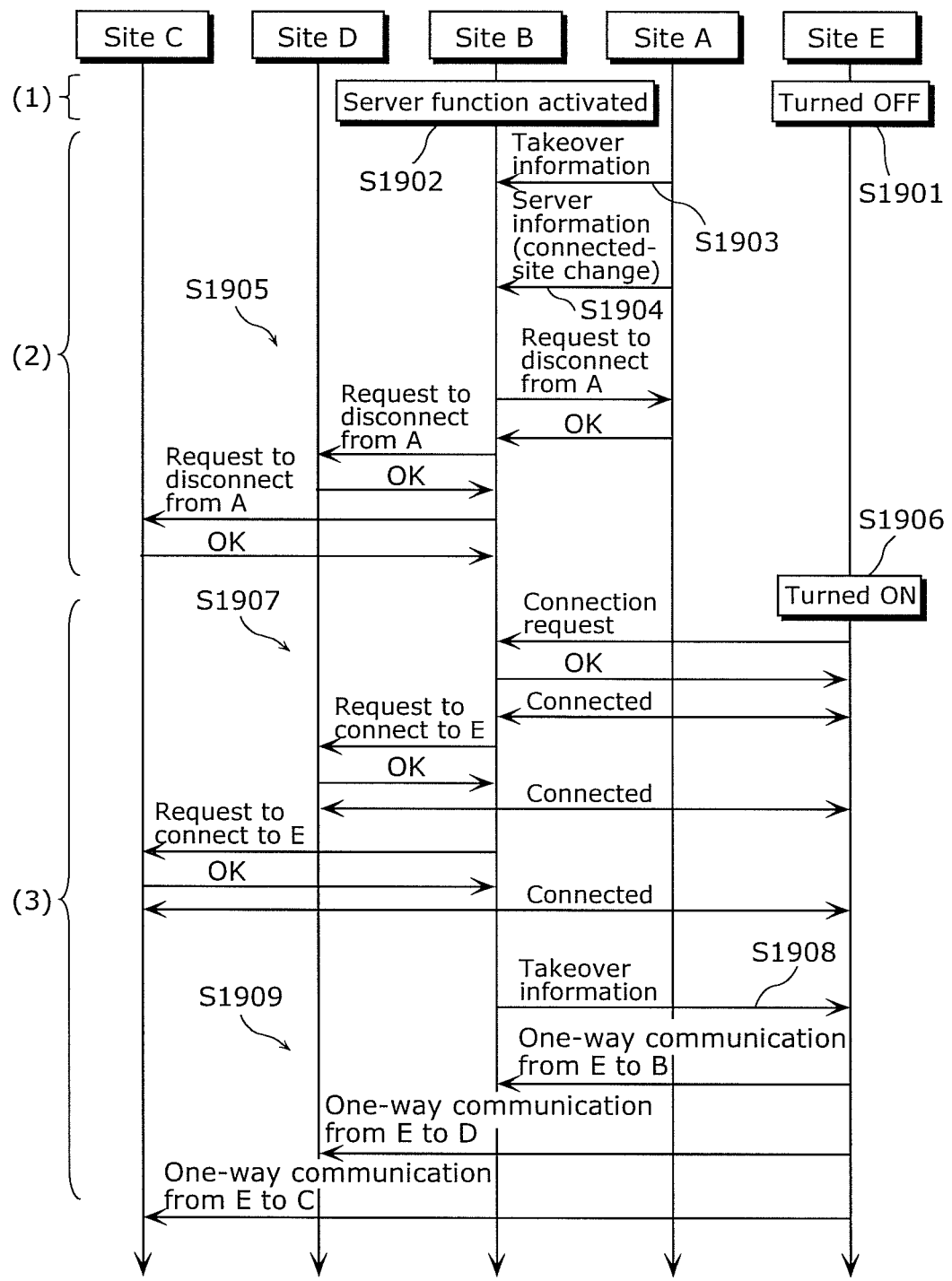
[FIG. 30]
Figure 31:
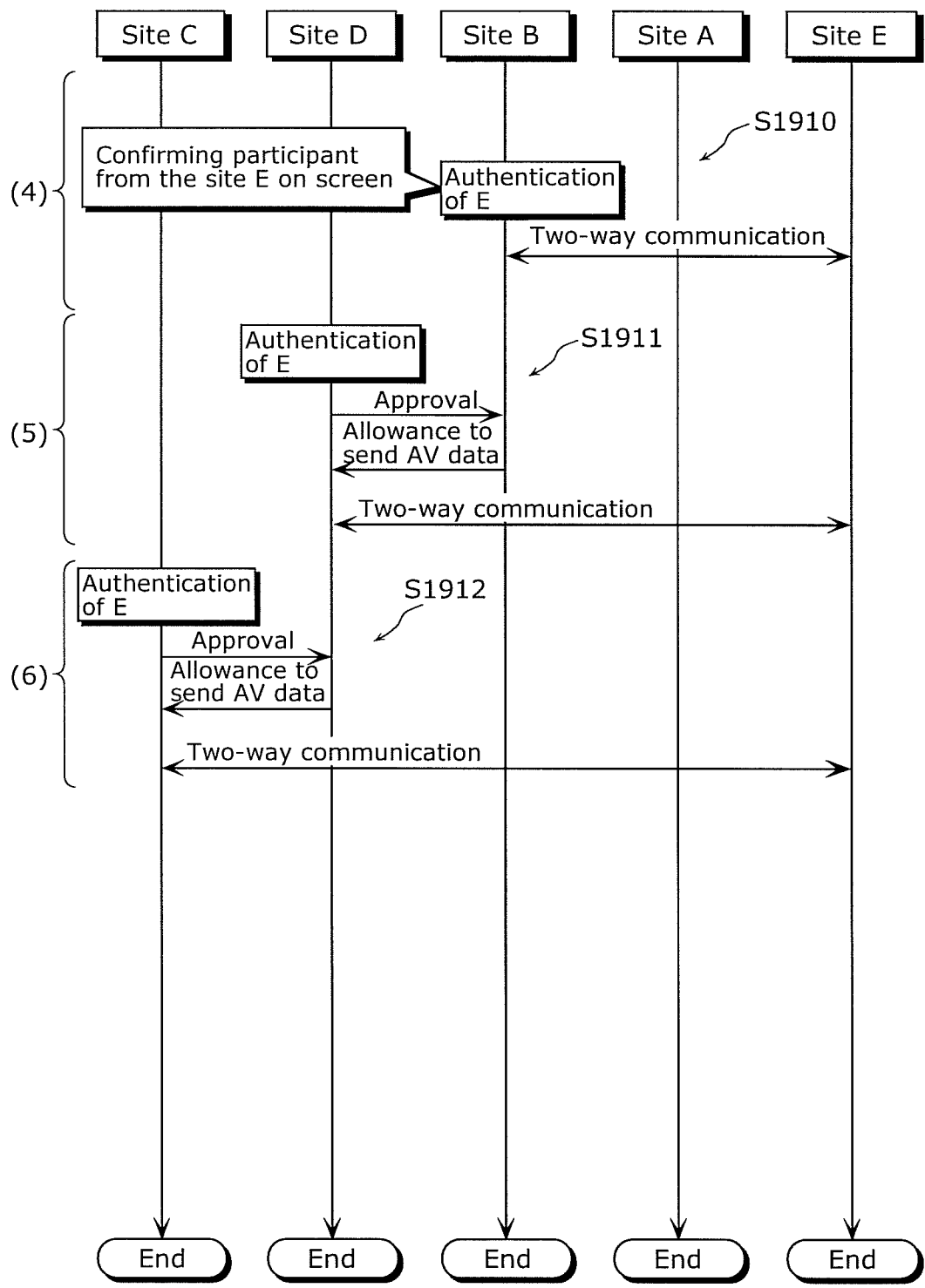
[FIG. 31]

FIGS. 30 and 31 are sequence diagrams showing takeover processing performed in a modification of the first embodiment.

The takeover processing shown in FIGS. 30 and 31 is performed on the assumption that the site E is in the OFF state (S1901) and that the server function of the site B is being activated (S1902) as in the case of FIG. 8. The example shown in FIGS. 30 and 31 is different from the example shown in FIG. 8 in that the authentication processing is changed.

Firstly, the site A sends the takeover information to the site B (S1903).

Next, the site A sends the server information indicating the connected-site change to the site B (S1904).

Then, the site B sends a disconnection request to each of the other sites in order to disconnect each of the other sites from the site A which is the taken-over source (S1905). As a result, the connection with the site A is terminated.

Next, the site E is turned on (S1906).

Following this, the site E sends a connection request to the site B. The site B thus establishes connection with the site E, and sends a connection request to each of the sites C and D to establish connection with the site E. As a result, each of the sites C and D establishes connection with the site E (S1907). When sending the connection request to the sites C and D to establish connections with the site E, the site B notifies the sites C and D to limit the data transfer to the site E.

Then, the site B sends the takeover information to the site E (S1908).

Next, the site E sends the audio and video data of the site E to the sites B, C, and D. However, the sites B, C, and D do not send their audio and video data to the site E. That is, the communication is in only one direction from the site E to the sites B, C, and D (S1909). Here, each of the sites B, C, and D may send a black screen with no audio as a substitute for the audio and video data of its own site.

Following this, the user at the site B performs authentication of the participation of the site E in the video conference by confirming the participant from the site E on the screen.

Then, the user at the site B enters the authentication information. After approving the participation of the site E in the video conference, the site B sends the audio and video data of the site B to the site E. This enables two-way communication between the sites B and E (S1910).

To be more specific, the image output unit 1220 of the video conferencing apparatus 1200 at the site B displays the video having been captured by the video conferencing apparatus 1300 of the site E before the video conferencing apparatus 1300 was authenticated. Then, the authentication information input unit 1226 of the video conferencing apparatus 1200 receives the input of the authentication information on the video conferencing apparatus 1300. After the authentication information is received, the network sending unit 1211 of the video conferencing apparatus 1200 sends the video captured by the video conferencing apparatus 1200 to the video conferencing apparatus 1300.

Next, the user at the site D performs authentication of the participation of the site E in the video conference by confirming the participant from the site E on the screen. Then, the user at the site D enters the authentication information. After approving the participation of the site E in the video conference, the site D sends the authentication information to the site B which is the server. The site B sends, to the site D, a notice of allowance to send the audio and video data. In response to this, the site D sends the audio and video data of the site D to the site E. This enables two-way communication between the sites D and E (S1911).

To be more specific, the image output unit 1420 of the video conferencing apparatus 1400 at the site D displays the video having been captured by the video conferencing apparatus 1300 of the site E before the video conferencing apparatus 1300 was authenticated. Then, the authentication information input unit 1426 of the video conferencing apparatus 1400 receives the input of the authentication information on the video conferencing apparatus 1300. After the authentication information is received, the network sending unit 1411 of the video conferencing apparatus 1400 sends the video captured by the video conferencing apparatus 1400 to the video conferencing apparatus 1300.

As is the case with the site D, the site C also starts the two-way communication with the site E after approving the site E.

Figure 32:
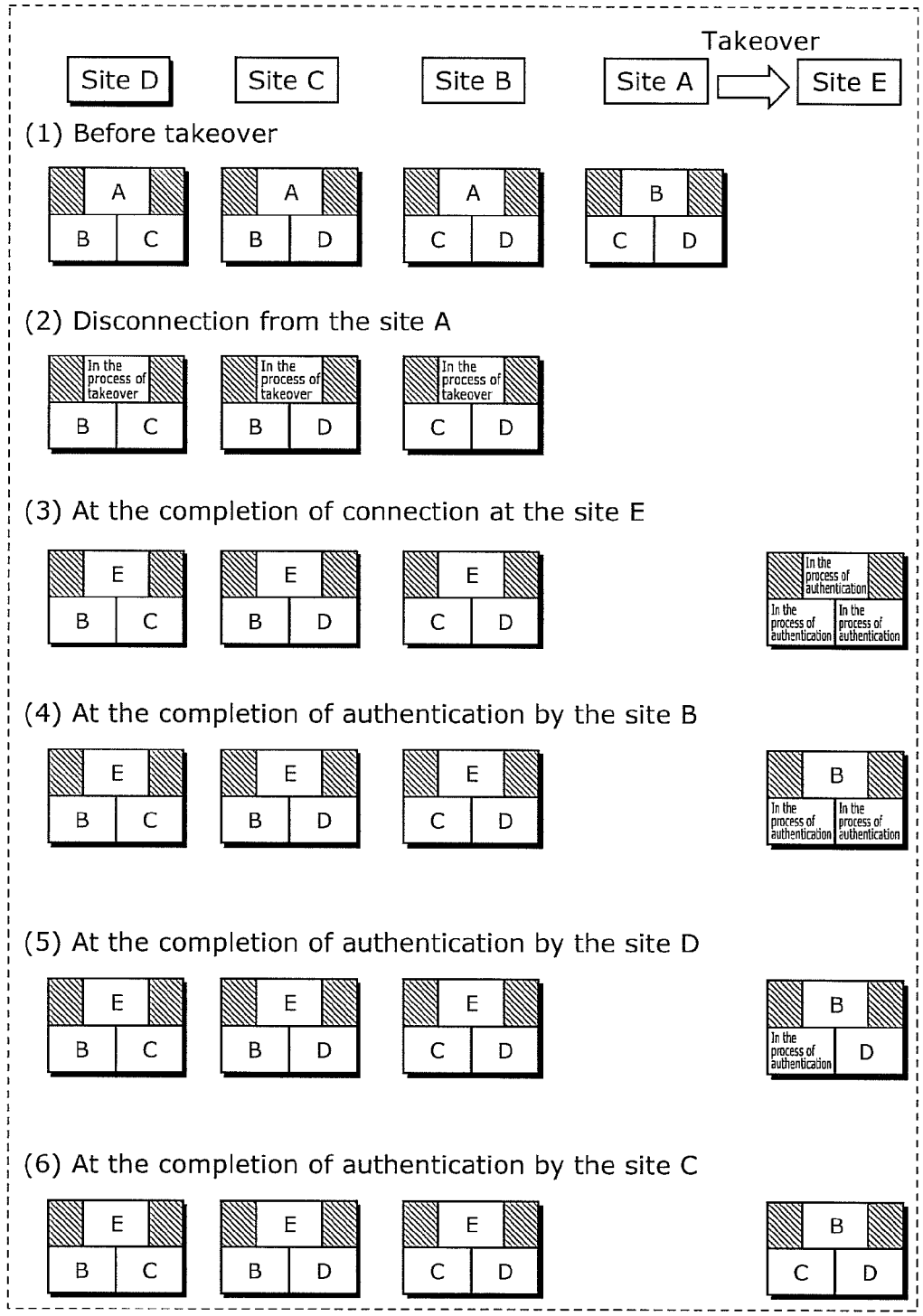
[FIG. 32]

FIG. 32 is a diagram showing transitions of the display screen in the modification of the first embodiment that is shown in FIGS. 30 and 31. Phases (1) to (6) shown in FIG. 32 correspond respectively to phases (1) to (6) shown in FIGS. 30 and 31.

Firstly, before the takeover processing is performed, each screen at the sites displays the sites other than its own site.

Next, when the site A is disconnected, each screen at the sites B, C, and D displays "In the process of takeover" in the display region having shown the site A.

After the site E establishes communications with the sites B, C, and D, the screen of the site E displays "In the process of authentication". Each screen at the sites B, C, and D displays the image of the site E in the region having shown the image of the site A.

Next, the site B approves the site E, and thus the site E displays the image of the site B in the display region having shown the image of the site B at the site A before the takeover processing was performed.

Following this, the site D approves the site E, and thus the site E displays the image of the site D in the display region having shown the image of the site D at the site A before the takeover processing was performed.

Then, the site C approves the site E, and thus the site E displays the image of the site C in the display region having shown the image of the site C at the site A before the takeover processing was performed.

As described above, the example shown in FIGS. 30, 31, and 32, the participation is authenticated after the participant or the like from the site E is confirmed. This ensures the security.

It should be noted that the site B may perform authentication of the site E on behalf of the sites B, C, and D. For example, after approving the site E, the site B sends, to the site C, a notice of allowance to send the audio and video data. Thus, after the participation of the site E is approved by the site B, the network sending unit 1411 of the site C sends the video captured at the site C to the site E. More specifically, after being approved by the site B in a collective manner, the site E can establish the two-way video conferencing communication with each of the other sites.

According to the first embodiment as described above, the site A which is the taken-over site sends the takeover information to the site E which is the taking-over site, so that the site E is connected to the video conferencing system. With this, the video conferencing system in the first embodiment can perform the takeover processing while maintaining the state of the video conference having proceeded thus far.

Even when the site A operates as the server, the video conference can be continued since the site B can take over the server function. Moreover, the site A sends the connected-site change notice, and each of the sites receiving this notice accordingly reflects the connected-site change. Therefore, even in the case of the video conferencing system which requires authentication of participation, the video conference can be continued.

Also, the site E which is the taking-over site can start the coding processing, using the coding method determined at the site A depending on the connection status. This can save the user of the video conferencing system the trouble of adjusting the coding method according to the connection status.

Moreover, the site E which is the taking-over site can maintain the screen layout used at the site A which is the taken-over site. On this account, without having to change the screen layout due to reconnection, the site E can continue the video conference in the same condition as in the case of the site A.

Furthermore, each of the sites B, C, and D which continue to participate in the video conference displays the site E which is the taking-over site in the display region for the site A which is the taken-over site. This allows the participants to be displayed always in the same respective display regions. Accordingly, the video conference can be continued without the necessity of changing the screen layout.

The IP address is used as a typical example of the information indicating the address of the connection destination. However, a MAC (Media Access Control) address may be used. Using such address information, the connected-site management unit may perform authentication of the participation in the video conference. Also, instead of the address information, information identifying the video conferencing apparatus may be used. For example, an identifier, such as a serial number, that uniquely identifies the video conferencing apparatus may be used as the information identifying the video conferencing apparatus.

Moreover, the takeover information may be transferred via a recording medium such as a memory card, without using the network. Also in this case, the takeover information which is the configuration information can be maintained even when the taking-over site is in the OFF state.

Furthermore, the takeover information may be used not only for performing the takeover processing, but also for maintaining the configuration information. That is, the takeover information is not limited to be used at the site E which is the taking-over site. For example, suppose a case where the user participating in the video conference at the site A temporarily leaves the video conference, and then participates in the video conference at the site A again. In such a case, the takeover information may be used at the site A.

Also, the takeover information may include ON-OFF information on an OSD (On-Screen Display), in addition to the example shown in FIG. 20. Moreover, the takeover information may include image display positions, display sizes, and a display ratio of the sites, as the screen layout.

Moreover, each of the network sending or receiving units included in the video conferencing apparatuses may be replaced with a sending or receiving unit of a radio sending or receiving unit that establishes radio communication. In addition, each of the video conferencing apparatuses may establish the video conferencing communication and perform the takeover processing by radio.

Furthermore, when a physical screen characteristic of the video conferencing apparatus 1300 is the same as that of the video conferencing apparatus 1100, the takeover setting unit 1324 of the video conferencing apparatus 1300 may set the screen layout of the video conferencing apparatus 1300 using the takeover information.

Here, the physical screen characteristic refers to a screen aspect ratio or a screen size, for example, that has an influence on the screen layout. In the case where such physical screen characteristics are different, the screen layout may not be the same before and after the takeover processing. On the other hand, when the physical screen characteristics are the same, the screen layout can be taken over correctly. Whether or not the physical screen characteristics are the same may be determined by verifying, when the authentication is to be performed, whether the video conferencing apparatus of the taking-over site is compliant with the video conferencing apparatus of the taken-over site.

(Second Embodiment)

The following is a description of the second embodiment according to the present invention, with reference to the drawings.

Figure 33:
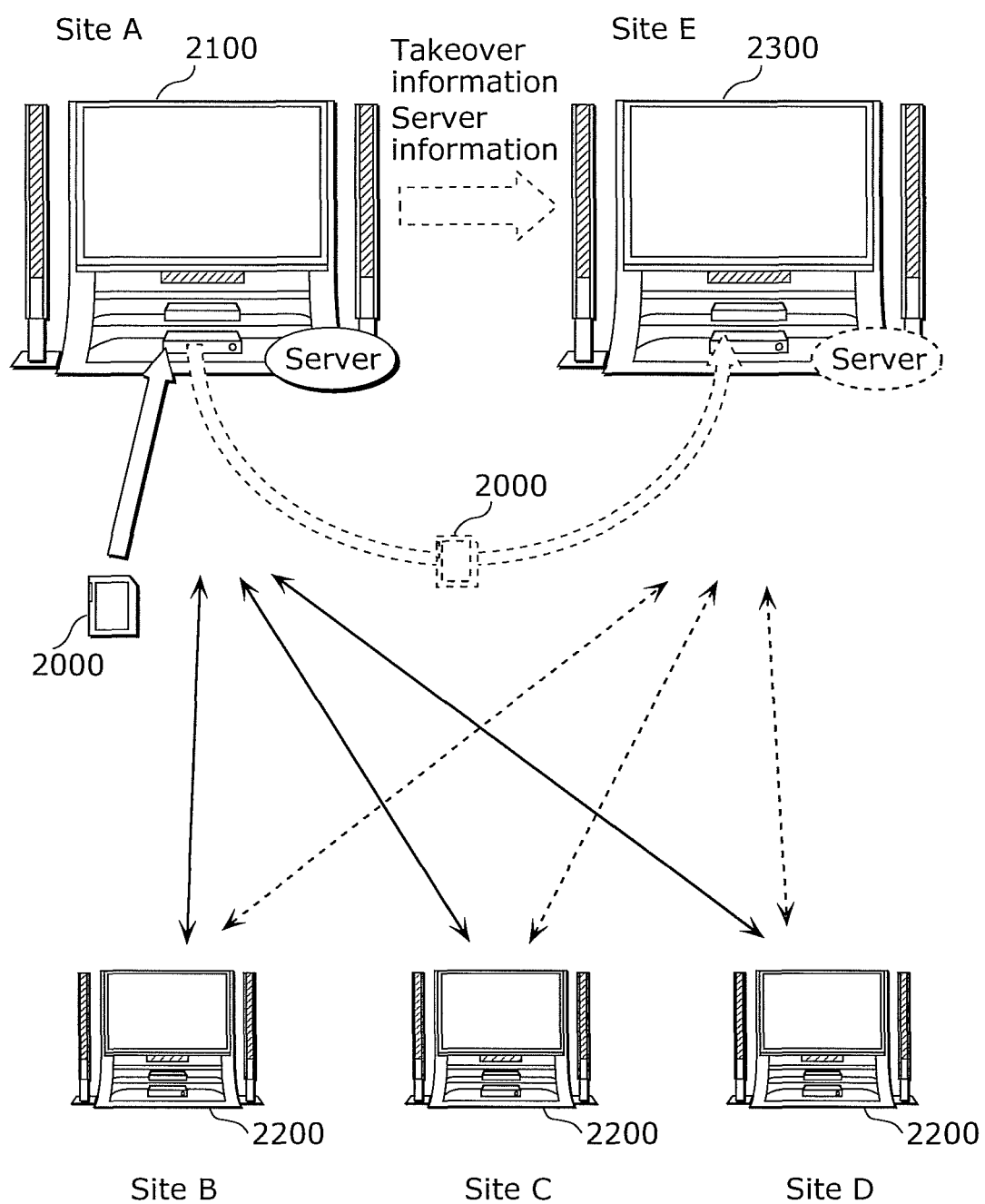
[FIG. 33]

FIG. 33 is a schematic diagram showing a video conferencing system in the second embodiment. FIG. 33 shows an example where a video conference is held among sites A, B, C, and D. As in the case of the first embodiment, the second embodiment assumes that a user who participates in the video conference at the site A leaves for the site E and then continues to participate in this video conference at the site E.

Moreover, the second embodiment assumes that the site A having a server function of managing authentication of participation additionally turns over this server function to the site E. Here, a memory card 2000 stores a football game "Tokyo vs. Osaka" as moving image data. Before the takeover is executed, the site A is playing back the moving image data stored in the memory card 2000. The site A is also distributing the moving image data to the sites B, C, and D. Football fans at the sites A, B, C, and D are exchanging views on the football game while watching the game together at the different sites.

As shown in FIG. 33, a video conferencing apparatus 2100 is placed in the site A. A video conferencing apparatus 2200 is placed in each of the sites B, C, and D. A video conferencing apparatus 2300 is placed in the site E.

The video conferencing apparatus 2100 of the site A turns over the settings and server function to the video conferencing apparatus 2300 of the site E, by sending takeover information and server information to the video conferencing apparatus 2300. Moreover, the memory card 2000 is moved from the video conferencing apparatus 2100 to the video conferencing apparatus 2300. Thus, the video conferencing system of the second embodiment continues the video conference.

Figure 34:
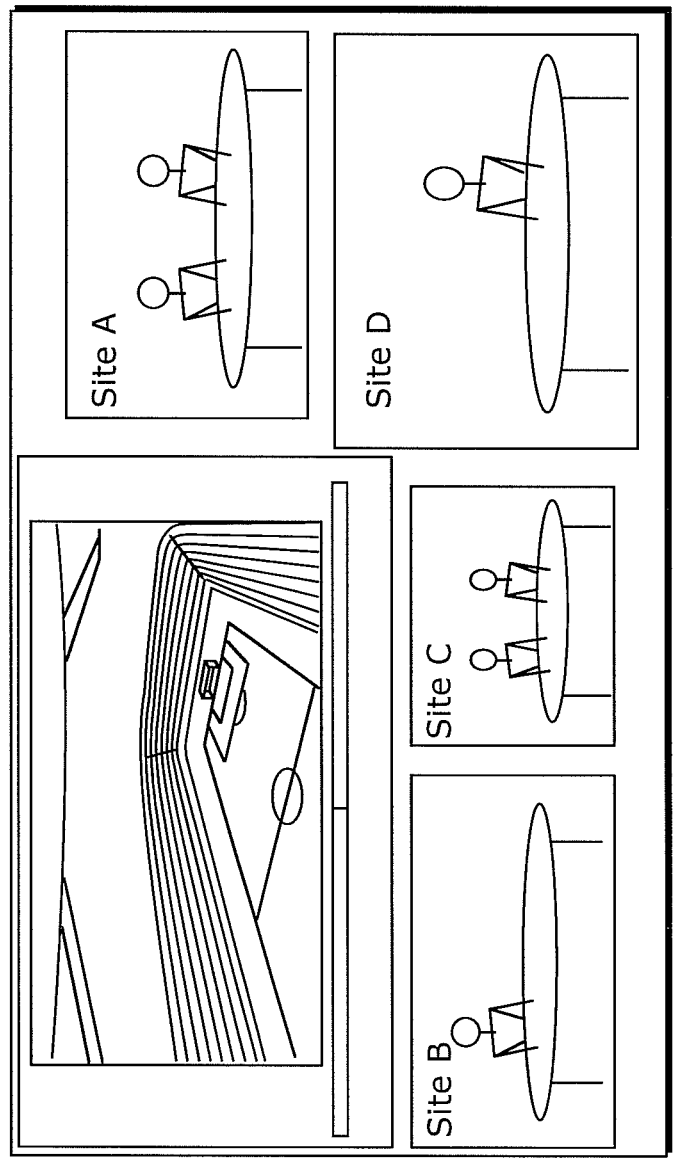
[FIG. 34]

FIG. 34 is a diagram showing a display screen at the site A before the takeover is executed, in the second embodiment shown in FIG. 33. The site A displays situations in the sites A, B, C, and D. The site A also displays the moving image data of the football game.

It should be noted that the sites B, C, and D may display the screens using the same screen layout used at the site A or may respectively display the screens using different screen layouts.

Figure 35:
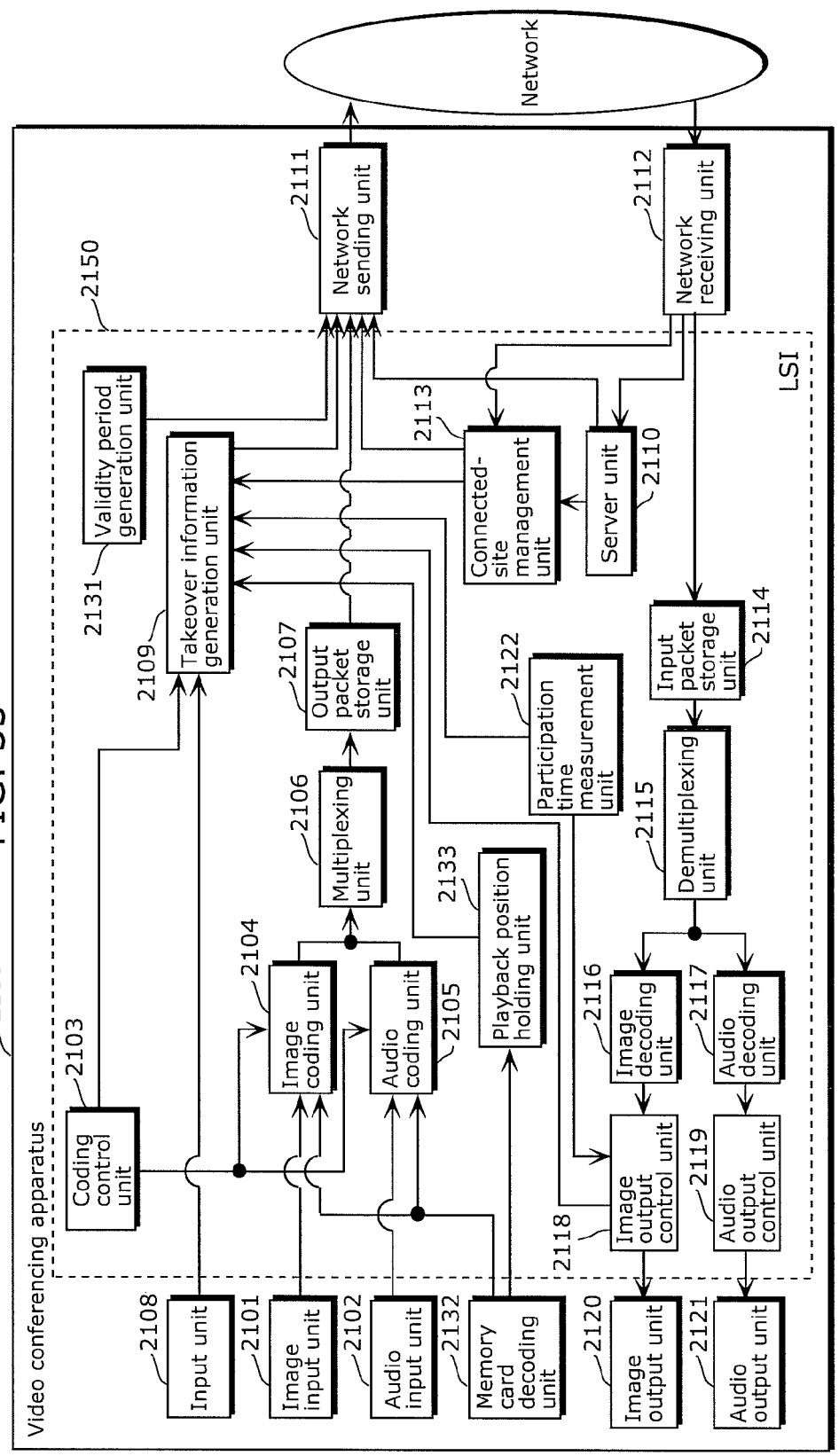
[FIG. 35]

FIG. 35 is a diagram showing a configuration of the video conferencing apparatus at the site A in the second embodiment shown in FIG. 33.

The video conferencing apparatus 2100 includes an image input unit 2101, an audio input unit 2102, a coding control unit 2103, an image coding unit 2104, an audio coding unit 2105, a multiplexing unit 2106, an output packet storage unit 2107, an input unit 2108, a takeover information generation unit 2109, a server unit 2110, a network sending unit 2111, a network receiving unit 2112, a connected-site management unit 2113, an input packet storage unit 2114, a demultiplexing unit 2115, an image decoding unit 2116, an audio decoding unit 2117, an image output control unit 2118, an audio output control unit 2119, the image output unit 2120, the audio output unit 2121, a participation time measurement unit 2122, a validity period generation unit 2131, a memory card decoding unit 2132, and a playback position holding unit 2133.

Note that the coding control unit 2103, the image coding unit 2104, the audio coding unit 2105, the multiplexing unit 2106, the output packet storage unit 2107, the takeover information generation unit 2109, the server unit 2110, the connected-site management unit 2113, the input packet storage unit 2114, the demultiplexing unit 2115, the image decoding unit 2116, the audio decoding unit 2117, the image output control unit 2118, the audio output control unit 2119, the participation time measurement unit 2122, the validity period generation unit 2131, and the playback position holding unit 2133 may be implemented as an LSI 2150.

The image input unit 2101, the audio input unit 2102, the coding control unit 2103, the image coding unit 2104, the audio coding unit 2105, the multiplexing unit 2106, the output packet storage unit 2107, the input unit 2108, the takeover information generation unit 2109, the server unit 2110, the network sending unit 2111, the network receiving unit 2112, the connected-site management unit 2113, the input packet storage unit 2114, the demultiplexing unit 2115, the image decoding unit 2116, the audio decoding unit 2117, the image output control unit 2118, the audio output control unit 2119, the image output unit 2120, and the audio output unit 2121, and the participation time measurement unit 2122 included in the video conferencing apparatus 2100 perform the same operations that are performed, respectively, by the image input unit 1101, the audio input unit 1102, the coding control unit 1103, the image coding unit 1104, the audio coding unit 1105, the multiplexing unit 1106, the output packet storage unit 1107, the input unit 1108, the takeover information generation unit 1109, the server unit 1110, the network sending unit 1111, the network receiving unit 1112, the connected-site management unit 1113, the input packet storage unit 1114, the demultiplexing unit 1115, the image decoding unit 1116, the audio decoding unit 1117, the image output control unit 1118, the audio output control unit 1119, the image output unit 1120, the audio output unit 1121, and the participation time measurement unit 1122 included in the video conferencing apparatus 1100 shown in FIG. 3 in the first embodiment.

When the takeover information generation unit 2109 generates the takeover information, the validity period generation unit 2131 generates a validity period for the takeover of the video conference and notifies the site E, which is the taking-over site, of the validity period via the network sending unit 2111.

The memory card decoding unit 2132 reads the data stored in the memory card 2000, and performs decoding according to a compression format of the data. Out of the decoded data, the memory card decoding unit 2132 outputs the decoded video data to the image coding unit 2104 and the decoded audio data to the audio coding unit 2105. Also, the memory card decoding unit 2132 outputs a playback position to the playback position holding unit 2133.

The playback position holding unit 2133 holds the playback position of the data decoded by the memory card decoding unit 2132. Also, the playback position holding unit 2133 outputs the playback position to the takeover information generation unit 2109.

The image coding unit 2104 performs coding on, for example, the input video signal obtained by the image input unit 2101 and the video data obtained by the memory card decoding unit 2132, according to MPEG-4 AVC/H.264 on the basis of a coding condition set by the coding control unit 2103. Then, the image coding unit 2104 outputs a coded video stream.

The audio coding unit 2105 performs coding on, for example, the input audio signal obtained by the audio input unit 2102 and the audio data obtained by the memory card decoding unit 2132, according to MPEG-4 AAC-LD on the basis of a coding condition set by the coding control unit 2103. Then, the audio coding unit 2105 outputs a coded audio stream.

Figure 36:
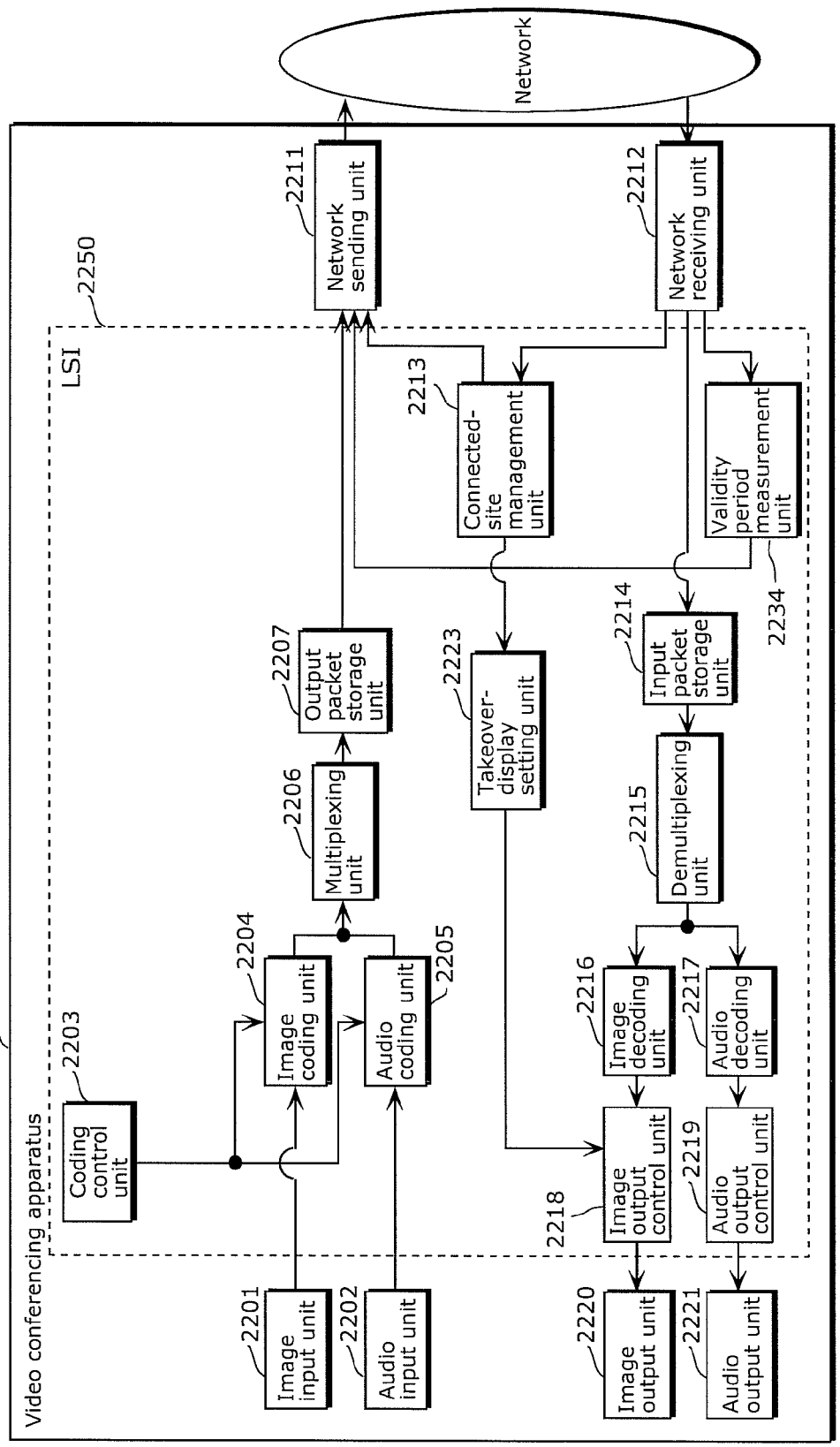
[FIG. 36]

FIG. 36 is a diagram showing a configuration of the video conferencing apparatus at each of the sites B, C, and D in the second embodiment shown in FIG. 33.

The video conferencing apparatus 2200 includes an image input unit 2201, an audio input unit 2202, a coding control unit 2203, an image coding unit 2204, an audio coding unit 2205, a multiplexing unit 2206, an output packet storage unit 2207, a network sending unit 2211, a network receiving unit 2212, a connected-site management unit 2213, an input packet storage unit 2214, a demultiplexing unit 2215, an image decoding unit 2216, an audio decoding unit 2217, an image output control unit 2218, an audio output control unit 2219, an image output unit 2220, an audio output unit 2221, a takeover-display setting unit 2223, and a validity period measurement unit 2234.

Note that the coding control unit 2203, the image coding unit 2204, the audio coding unit 2205, the multiplexing unit 2206, the output packet storage unit 2207, the connected-site management unit 2213, the input packet storage unit 2214, the demultiplexing unit 2215, the image decoding unit 2216, the audio decoding unit 2217, the image output control unit 2218, the audio output control unit 2219, the takeover-display setting unit 2223, and the validity period measurement unit 2234 may be implemented as an LSI 2250.

The image input unit 2201, the audio input unit 2202, the coding control unit 2203, the image coding unit 2204, the audio coding unit 2205, the multiplexing unit 2206, the output packet storage unit 2207, the network sending unit 2211, the network receiving unit 2212, the connected-site management unit 2213, the input packet storage unit 2214, the demultiplexing unit 2215, the image decoding unit 2216, the audio decoding unit 2217, the image output control unit 2218, the audio output control unit 2219, the image output unit 2220, and the audio output unit 2221, and the takeover-display setting unit 2223 included in the video conferencing apparatus 2200 perform the same operations that are performed, respectively, by the image input unit 1401, the audio input unit 1402, the coding control unit 1403, the image coding unit 1404, the audio coding unit 1405, the multiplexing unit 1406, the output packet storage unit 1407, the network sending unit 1411, the network receiving unit 1412, the connected-site management unit 1413, the input packet storage unit 1414, the demultiplexing unit 1415, the image decoding unit 1416, the audio decoding unit 1417, the image output control unit 1418, the audio output control unit 1419, the image output unit 1420, the audio output unit 1421, and the takeover-display setting unit 1423 included in the video conferencing apparatus 1400 shown in FIG. 6 in the first embodiment.

The validity period measurement unit 2234 measures the validity period, based on the validity period received by the network receiving unit 2212 from the site A. When the video conference with the site E is not started within the validity period, the validity period measurement unit 2234 determines that the video conferencing communication with the site E is invalid.

Figure 37:
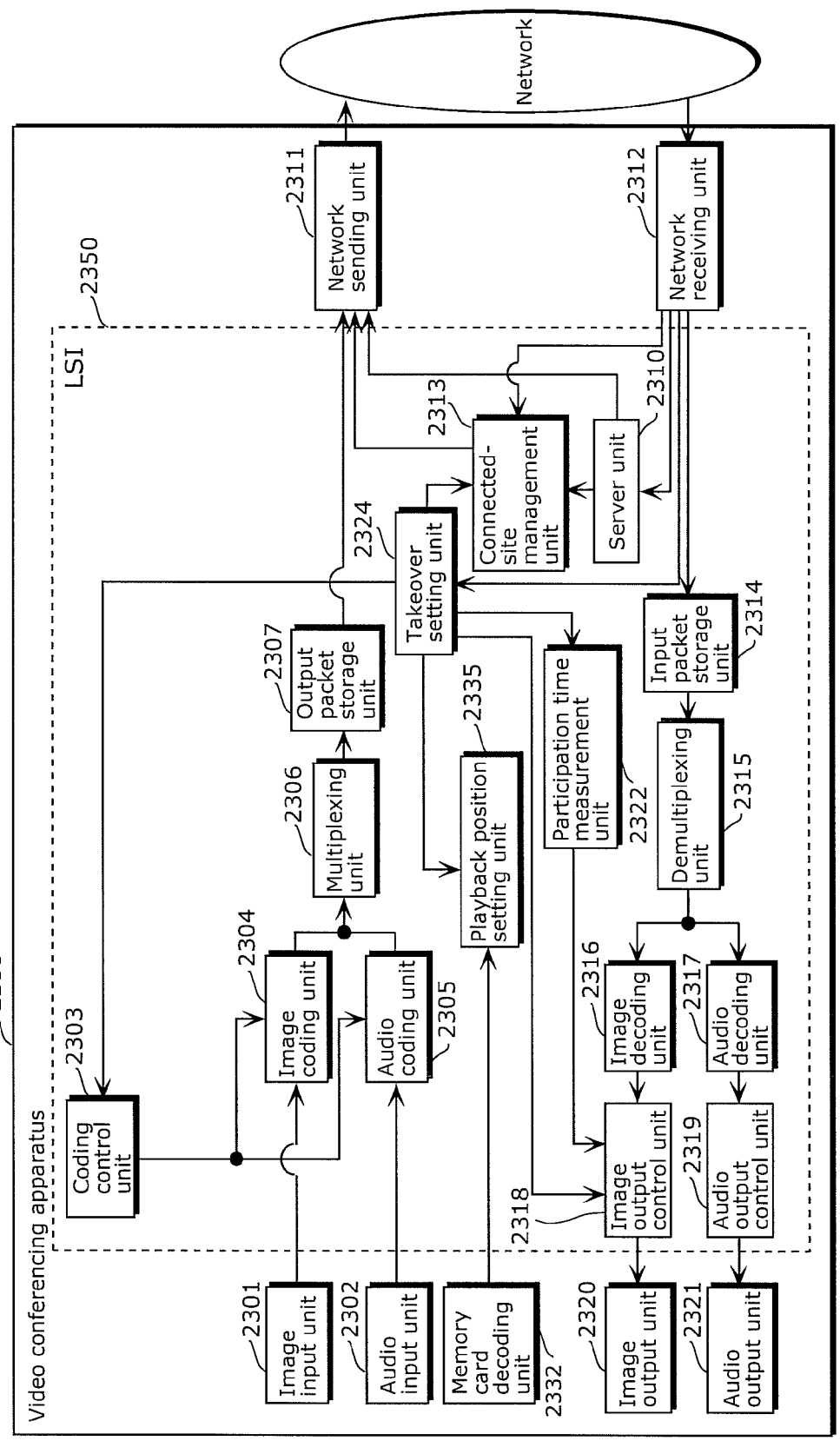
[FIG. 37]

FIG. 37 is a diagram showing a configuration of the video conferencing apparatus at the site E in the second embodiment shown in FIG. 33.

The video conferencing apparatus 2300 includes an image input unit 2301, an audio input unit 2302, a coding control unit 2303, an image coding unit 2304, an audio coding unit 2305, a multiplexing unit 2306, an output packet storage unit 2307, a server unit 2310, a network sending unit 2311, a network receiving unit 2312, a connected-site management unit 2313, an input packet storage unit 2314, a demultiplexing unit 2315, an image decoding unit 2316, an audio decoding unit 2317, an image output control unit 2318, an audio output control unit 2319, an image output unit 2320, an audio output unit 2321, a participation time measurement unit 2322, a takeover setting unit 2324, a memory card decoding unit 2332, and a playback position setting unit 2335.

Note that the coding control unit 2303, the image coding unit 2304, the audio coding unit 2305, the multiplexing unit 2306, the output packet storage unit 2307, the server unit 2310, the connected-site management unit 2313, the input packet storage unit 2314, the demultiplexing unit 2315, the image decoding unit 2316, the audio decoding unit 2317, the image output control unit 2318, the audio output control unit 2319, the participation time measurement unit 2322, the takeover setting unit 2324, and the playback position setting unit 2335 may be implemented as an LSI 2350.

The image input unit 2301, the audio input unit 2302, the coding control unit 2303, the image coding unit 2304, the audio coding unit 2305, the multiplexing unit 2306, the output packet storage unit 2307, the network sending unit 2311, the network receiving unit 2312, the connected-site management unit 2313, the input packet storage unit 2314, the demultiplexing unit 2315, the image decoding unit 2316, the audio decoding unit 2317, the image output control unit 2318, the audio output control unit 2319, the image output unit 2320, and the audio output unit 2321, the participation time measurement unit 2322, and the takeover setting unit 2324 included in the video conferencing apparatus 2300 perform the same operations that are performed, respectively, by the image input unit 1301, the audio input unit 1302, the coding control unit 1303, the image coding unit 1304, the audio coding unit 1305, the multiplexing unit 1306, the output packet storage unit 1307, the network sending unit 1311, the network receiving unit 1312, the connected-site management unit 1313, the input packet storage unit 1314, the demultiplexing unit 1315, the image decoding unit 1316, the audio decoding unit 1317, the image output control unit 1318, the audio output control unit 1319, the image output unit 1320, the audio output unit 1321, the participation time measurement unit 1322, and the takeover setting unit 1324 included in the video conferencing apparatus 1300 shown in FIG. 5 in the first embodiment.

The server unit 2310 performs the same operation that is performed by the server unit 1210 of the video conferencing apparatus 1200 in the first embodiment shown in FIG. 4.

The memory card decoding unit 2332 performs the same operation that is performed by the memory card decoding unit 2132 of the video conferencing apparatus 2100 shown in FIG. 35.

The takeover setting unit 2324 extracts the playback position from the takeover information, and outputs the extracted playback position to the playback position setting unit 2335.

Then, the playback position setting unit 2335 notifies the memory card decoding unit 2332 of this playback position.

The memory card decoding unit 2332 starts decoding the moving image data stored in the memory card 2000 from the playback position notified by the playback position setting unit 2335.

Next, a takeover operation performed by the video conferencing apparatuses configured as described thus far is explained.

As in the case of the first embodiment, the second embodiment assumes that the sites A, B, C, and D are holding a video conference. Also, the second embodiment assumes that the site A is operating as the server.

Moreover, the site A shares the data stored in the memory card 2000 with the sites B, C, and D. Thus, the memory card decoding unit 2132 decodes the data stored in the memory card 2000, and sends the decoded data to the sites B, C, and D via the network sending unit 2111 and so forth. Here, the playback position holding unit 2133 holds the playback position obtained by the memory card decoding unit 2132.

Furthermore, the site A receives an instruction from the input unit 2108 to adjust the display operation of the image output unit 2120 so that a display region for the site D having a football fan who is well versed in football games is set to be larger than those of the other sites, as can seen from the screen shown in FIG. 34. With this, the screen is displayed in the layout that suits preferences of the user at the site A.

Figure 38:
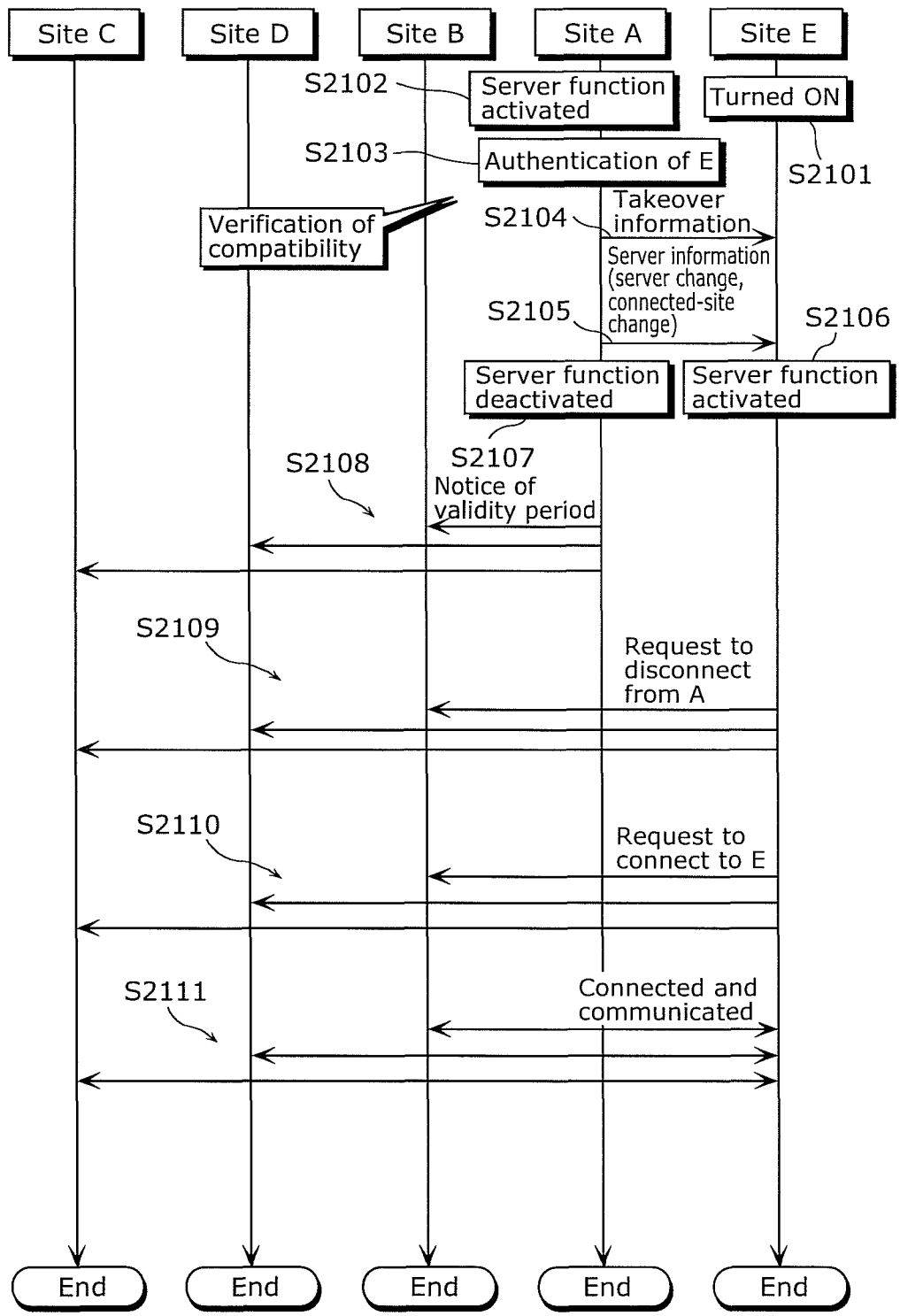
[FIG. 38]

FIG. 38 is a sequence diagram showing takeover processing performed in the second embodiment shown in FIG. 33. The second embodiment assumes that the site E is in the ON state (S2101) and that the server function of the site A is being activated (S2102).

Firstly, the site A receives designation of the taking-over site. Then, the site A performs authentication of the site E which is the taking-over site. Here, the site A performs the authentication of the site E by verifying whether the video conferencing apparatus 2300 of the site E is compatible with the video conferencing apparatus 2100 of the site A. Also, the site A may perform the authentication of the site E by verifying whether a physical screen characteristic of the video conferencing apparatus 2300 is the same as that of the video conferencing apparatus 2100.

Next, the site A sends the takeover information to the site E (S2104).

Following this, the site A sends the server information indicating the server change and connected-site change, to the site E (S2105).

Then, the server function of the site E is activated (S2106).

Next, the server function of the site A is deactivated (S2107).

Following this, the site A notifies the sites B, C, and D of the validity period (S2108).

Then, the site E sends a disconnection request to the sites B, C, and D to disconnect from the site A (S2109). As a result, the connection with the site A is terminated.

Next, the site E sends a connection request to the sites B, C, and D to connect to the site E (S2110). As a result, each of the sites B, C, and D establishes connection with the site E and thus starts communication with the site E (S2111).

In this way, even when operating as the server, the site A can turn over the operation as the server to the site E and also turn over the operation as the site included in the video conferencing system to the site E.

Figure 39:
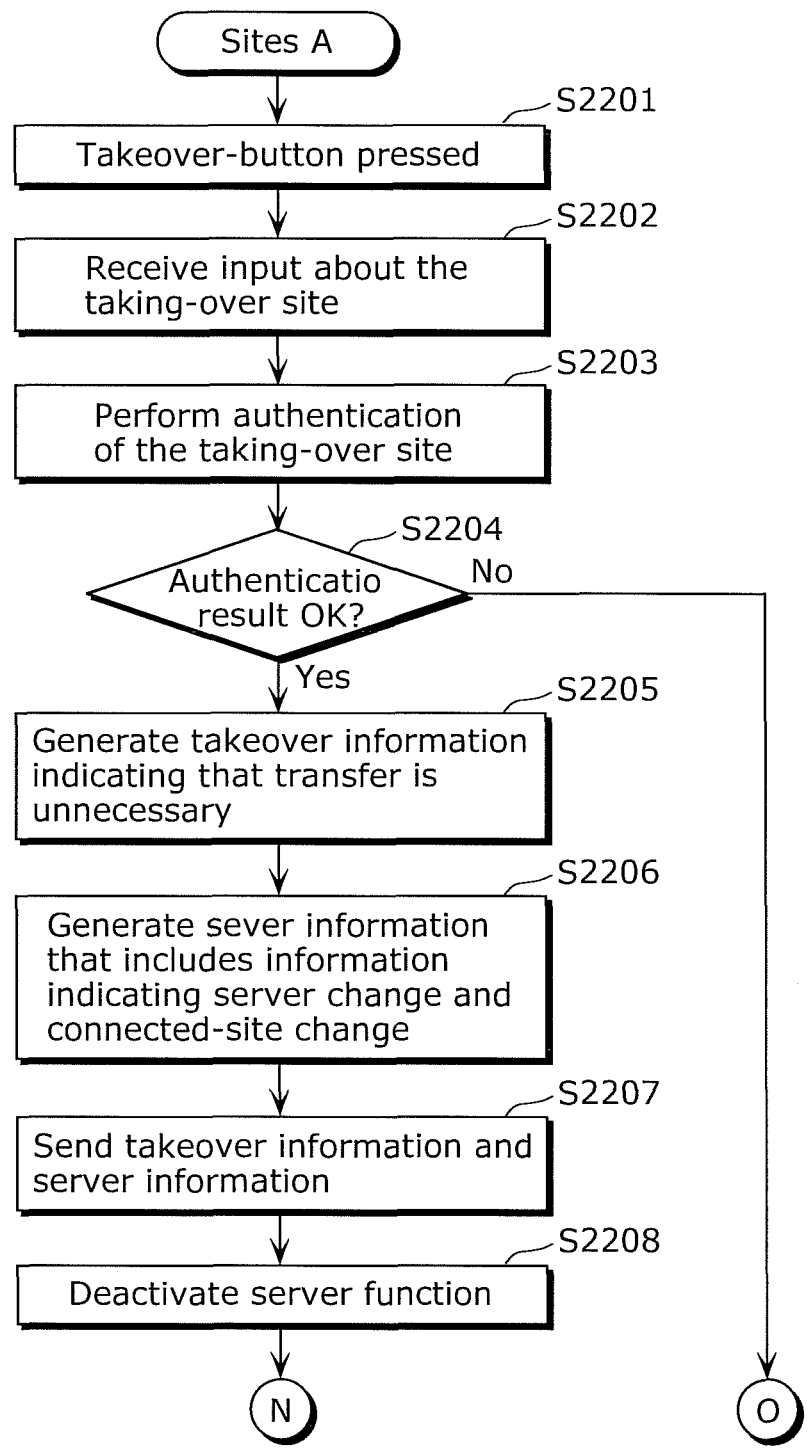
[FIG. 39]
Figure 40:
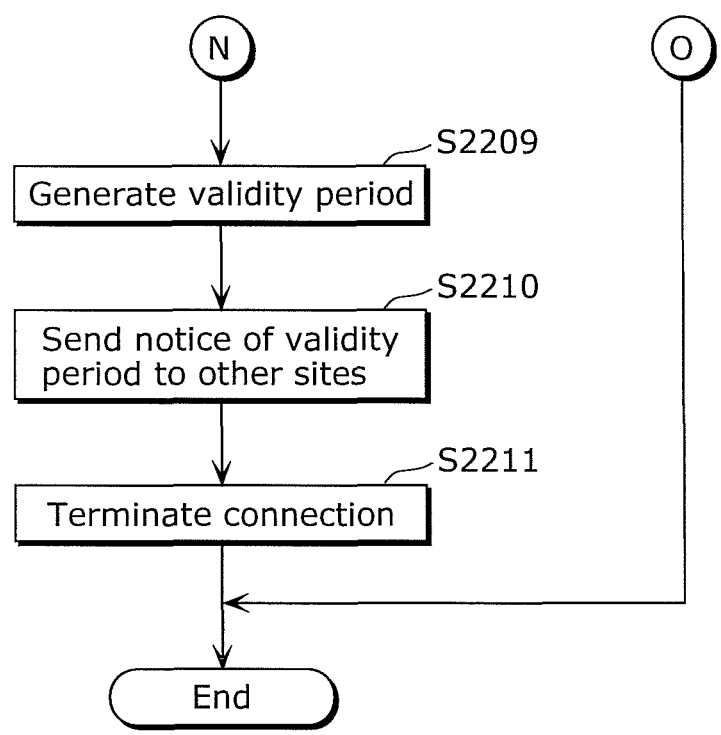
[FIG. 40]

FIGS. 39 and 40 are flowcharts showing processing performed at the site A in the second embodiment shown in FIG. 33.

Firstly, at the site A which is in the video conference, the input unit 2108 receives a button press indicating a takeover of the video conference (S2201).

Next, the image output control unit 2118 performs control so as to cause the image output unit 2120 to display the screen shown in FIG. 26. The input unit 2108 receives an input of the IP address of the site E, which is the taking-over site, in order to turn over the video conference to the site E (S2202). Also, the image output control unit 2118 receives a selection whether to perform the takeover processing. Then, the image output control unit 2118 notifies the takeover information generation unit 2109 of the received information.

Following this, the server unit 2110 performs authentication of the participation of the site E which is the taking-over site (S2203). Here, the server unit 2110 performs the authentication of the participation of the site E, which is the taking-over site, by verifying whether the video conferencing apparatus 2100 of the site A and the video conferencing apparatus 2300 of the site E are compatible with each other, for example. When the participation of the site E is not approved normally (No in S2204), the site A terminates the processing.

When the participation of the site E is approved normally (Yes in S2204), the takeover information generation unit 2109 generates the takeover information indicating that the transfer is unnecessary as shown in FIG. 22 (S2205).

Here, the takeover information generation unit 2109 generates the takeover information shown in FIG. 22 on the basis of: the IP addresses of the sites B, C, and D managed by the connected-site management unit 2113; the connection time length measured by the participation time measurement unit 2122; and the screen layout controlled by the image output control unit 2118. The takeover information generated in the second embodiment includes shared information on the memory card 2000 and the file having been played back. Also, the takeover information includes the playback time length.

Next, the takeover information generation unit 2109 generates the server information that includes information indicating the server change and connected-site change as shown in FIG. 25 (S2206).

Following this, the takeover information generation unit 2109 sends the generated takeover information and server information to the site E via the network sending unit 2111 (S2207).

Then, the takeover information generation unit 2109 deactivates the server function of the site A (S2208). In other words, the server unit 2110 is deactivated.

Next, the validity period generation unit 2131 generates the validity period for the takeover of the video conference (S2209). Here, the takeover information generation unit 2109 may include the validity period generated by the validity period generation unit 2131 in the server information, as in the case of the server information shown in FIG. 25.

Following this, the network sending unit 2111 sends a notice of the validity period generated by the validity period generation unit 2131, to the sites B, C, and D to which the site A has been connected (S2210).

Then, the site A disconnects from these sites (S2211).

In this way, the site A sends the takeover information and then terminates the video conferencing communication with the sites B, C, and D.

After this, the user removes the memory card 2000 from the memory card decoding unit 2132, and leaves for the site E.

Figure 41:
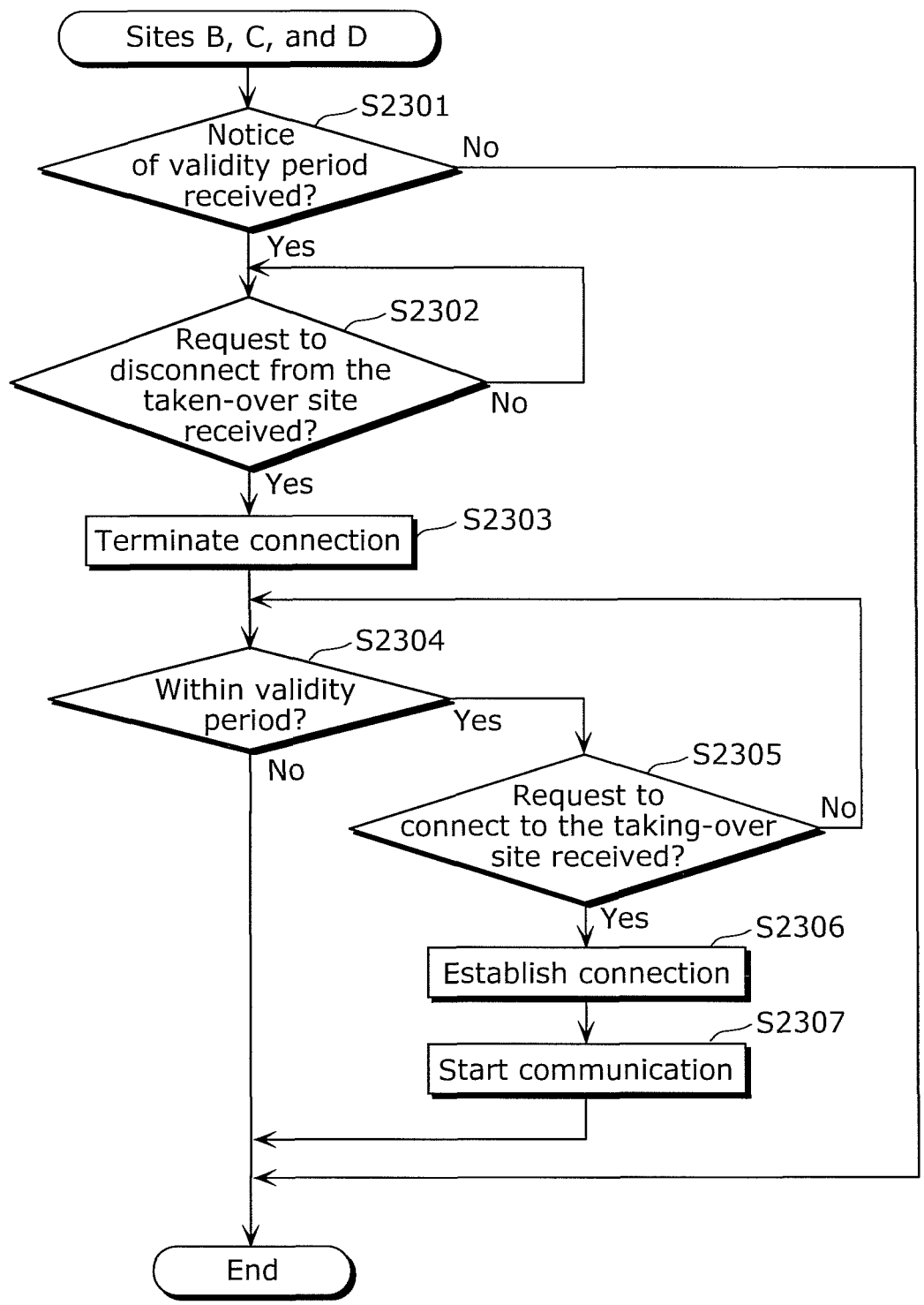
[FIG. 41]

FIG. 41 is a flowchart showing processing performed at each of the sites B, C, and D in the second embodiment shown in FIG. 33.

Firstly, the network receiving unit 2212 determines whether or not the validity period notice has been received (S2301).

Here, when the network receiving unit 2212 has not received the validity period notice (No in S2301), the processing is terminated.

On the other hand, when receiving the validity period notice (Yes in S2301), the network receiving unit 2212 receives, from the site E which is the taking-over site, a disconnection request to disconnect from the site A which is the taken-over site (S2302). Then, each of the sites B, C, and D disconnects from the site A (S2303). Moreover, the network receiving unit 2212 notifies the validity period measurement unit 2234 of the validity period.

Next, the validity period measurement unit 2234 determines whether or not the elapsed time is within the validity period (S2304). When the elapsed time exceeds the validity period (No in S2304), the processing at each of the sites B, C, and D is terminated.

When the elapsed time is within the validity period (Yes in S2304), the network receiving unit 2212 determines whether or not the connection request has been received from the site E, which is the taking-over site (S2305). When the network receiving unit 2212 has not received the connection request (No in S2305), the validity period measurement unit 2234 determines again whether or not the elapsed time is within the validity period (S2304).

When receiving the connection request from the site E (Yes in S2305), each of the sites B, C, and D establishes connection with the site E (S2306).

Then, each of the sites B, C, and D starts video conferencing communication with the site E which is the taking-over site (S2307).

In this way, each of the sites B, C, and D changes the connected site from the site A to the site E.

Figure 42:
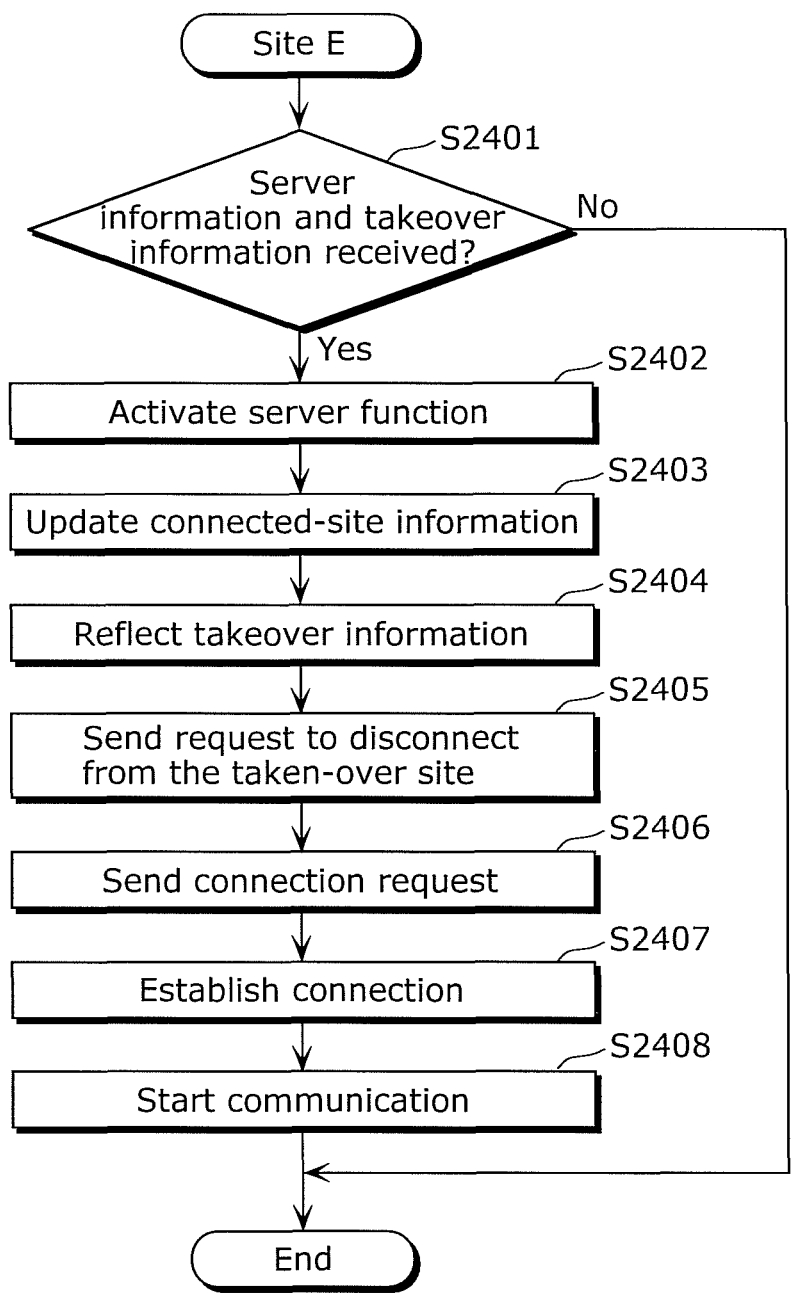
[FIG. 42]

FIG. 42 is a flowchart showing processing performed at the site E in the second embodiment shown in FIG. 33.

Firstly the network receiving unit 2312 determines whether or not the server information and takeover information have been received (S2401).

When the network receiving unit 2312 has not received the server information and takeover information (No in S2401), the processing at the site E is terminated.

On the other hand, when the network receiving unit 2312 receives the server information and takeover information (Yes in S2401), the server unit 2310 starts the operation as the server using the server information. In other words, the server function of the site E is activated (S2402).

Next, the server unit 2310 updates the managed connected-site information, using the server information (S2403).

Following this, the takeover setting unit 2324 configures the video conferencing apparatus 2300 on the basis of the takeover information received by the network receiving unit 2312 (S2404). The processing performed here is the same as the processing (S1806) performed at the site E as shown in FIG. 17 in the first embodiment.

In the second embodiment, the takeover setting unit 2324 further outputs, to the playback position setting unit 2335, the information, which is included in the takeover information, on the memory card 2000, file, and playback position. Then, after the memory card 2000 is inserted, the memory card decoding unit 2332 decodes the data stored in the memory card 2000 using the information, as the initial value, which is received by the playback position setting unit 2335.

Next, the server unit 2310 sends, to each of the other sites, the disconnection request to disconnect from the site A which is the taken-over site, via the network sending unit 2311 (S2405). Following this, the server unit 2310 sends, to each of the other sites, the connection request to connect to the site E, via the network sending unit 2311 (S2406). As a result, the site E establishes connections with each of the sites (S2407). Then, the site E starts the video conferencing communication with these sites (S2408).

In this way, the site E takes over the settings of the site A and starts the video conferencing communication.

Figure 43:
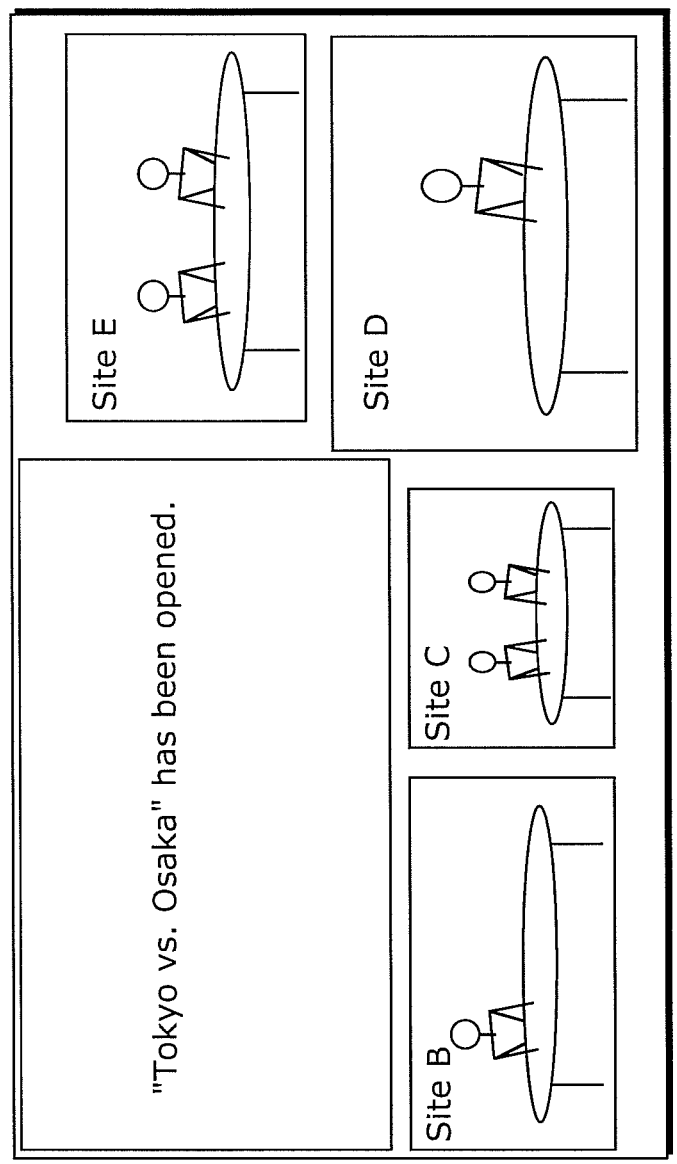
[FIG. 43]

FIG. 43 is a diagram showing a display screen at the site E immediately after the takeover is completed, in the second embodiment shown in FIG. 33.

When the playback position setting unit 2335 holds information on the recording medium, file, playback position, and the like, the image output unit 2320 may output these pieces of information. FIG. 43 shows an example where a file name "Tokyo vs. Osaka" is displayed.

Moreover, when the user inserts the memory card 2000 into the memory card decoding unit 2332 of the site E, the video conferencing apparatus 2300 of the site E plays back the data from the position at which the video conferencing apparatus 2100 of the site A stopped the playback, on the basis of the information on the recording medium, file, playback position, and the like held by the playback position setting unit 2335.

In this way, the site E continues the video conferencing communication with the sites with which the site A was having the video conference. Here, since the takeover setting unit 2324 reflects the settings at the site A in the site E, the site E can establish the video conferencing communication according to the same settings used at the site A.

The above description explains about the case where three or more sites are connected. However, in the case where two sites are connected, assuming that the taking-over and taken-over sites are the same one site, the state at the time of disconnection can be maintained.

Moreover, the above description explains about the example where the moving image data stored in the memory card 2000 is shared. However, in the cases of a still image or text file, a file name or file position can be taken over using the same units described above.

The validity period described in the second embodiment corresponds to the time limit described in the first embodiment. In other words, the validity period may be replaced by the time limit.

According to the second embodiment as described thus far, the site A which is the taken-over site sends the takeover information and server information to the site E which is the taking-over site. Also, the site A notifies the other sites of the validity period for the connection. Then, when the other sites establish connections with the site E within the validity period, the site E can take over the state of the video conference having proceeded thus far and the server function. Moreover, the site E can easily reproduce the information shared at the time of disconnection.

(Third Embodiment)

The following is a description of the third embodiment according to the present invention, with reference to the drawings.

Figure 44:
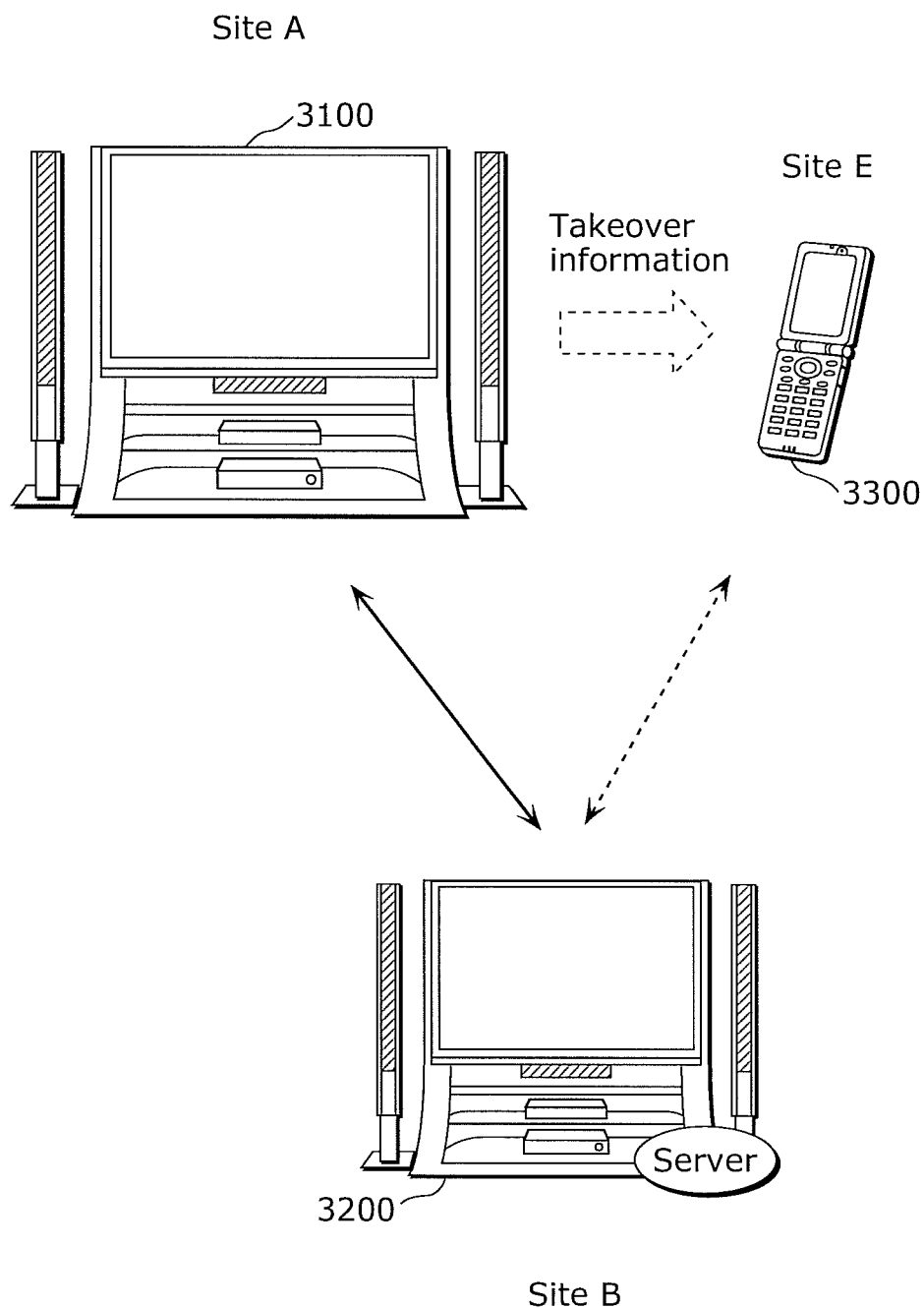
[FIG. 44]

FIG. 44 is a schematic diagram showing a video conferencing system in the third embodiment. FIG. 44 shows an example where a video conference is held between sites A and B. The third embodiment assumes that when a video conferencing apparatus 3100 of the site A is establishing video conferencing communication with a video conferencing apparatus 3200 of the site B having a server function of managing authentication of participation, a video conferencing apparatus 3300 of a site E takes over the video conferencing communication established by the video conferencing apparatus 3100 of the site A. The video conferencing apparatus 3300 is a mobile terminal.

Figure 45:
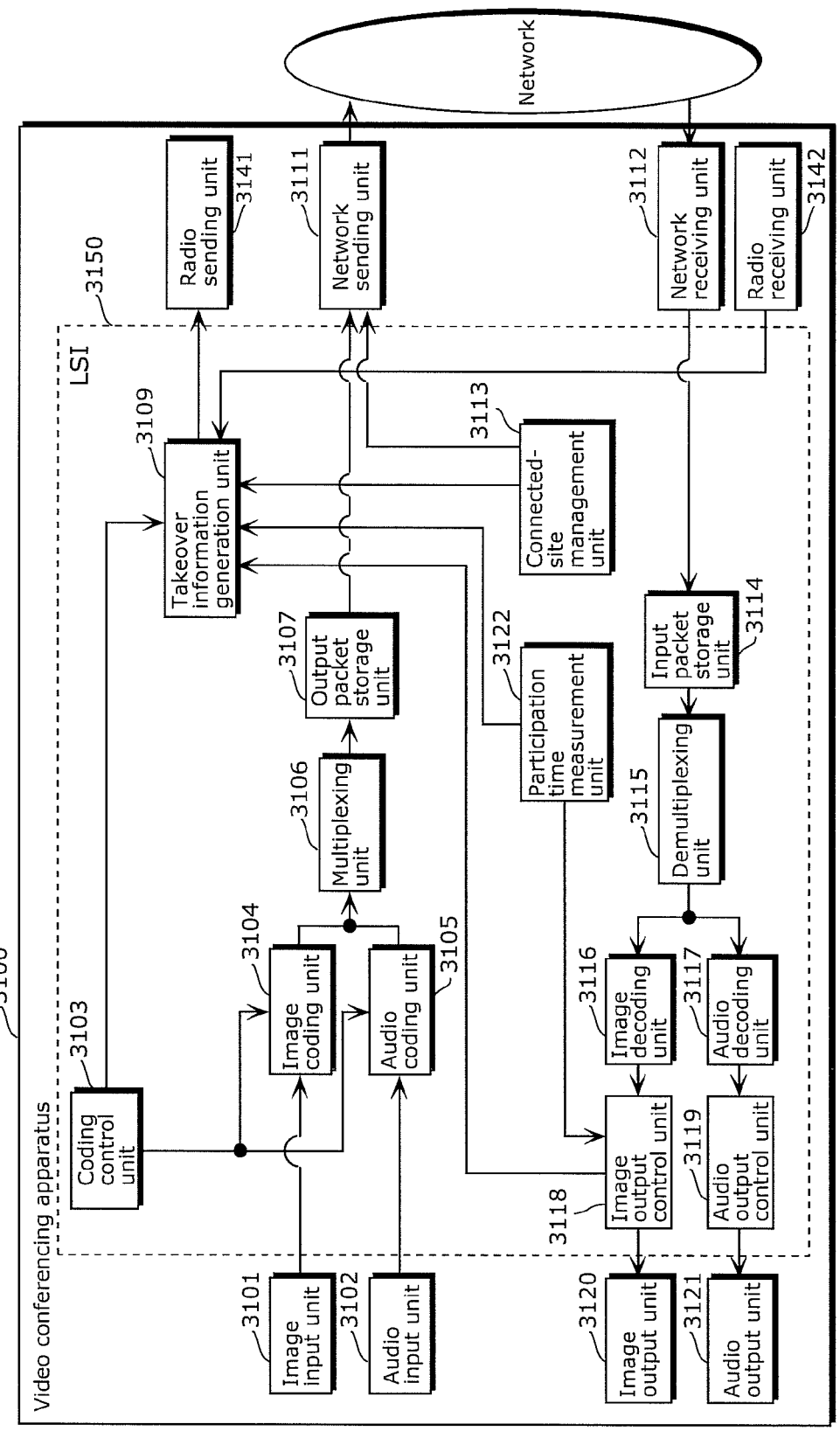
[FIG. 45]

FIG. 45 is a diagram showing a configuration of the video conferencing apparatus at the site A in the third embodiment shown in FIG. 44.

The video conferencing apparatus 3100 shown in FIG. 45 includes an image input unit 3101, an audio input unit 3102, a coding control unit 3103, an image coding unit 3104, an audio coding unit 3105, a multiplexing unit 3106, an output packet storage unit 3107, a takeover information generation unit 3109, a network sending unit 3111, a network receiving unit 3112, a connected-site management unit 3113, an input packet storage unit 3114, a demultiplexing unit 3115, an image decoding unit 3116, an audio decoding unit 3117, an image output control unit 3118, an audio output control unit 3119, the image output unit 3120, the audio output unit 3121, a participation time measurement unit 3122, a radio sending unit 3141, and a radio receiving unit 3142.

Note that the coding control unit 3103, the image coding unit 3104, the audio coding unit 3105, the multiplexing unit 3106, the output packet storage unit 3107, the takeover information generation unit 3109, the connected-site management unit 3113, the input packet storage unit 3114, the demultiplexing unit 3115, the image decoding unit 3116, the audio decoding unit 3117, the image output control unit 3118, the audio output control unit 3119, and the participation time measurement unit 3122 may be implemented as an LSI 3150.

The image input unit 3101, the audio input unit 3102, the coding control unit 3103, the image coding unit 3104, the audio coding unit 3105, the multiplexing unit 3106, the output packet storage unit 3107, the takeover information generation unit 3109, the network sending unit 3111, the network receiving unit 3112, the connected-site management unit 3113, the input packet storage unit 3114, the demultiplexing unit 3115, the image decoding unit 3116, the audio decoding unit 3117, the image output control unit 3118, the audio output control unit 3119, the image output unit 3120, and the audio output unit 3121, and the participation time measurement unit 3122 included in the video conferencing apparatus 3100 perform the same operations that are performed, respectively, by the image input unit 1101, the audio input unit 1102, the coding control unit 1103, the image coding unit 1104, the audio coding unit 1105, the multiplexing unit 1106, the output packet storage unit 1107, the takeover information generation unit 1109, the network sending unit 1111, the network receiving unit 1112, the connected-site management unit 1113, the input packet storage unit 1114, the demultiplexing unit 1115, the image decoding unit 1116, the audio decoding unit 1117, the image output control unit 1118, the audio output control unit 1119, the image output unit 1120, the audio output unit 1121, and the participation time measurement unit 1122 included in the video conferencing apparatus 1100 shown in FIG. 3 in the first embodiment.

The radio receiving unit 3142 receives a takeover request from the video conferencing apparatus 3300 which is the mobile terminal.

In response to the takeover request received by the radio receiving unit 3142, the takeover information generation unit 3109 generates the takeover information for the site E on the basis of: an IP address of a site managed by the connected-site management unit 3113; a resolution, a bit rate, and a frame rate set by the coding control unit 3103; and a connection time length measured by the participation time measurement unit 3122.

The radio sending unit 3141 sends the takeover information generated by the takeover information generation unit 3109 to the video conferencing apparatus 3300 which is the mobile terminal.

Figure 46:
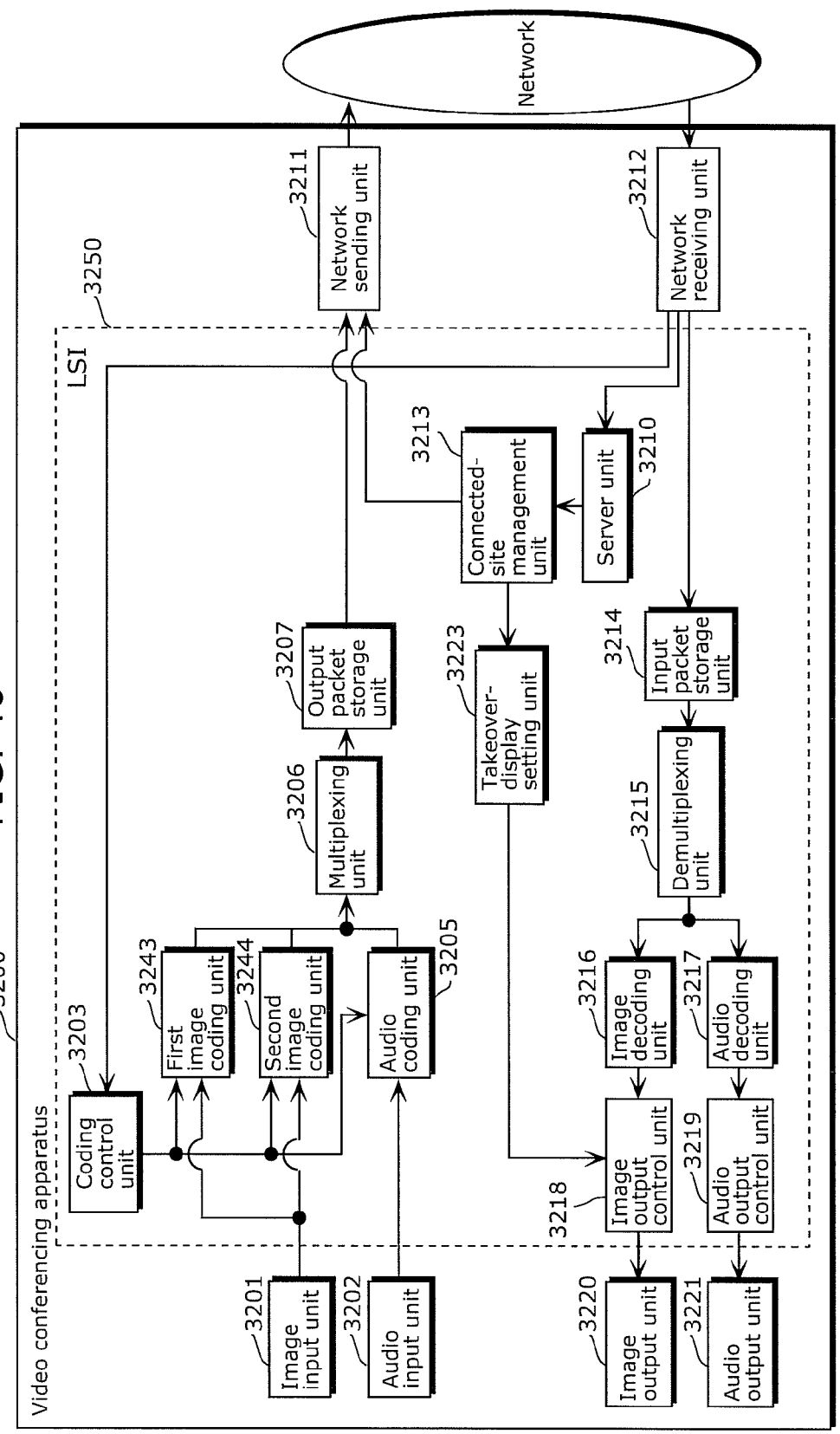
[FIG. 46]

FIG. 46 is a diagram showing a configuration of the video conferencing apparatus at the site B in the third embodiment shown in FIG. 44.

The video conferencing apparatus 3200 shown in FIG. 46 includes an image input unit 3201, an audio input unit 3202, a coding control unit 3203, an audio coding unit 3205, a multiplexing unit 3206, an output packet storage unit 3207, a server unit 3210, a network sending unit 3211, a network receiving unit 3212, a connected-site management unit 3213, an input packet storage unit 3214, a demultiplexing unit 3215, an image decoding unit 3216, an audio decoding unit 3217, an image output control unit 3218, an audio output control unit 3219, an image output unit 3220, an audio output unit 3221, a takeover-display setting unit 3223, a first image coding unit 3243, and a second image coding unit 3244.

Note that the coding control unit 3203, the audio coding unit 3205, the multiplexing unit 3206, the output packet storage unit 3207, the server unit 3210, the connected-site management unit 3213, the input packet storage unit 3214, the demultiplexing unit 3215, the image decoding unit 3216, the audio decoding unit 3217, the image output control unit 3218, the audio output control unit 3219, the takeover-display setting unit 3223, the first image coding unit 3243, and the second image coding unit 3244 may be implemented as an LSI 3250.

The image input unit 3201, the audio input unit 3202, the coding control unit 3203, the audio coding unit 3205, the multiplexing unit 3206, the output packet storage unit 3207, the server unit 3210, the network sending unit 3211, the network receiving unit 3212, the connected-site management unit 3213, the input packet storage unit 3214, the demultiplexing unit 3215, the image decoding unit 3216, the audio decoding unit 3217, the image output control unit 3218, the audio output control unit 3219, the image output unit 3220, the audio output unit 3221, and the takeover-display setting unit 3223 included in the video conferencing apparatus 3200 perform the same operations that are performed, respectively, by the image input unit 1201, the audio input unit 1202, the coding control unit 1203, the audio coding unit 1205, the multiplexing unit 1206, the output packet storage unit 1207, the server unit 1210, the network sending unit 1211, the network receiving unit 1212, the connected-site management unit 1213, the input packet storage unit 1214, the demultiplexing unit 1215, the image decoding unit 1216, the audio decoding unit 1217, the image output control unit 1218, the audio output control unit 1219, the image output unit 1220, the audio output unit 1221, and the takeover-display setting unit 1223 included in the video conferencing apparatus 1200 shown in FIG. 4.

The first image coding unit 3243 and the second image coding unit 3244 perform coding on an input video signal according to a coding condition set by the coding control unit 3203. Resolutions in which the first image coding unit 3243 and the second image coding unit 3244 perform coding on the input video signal are different from each other. For example, the second image coding unit 3244 performs coding in a low resolution for the video conferencing apparatus 3300 which is the mobile terminal.

The network receiving unit 3212 receives resolution information from the video conferencing apparatus 3300 which is the mobile terminal.

The coding control unit 3203 controls operations performed by the first image coding unit 3243 and the second image coding unit 3244, according to the resolution information received by the network receiving unit 3212. To be more specific, when a resolution indicated by the resolution information corresponds to the resolution for the video conferencing apparatus 3100, the coding control unit 3203 causes the first image coding unit 3243 to perform coding on the input video signal. On the other hand, when the resolution indicated by the resolution information corresponds to the resolution for the video conferencing apparatus 3300 which is the mobile terminal, the coding control unit 3203 causes the second image coding unit 3244 to perform coding on the input video signal.

It should be noted that although the video conferencing apparatus 3300 communicates via radio waves, the video conferencing apparatus 3200 can communicate with the video conferencing apparatus 3300 via a network.

Figure 47:
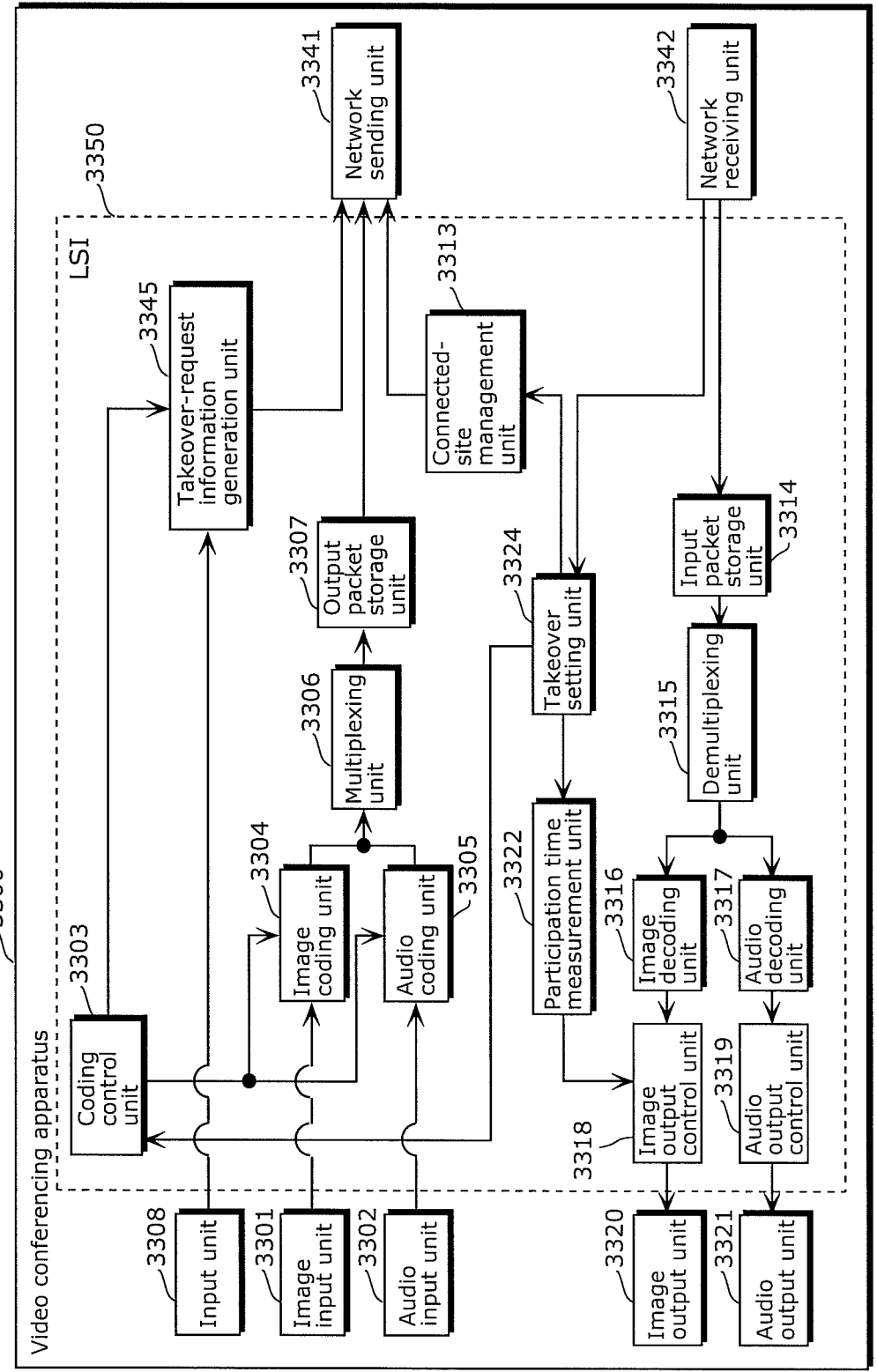
[FIG. 47]

FIG. 47 is a diagram showing a configuration of the video conferencing apparatus at the site E in the third embodiment shown in FIG. 44.

The video conferencing apparatus 3300 shown in FIG. 47 includes an image input unit 3301, an audio input unit 3302, a coding control unit 3303, an image coding unit 3304, an audio coding unit 3305, a multiplexing unit 3306, an output packet storage unit 3307, an input unit 3308, a connected-site management unit 3313, an input packet storage unit 3314, a demultiplexing unit 3315, an image decoding unit 3316, an audio decoding unit 3317, an image output control unit 3318, an audio output control unit 3319, an image output unit 3320, an audio output unit 3321, a participation time measurement unit 3322, a takeover setting unit 3324, a radio sending unit 3341, a radio receiving unit 3342, and a takeover-request information generation unit 3345.

Note that the coding control unit 3303, the image coding unit 3304, the audio coding unit 3305, the multiplexing unit 3306, the output packet storage unit 3307, the connected-site management unit 3313, the input packet storage unit 3314, the demultiplexing unit 3315, the image decoding unit 3316, the audio decoding unit 3317, the image output control unit 3318, the audio output control unit 3319, the participation time measurement unit 3322, the takeover setting unit 3324, and the takeover-request information generation unit 3345 may be implemented as an LSI 3350.

The image input unit 3301, the audio input unit 3302, the coding control unit 3303, the image coding unit 3304, the audio coding unit 3305, the multiplexing unit 3306, the output packet storage unit 3307, the connected-site management unit 3313, the input packet storage unit 3314, the demultiplexing unit 3315, the image decoding unit 3316, the audio decoding unit 3317, the image output control unit 3318, the audio output control unit 3319, the image output unit 3320, the audio output unit 3321, the participation time measurement unit 3322, and the takeover setting unit 3324 included in the video conferencing apparatus 3300 perform the same operations that are performed, respectively, by the image input unit 1301, the audio input unit 1302, the coding control unit 1303, the image coding unit 1304, the audio coding unit 1305, the multiplexing unit 1306, the output packet storage unit 1307, the connected-site management unit 1313, the input packet storage unit 1314, the demultiplexing unit 1315, the image decoding unit 1316, the audio decoding unit 1317, the image output control unit 1318, the audio output control unit 1319, the image output unit 1320, the audio output unit 1321, the participation time measurement unit 1322, and the takeover setting unit 1324 included in the video conferencing apparatus 1300 shown in FIG. 5 in the first embodiment.

The radio sending unit 3341 and the radio receiving unit 3342 send and receive data via radio waves, and execute the same operations that are executed, respectively, by the network sending unit 1311 and the network receiving unit 1312 shown in FIG. 5.

The input unit 3308 receives a takeover request from the user by, for example, receiving a button press indicating the takeover request.

In response to the takeover request received by the input unit 3308, the takeover-request information generation unit 3345 generates takeover-request information.

The radio sending unit 3341 sends the takeover-request information generated by the takeover-request information generation unit 3345. Moreover, when the radio receiving unit 3342 receives the takeover information, the radio sending unit 3341 sends the resolution information on the video conferencing apparatus 3300 to the video conferencing apparatus 3200.

A takeover operation performed by the video conferencing apparatuses configured as described thus far is explained.

Figure 48:
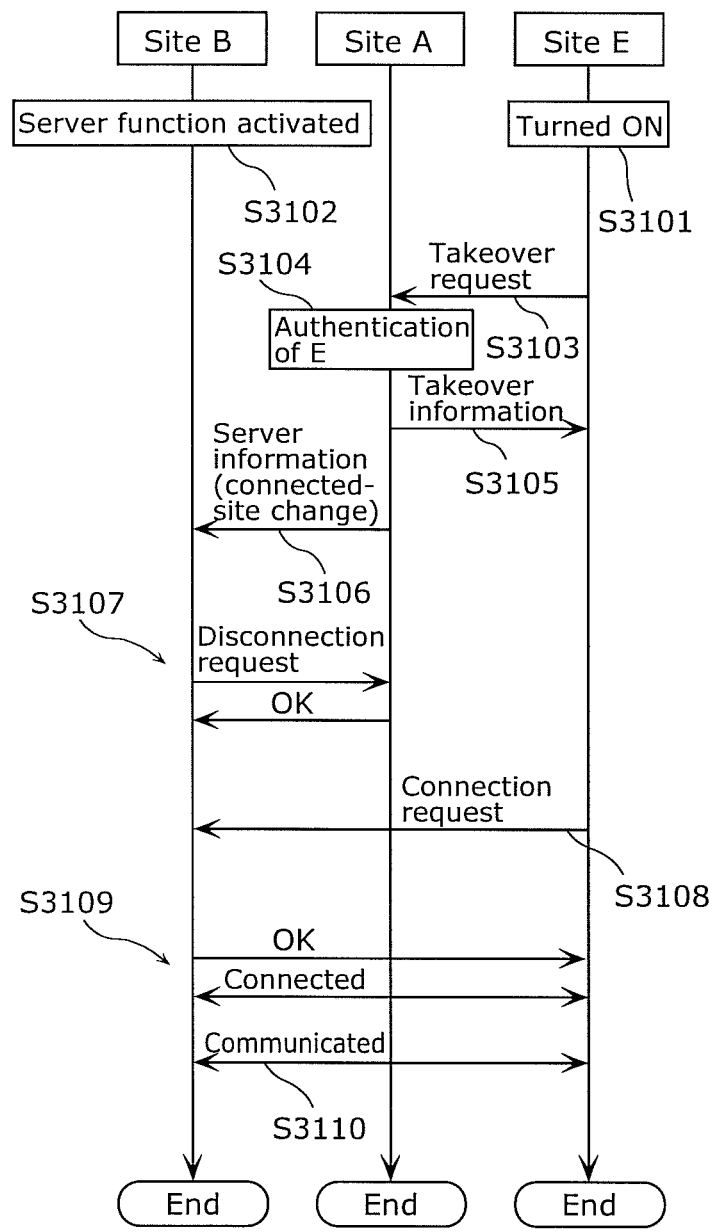
[FIG. 48]

FIG. 48 is a sequence diagram showing takeover processing performed in the third embodiment shown in FIG. 44. The third embodiment assumes that the site E is in the ON state (S3101) and that the server function of the site B is being activated (S3102).

Firstly, the site E sends the takeover-request information to the site A (S3103).

Next, the site A performs authentication of participation of the site E (S3104).

Following this, the site A sends the takeover information to the site E (S3105).

Then, the site A sends the server information indicating the connected-site change, to the site B (S3106).

Next, the site B sends a disconnection request to the site A (S3107).

Following this, the site E sends a connection request to the site B (S3108). As a result, connection is established between the sites E and B (S3109).

Then, the site B starts communication with the site E (S3110).

In this way, the site E can take over the video conferencing communication from the site A.

Figure 49:
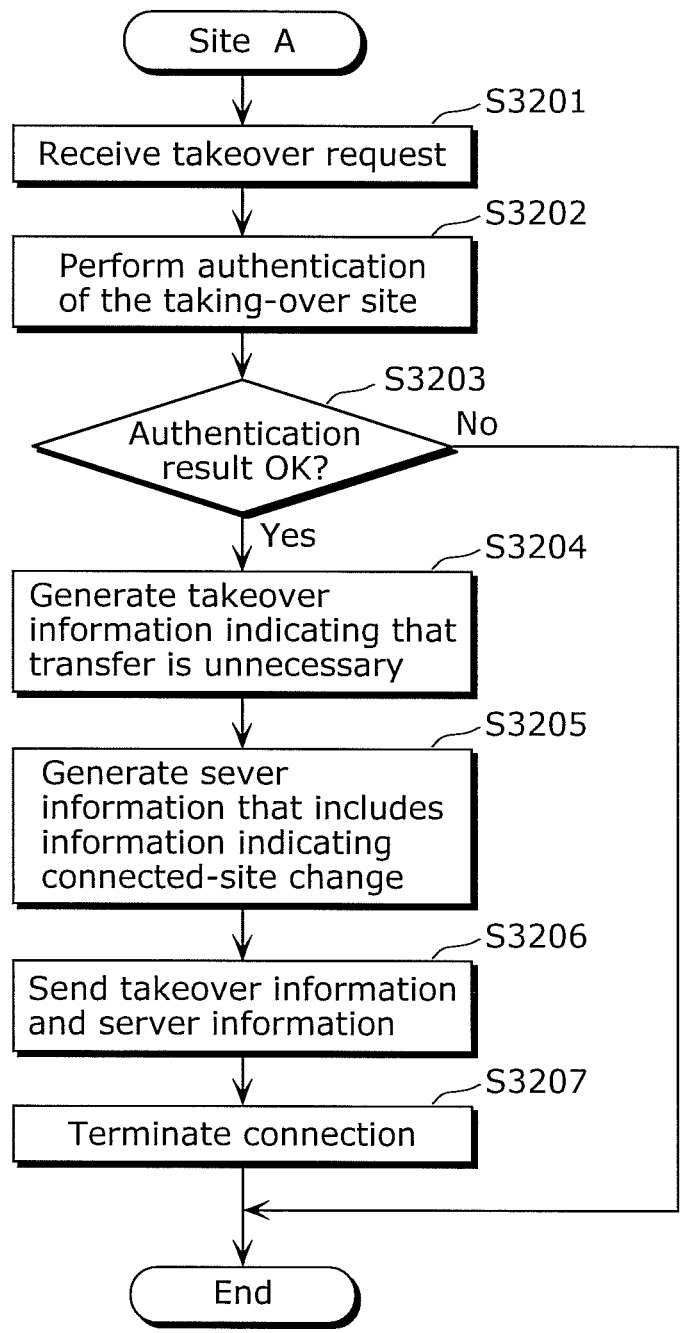
[FIG. 49]

FIG. 49 is a flowchart showing processing performed at the site A in the third embodiment shown in FIG. 44.

Firstly, the radio receiving unit 3142 receives the takeover-request information from the video conferencing apparatus 3300 (S3201).

Next, the takeover information generation unit 3109 performs authentication of the site E by verifying whether the video conferencing apparatus of the site E is compatible with the video conferencing apparatus of the site A (S3202). Or, the user at the site A performs the authentication by checking the takeover-request information on the screen. When the site E is not approved normally (No in S3203), the site A terminates the processing.

When the site E is approved normally (Yes in S3203), the takeover information generation unit 3109 generates the takeover information indicating that the transfer is unnecessary, based on the takeover-request information received by the radio receiving unit 3142 (S3204).

Next, the takeover information generation unit 3109 generates the server information which includes information indicating the connected-site change (S3205).

Following this, the radio sending unit 3141 sends the generated takeover information to the site E, and also sends the generated server information to the site B (S3206).

Then, receiving the disconnection request from the site B which operates as the server, the site A disconnects from the site B (S3207).

Figure 50:
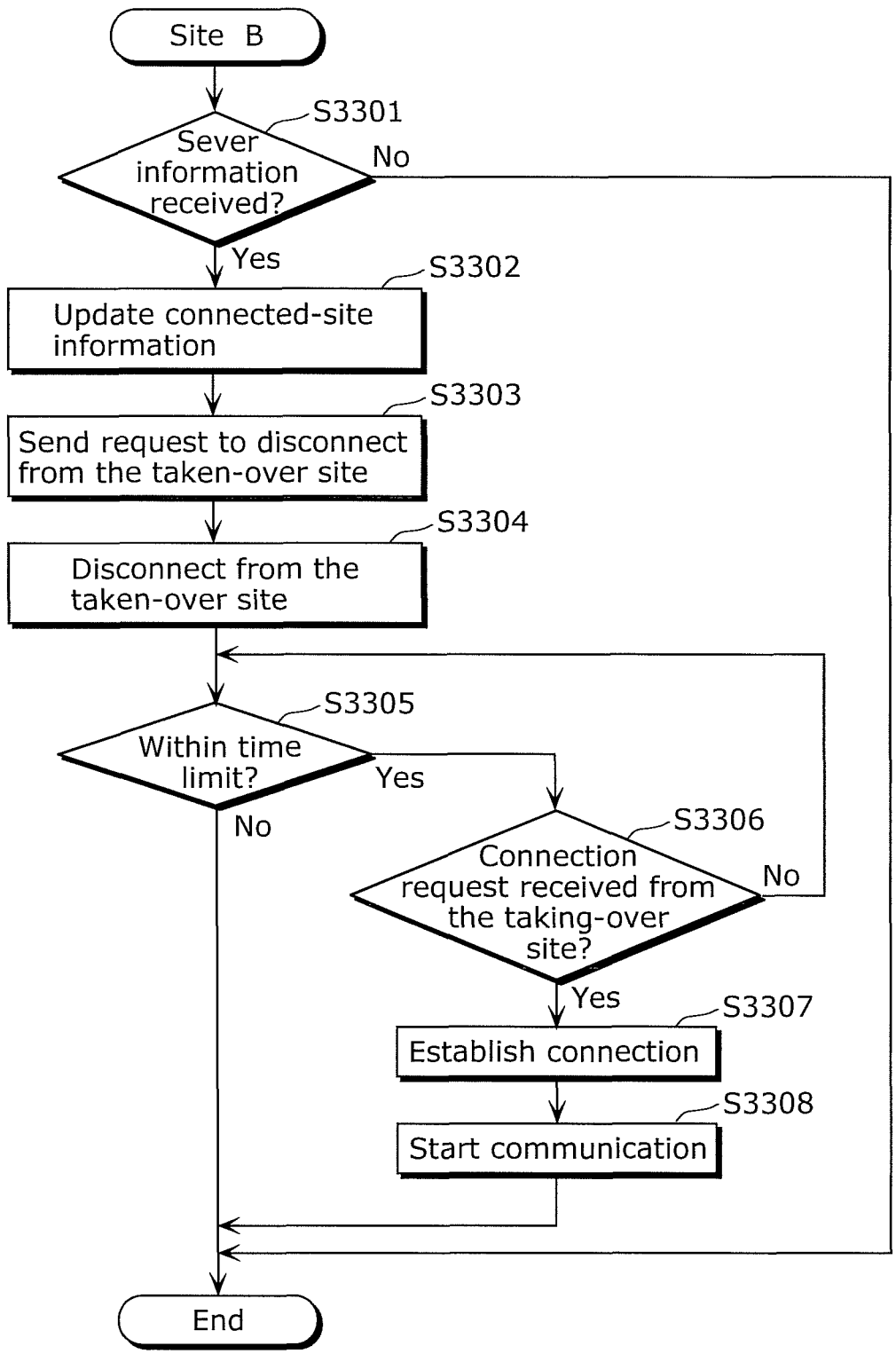
[FIG. 50]

FIG. 50 is a flowchart showing processing performed at the site B in the third embodiment shown in FIG. 44.

Firstly, the network receiving unit 3212 of the site B determines whether or not the server information has been received from the site A (S3301).

When the network receiving unit 3212 has not received the server information (No in S3301), the processing at the site B is terminated.

On the other hand, when the network receiving unit 3212 receives the server information (Yes in S3301), the server unit 3210 updates the connected-site information managed as the server information, using the information received by the network receiving unit 3212 (S3302).

Next, the connected-site management unit 3213 obtains, from the server unit 3210, the information indicating the connected-site change, and accordingly updates the connected-site information. Then, the connected-site management unit 3213 sends a disconnection request to the site A, which is the taken-over site, via the network sending unit 3211 (S3303). As a result, the connection with the site A is terminated (S3304).

Following this, the server unit 3210 determines whether or not the elapsed time is within a time limit (S3305). When the elapsed time exceeds the time limit (No in S3305), the processing at the site B is terminated.

When the elapsed time is within the time limit (Yes in S3305), the server unit 3210 determines whether or not the network receiving unit 3212 has received a connection request from the site E, which is the taking-over site (S3306). When the network receiving unit 3212 has not received the connection request (No in S3306), the server unit 3210 determines again whether or not the elapsed time is within the time limit (S3305).

When the network receiving unit 3212 receives the connection request (Yes in S3306), the site B establishes connection with the site E (S3307).

Then, the site B starts the video conferencing communication with the site E which is the taking-over site (S3308).

Figure 51:
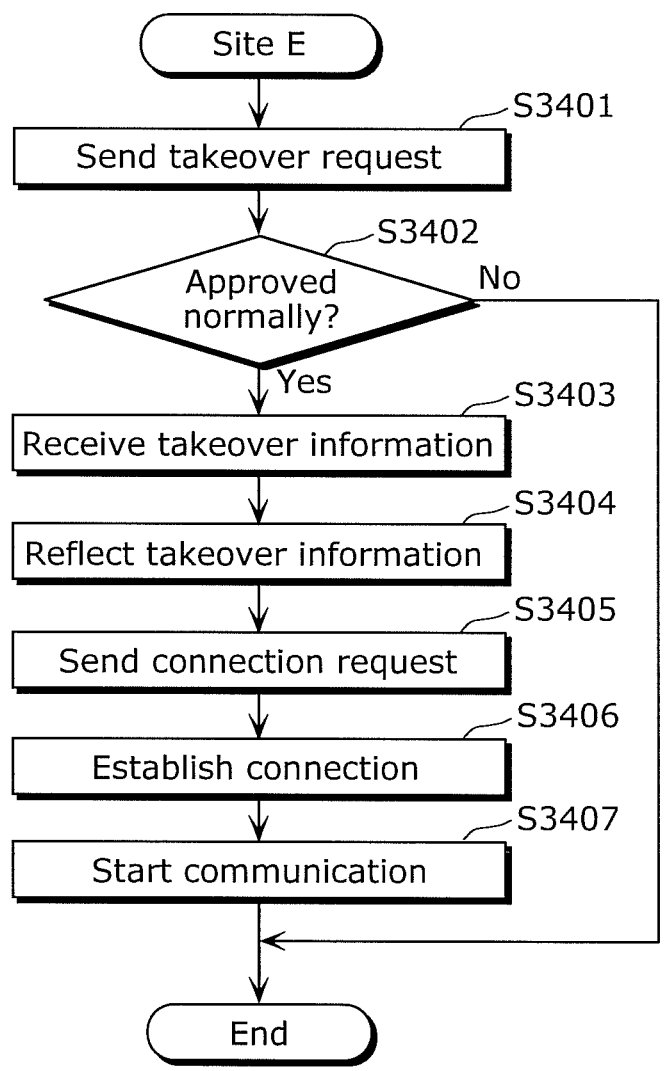
[FIG. 51]

FIG. 51 is a flowchart showing processing performed at the site E in the third embodiment shown in FIG. 44.

Firstly, the input unit 3308 receives the takeover request. In response to the request, the takeover-request information generation unit 3345 generates the takeover-request information. The radio sending unit 3341 sends the takeover-request information (S3401). When the site E is not approved normally by the site A which is the taken-over site (No in S3402), the site E terminates the processing.

When the site E is approved normally (S3402), the radio receiving unit 3342 receives the takeover information (S3403).

Next, the radio receiving unit 3342 sends the takeover information to the takeover setting unit 3324. The takeover setting unit 3324 configures the video conferencing apparatus 3300 on the basis of the takeover information (S3404). The processing performed here is the same as the processing (S1806) performed as shown in FIG. 17 in the first embodiment. Here, because of an environmental difference between the sites A and E, the takeover setting unit 3324 may eliminate a part of the settings.

Following this, the radio sending unit 3341 sends the connection request to the site B (S3405). As a result, the site E establishes connection with the site B (S3406), and starts communication (S3407).

In this way, the site E takes over the settings of the site A and starts the video conferencing communication.

According to the third embodiment as described thus far, when the resolution used at the site A which is the taken-over site is different from the resolution used at the site E which is the taking-over site, the site B which is the connection destination can perform coding according to the resolution corresponding to the site. Moreover, the takeover request can be sent, to the site A, from the site E which is the taking-over site.

(Fourth Embodiment)

The following is a description of the fourth embodiment according to the present invention, with reference to the drawings. The fourth embodiment can be implemented by a relatively simple configuration.

Figure 52:
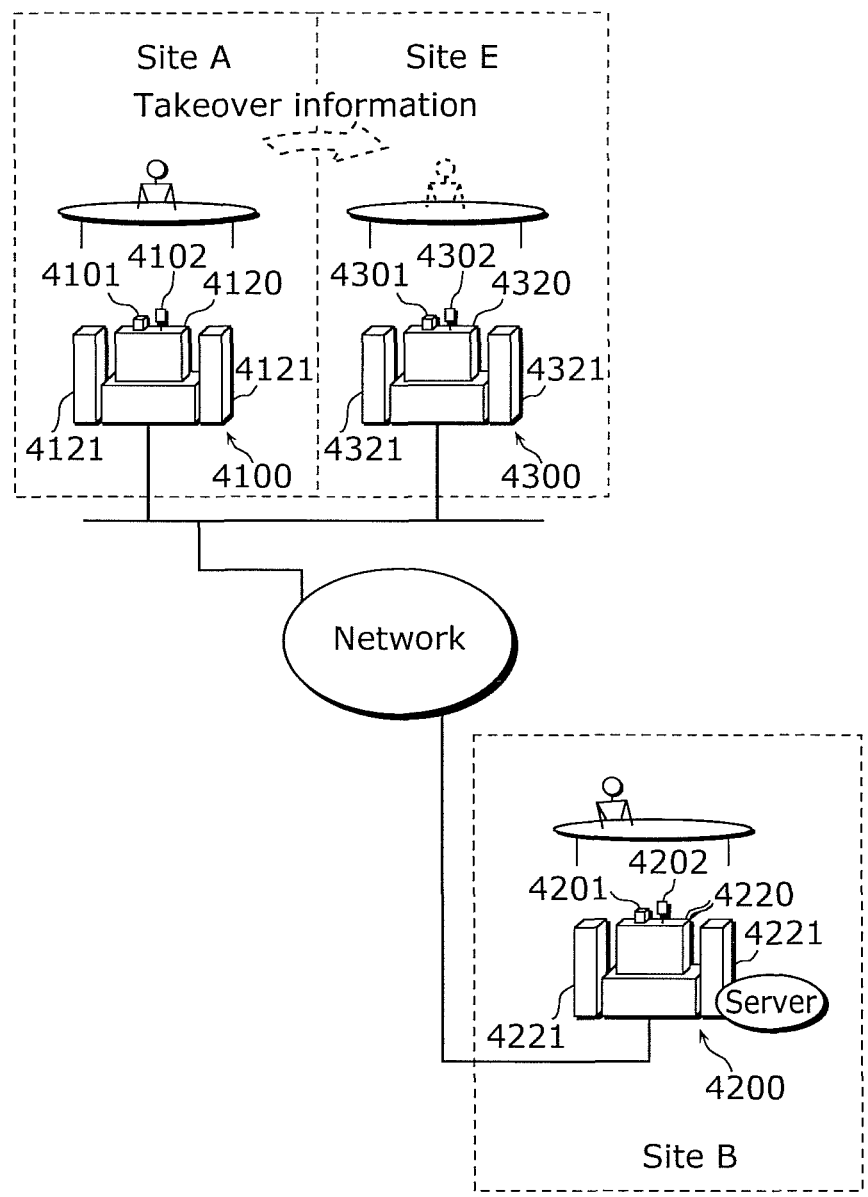
[FIG. 52]

FIG. 52 is a schematic diagram showing a video conferencing system in the fourth embodiment. FIG. 52 shows an example where a video conference is held between sites A and B. The fourth embodiment assumes that when a video conferencing apparatus 4100 of the site A is establishing video conferencing communication with a video conferencing apparatus 4200 of the site B having a server function, a video conferencing apparatus 4300 of a site E takes over the video conferencing communication established by the video conferencing apparatus 4100 of the site A.

Figure 53:
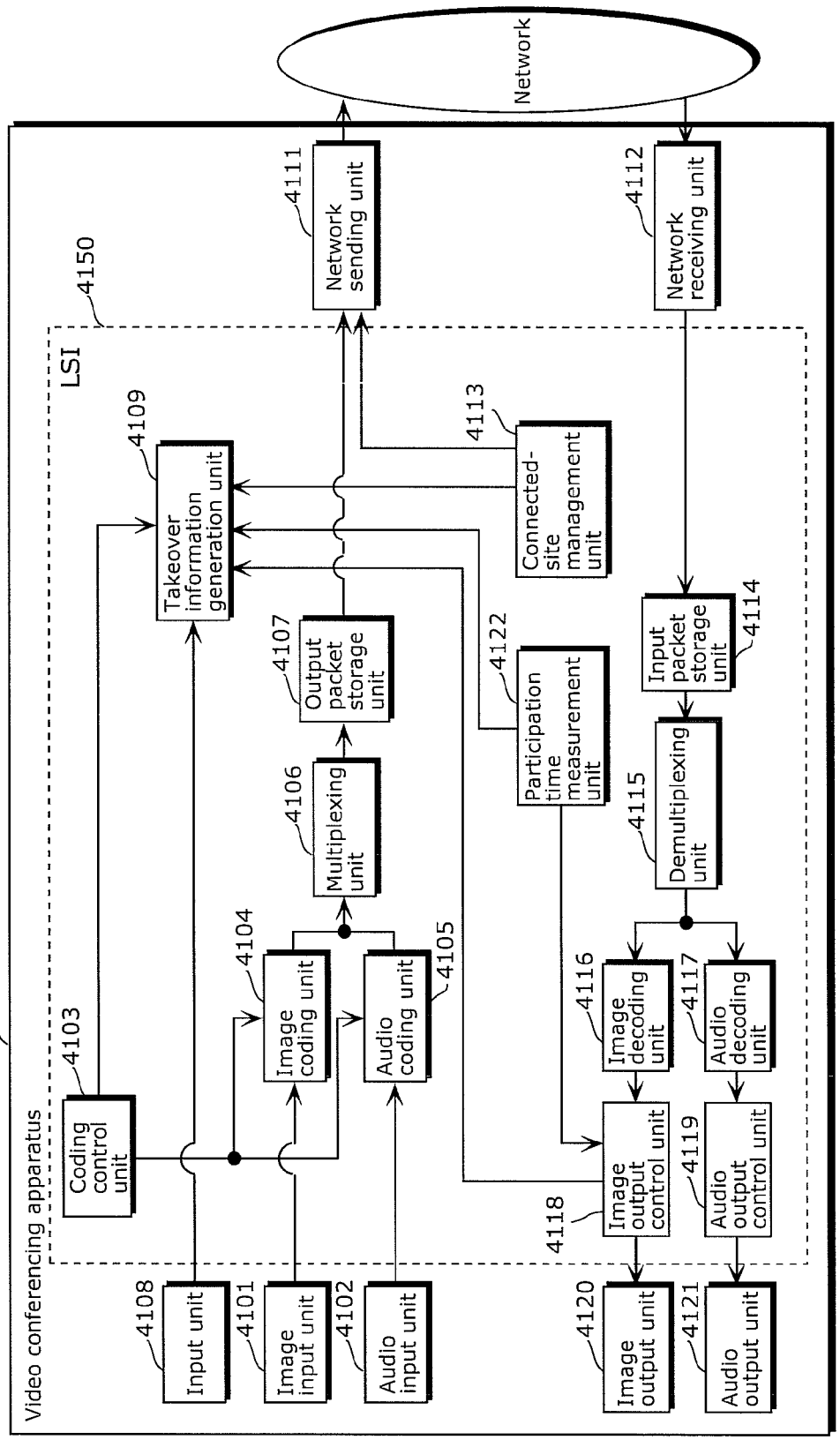
[FIG. 53]

FIG. 53 is a diagram showing a configuration of the video conferencing apparatus at the site A in the fourth embodiment shown in FIG. 52.

The video conferencing apparatus 4100 shown in FIG. 53 includes an image input unit 4101, an audio input unit 4102, a coding control unit 4103, an image coding unit 4104, an audio coding unit 4105, a multiplexing unit 4106, an output packet storage unit 4107, an input unit 4108, a takeover information generation unit 4109, a network sending unit 4111, a network receiving unit 4112, a connected-site management unit 4113, an input packet storage unit 4114, a demultiplexing unit 4115, an image decoding unit 4116, an audio decoding unit 4117, an image output control unit 4118, an audio output control unit 4119, the image output unit 4120, the audio output unit 4121, and a participation time measurement unit 4122.

Note that the coding control unit 4103, the image coding unit 4104, the audio coding unit 4105, the multiplexing unit 4106, the output packet storage unit 4107, the takeover information generation unit 4109, the connected-site management unit 4113, the input packet storage unit 4114, the demultiplexing unit 4115, the image decoding unit 4116, the audio decoding unit 4117, the image output control unit 4118, the audio output control unit 4119, and the participation time measurement unit 4122 may be implemented as an LSI 4150.

The image input unit 4101, the audio input unit 4102, the coding control unit 4103, the image coding unit 4104, the audio coding unit 4105, the multiplexing unit 4106, the output packet storage unit 4107, the input unit 4108, the takeover information generation unit 4109, the network sending unit 4111, the network receiving unit 4112, the connected-site management unit 4113, the input packet storage unit 4114, the demultiplexing unit 4115, the image decoding unit 4116, the audio decoding unit 4117, the image output control unit 4118, the audio output control unit 4119, the image output unit 4120, the audio output unit 4121, and the participation time measurement unit 4122 included in the video conferencing apparatus 4100 perform the same operations that are performed, respectively, by the image input unit 1101, the audio input unit 1102, the coding control unit 1103, the image coding unit 1104, the audio coding unit 1105, the multiplexing unit 1106, the output packet storage unit 1107, the input unit 1108, the takeover information generation unit 1109, the network sending unit 1111, the network receiving unit 1112, the connected-site management unit 1113, the input packet storage unit 1114, the demultiplexing unit 1115, the image decoding unit 1116, the audio decoding unit 1117, the image output control unit 1118, the audio output control unit 1119, the image output unit 1120, the audio output unit 1121, and the participation time measurement unit 1122 included in the video conferencing apparatus 1100 shown in FIG. 3 in the first embodiment.

Figure 54:
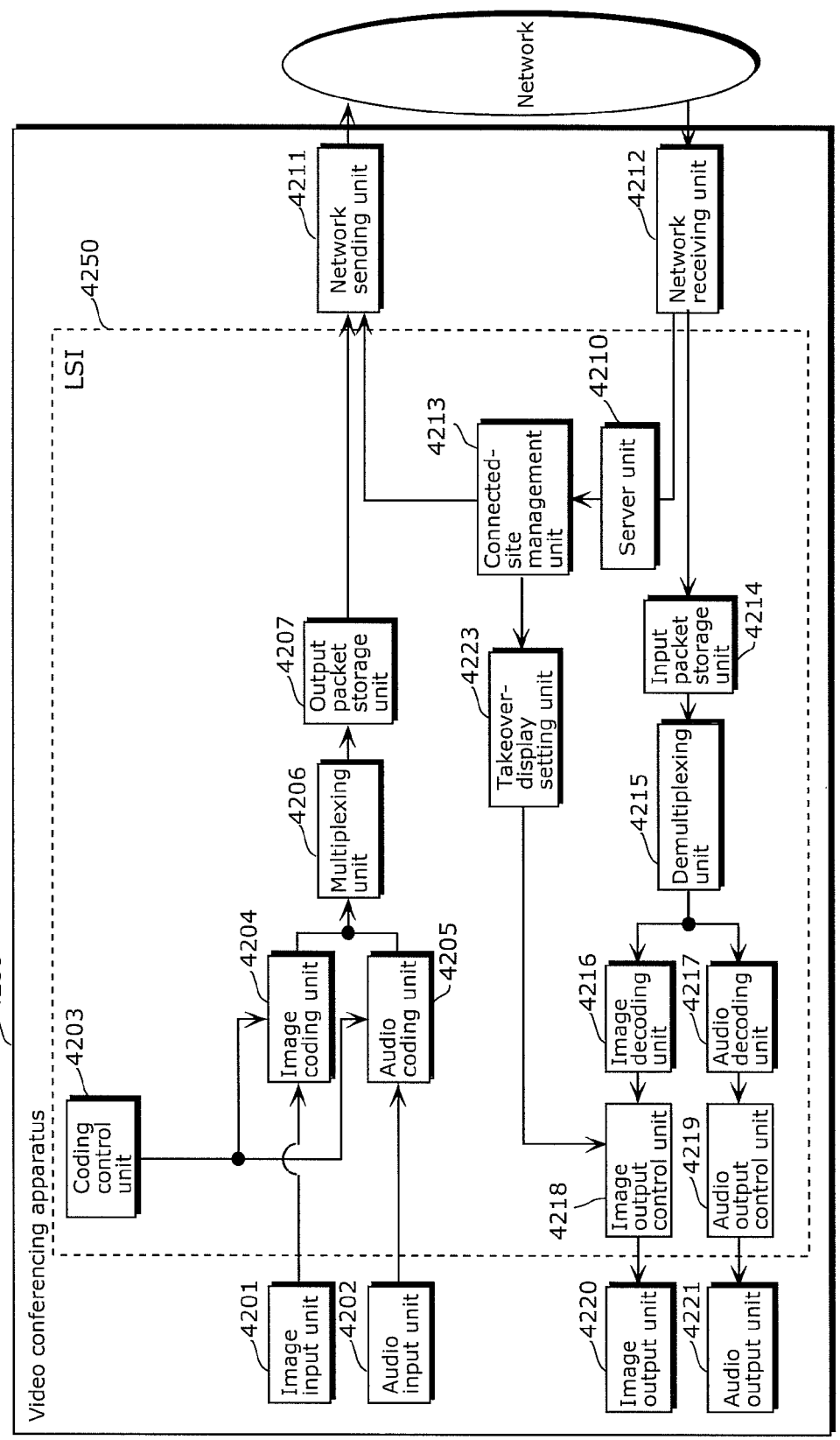
[FIG. 54]

FIG. 54 is a diagram showing a configuration of the video conferencing apparatus at the site B in the fourth embodiment shown in FIG. 52.

The video conferencing apparatus 4200 shown in FIG. 54 includes an image input unit 4201, an audio input unit 4202, a coding control unit 4203, an image coding unit 4204, an audio coding unit 4205, a multiplexing unit 4206, an output packet storage unit 4207, a server unit 4210, a network sending unit 4211, a network receiving unit 4212, a connected-site management unit 4213, an input packet storage unit 4214, a demultiplexing unit 4215, an image decoding unit 4216, an audio decoding unit 4217, an image output control unit 4218, an audio output control unit 4219, an image output unit 4220, an audio output unit 4221, and a takeover-display setting unit 4223.

Note that the coding control unit 4203, the image coding unit 4204, the audio coding unit 4205, the multiplexing unit 4206, the output packet storage unit 4207, the server unit 4210, the connected-site management unit 4213, the input packet storage unit 4214, the demultiplexing unit 4215, the image decoding unit 4216, the audio decoding unit 4217, the image output control unit 4218, the audio output control unit 4219, and the takeover-display setting unit 4223 may be implemented as an LSI 4250.

The image input unit 4201, the audio input unit 4202, the coding control unit 4203, the image coding unit 4204, the audio coding unit 4205, the multiplexing unit 4206, the output packet storage unit 4207, the server unit 4210, the network sending unit 4211, the network receiving unit 4212, the connected-site management unit 4213, the input packet storage unit 4214, the demultiplexing unit 4215, the image decoding unit 4216, the audio decoding unit 4217, the image output control unit 4218, the audio output control unit 4219, the image output unit 4220, the audio output unit 4221, and the takeover-display setting unit 4223 included in the video conferencing apparatus 4200 perform the same operations that are performed, respectively, by the image input unit 1201, the audio input unit 1202, the coding control unit 1203, the image coding unit 1204, the audio coding unit 1205, the multiplexing unit 1206, the output packet storage unit 1207, the server unit 1210, the network sending unit 1211, the network receiving unit 1212, the connected-site management unit 1213, the input packet storage unit 1214, the demultiplexing unit 1215, the image decoding unit 1216, the audio decoding unit 1217, the image output control unit 1218, the audio output control unit 1219, the image output unit 1220, the audio output unit 1221, and the takeover-display setting unit 1223 included in the video conferencing apparatus 1200 shown in FIG. 4.

Figure 55:
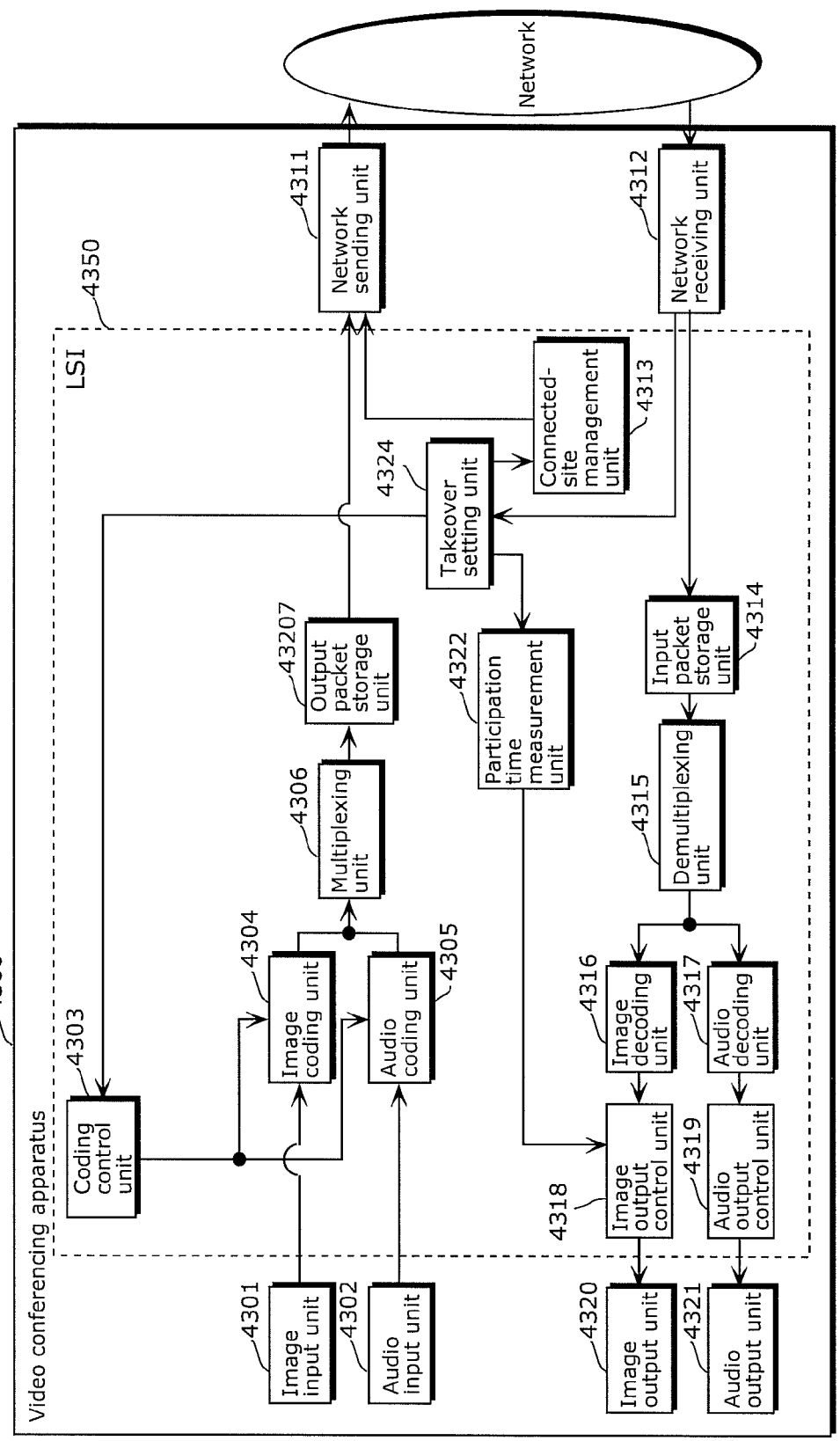
[FIG. 55]

FIG. 55 is a diagram showing a configuration of the video conferencing apparatus at the site E in the fourth embodiment shown in FIG. 52.

The video conferencing apparatus 4300 shown in FIG. 55 includes an image input unit 4301, an audio input unit 4302, a coding control unit 4303, an image coding unit 4304, an audio coding unit 4305, a multiplexing unit 4306, an output packet storage unit 4307, a network sending unit 4311, a network receiving unit 4312, a connected-site management unit 4313, an input packet storage unit 4314, a demultiplexing unit 4315, an image decoding unit 4316, an audio decoding unit 4317, an image output control unit 4318, an audio output control unit 4319, an image output unit 4320, an audio output unit 4321, a participation time measurement unit 4322, and a takeover setting unit 4324.

Note that the coding control unit 4303, the image coding unit 4304, the audio coding unit 4305, the multiplexing unit 4306, the output packet storage unit 4307, the connected-site management unit 4313, the input packet storage unit 4314, the demultiplexing unit 4315, the image decoding unit 4316, the audio decoding unit 4317, the image output control unit 4318, the audio output control unit 4319, the participation time measurement unit 4322, and the takeover setting unit 4324 may be implemented as an LSI 4350.

The image input unit 4301, the audio input unit 4302, the coding control unit 4303, the image coding unit 4304, the audio coding unit 4305, the multiplexing unit 4306, the output packet storage unit 4307, the network sending unit 4311, the network receiving unit 4312, the connected-site management unit 4313, the input packet storage unit 4314, the demultiplexing unit 4315, the image decoding unit 4316, the audio decoding unit 4317, the image output control unit 4318, the audio output control unit 4319, the image output unit 4320, the audio output unit 4321, the participation time measurement unit 4322, and the takeover setting unit 4324 included in the video conferencing apparatus 4300 perform the same operations that are performed, respectively, by the image input unit 1301, the audio input unit 1302, the coding control unit 1303, the image coding unit 1304, the audio coding unit 1305, the multiplexing unit 1306, the output packet storage unit 1307, the network sending unit 1311, the network receiving unit 1312, the connected-site management unit 1313, the input packet storage unit 1314, the demultiplexing unit 1315, the image decoding unit 1316, the audio decoding unit 1317, the image output control unit 1318, the audio output control unit 1319, the image output unit 1320, the audio output unit 1321, the participation time measurement unit 1322, and the takeover setting unit 1324 included in the video conferencing apparatus 1300 shown in FIG. 5 in the first embodiment.

A takeover operation performed by the video conferencing apparatuses configured as described thus far is explained.

Figure 56:
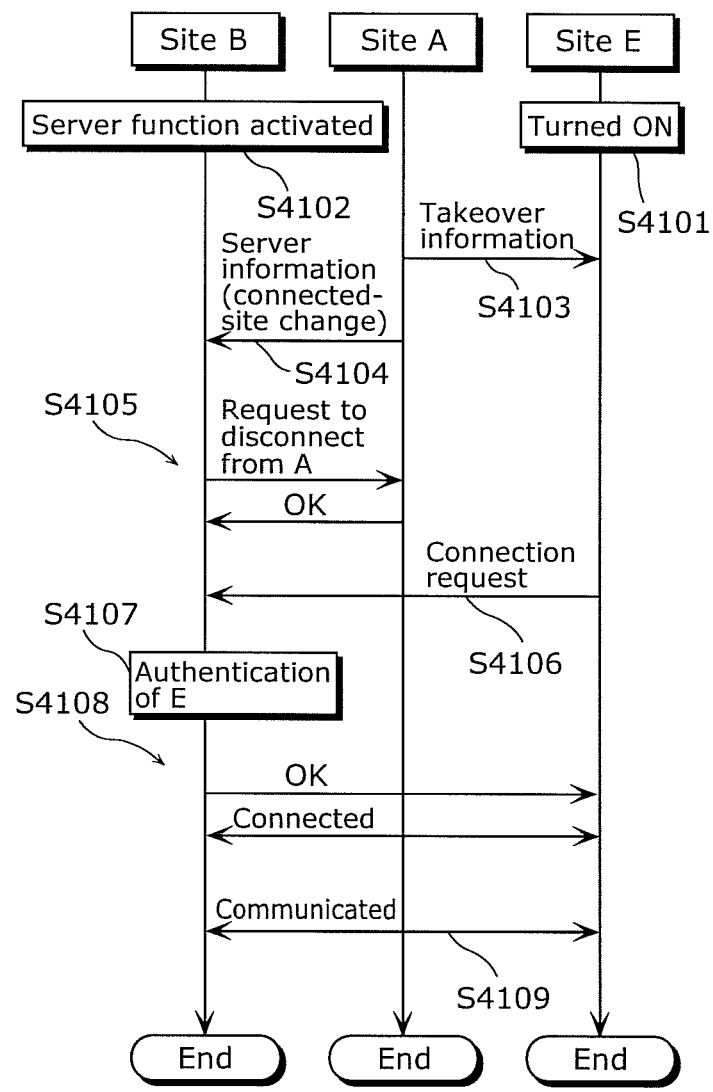
[FIG. 56]

FIG. 56 is a sequence diagram showing takeover processing performed in the fourth embodiment shown in FIG. 52. The fourth embodiment assumes that the site E is in the ON state (S4101) and that the server function of the site B is being activated (S4102).

Firstly, the site A sends the takeover information to the site E (S4103).

Next, the site A sends the server information indicating the connected-site change, to the site B (S4104).

Following this, the site B sends a disconnection request to the site A (S4105). As a result, the connection with the site A is terminated.

Then, the site E sends a connection request to the site B (S4106). After this, as in the case of the first embodiment, the site B performs authentication of the participation of the site E in the video conference (S4107). Then, the site B establishes connection with the site E (S4108).

Next, the site B starts communication with the site E (S4109).

In this way, the site E can take over the video conferencing communication from the site A.

Figure 57:
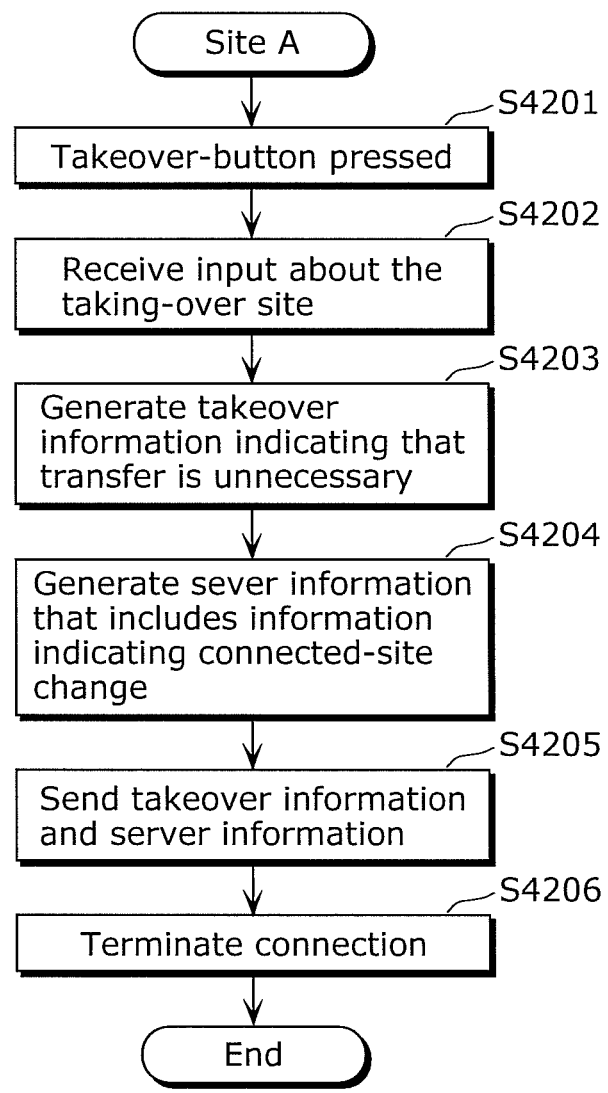
[FIG. 57]

FIG. 57 is a flowchart showing processing performed at the site A in the fourth embodiment shown in FIG. 52.

Firstly, at the site A which is in the video conference, the input unit 4108 receives a button press indicating a takeover of the video conference (S4201).

Next, the image output control unit 4118 performs control so as to cause the image output unit 4120 to display the screen shown in FIG. 26. The input unit 4108 receives an input of the IP address of the site E, which is the taking-over site, in order to turn over the video conference to the site E (S4202). Also, the input unit 4108 receives a selection whether to perform the takeover processing. Then, the input unit 4108 sends the received information to the takeover information generation unit 4109.

Following this, the takeover information generation unit 4109 generates the takeover information indicating that the transfer is unnecessary as shown in FIG. 60, in response to the takeover request received by the input unit 4108 (S4203).

Then, the takeover information generation unit 4109 generates the server information that includes information indicating the connected-site change (S4204).

Next, the network sending unit 4111 sends the generated takeover information to the site E, and also sends the generated server information to the site B (S4205).

Following this, the network receiving unit 4112 receives a disconnection request and, as a result, the site A disconnects from the site B (S4206).

Figure 58:
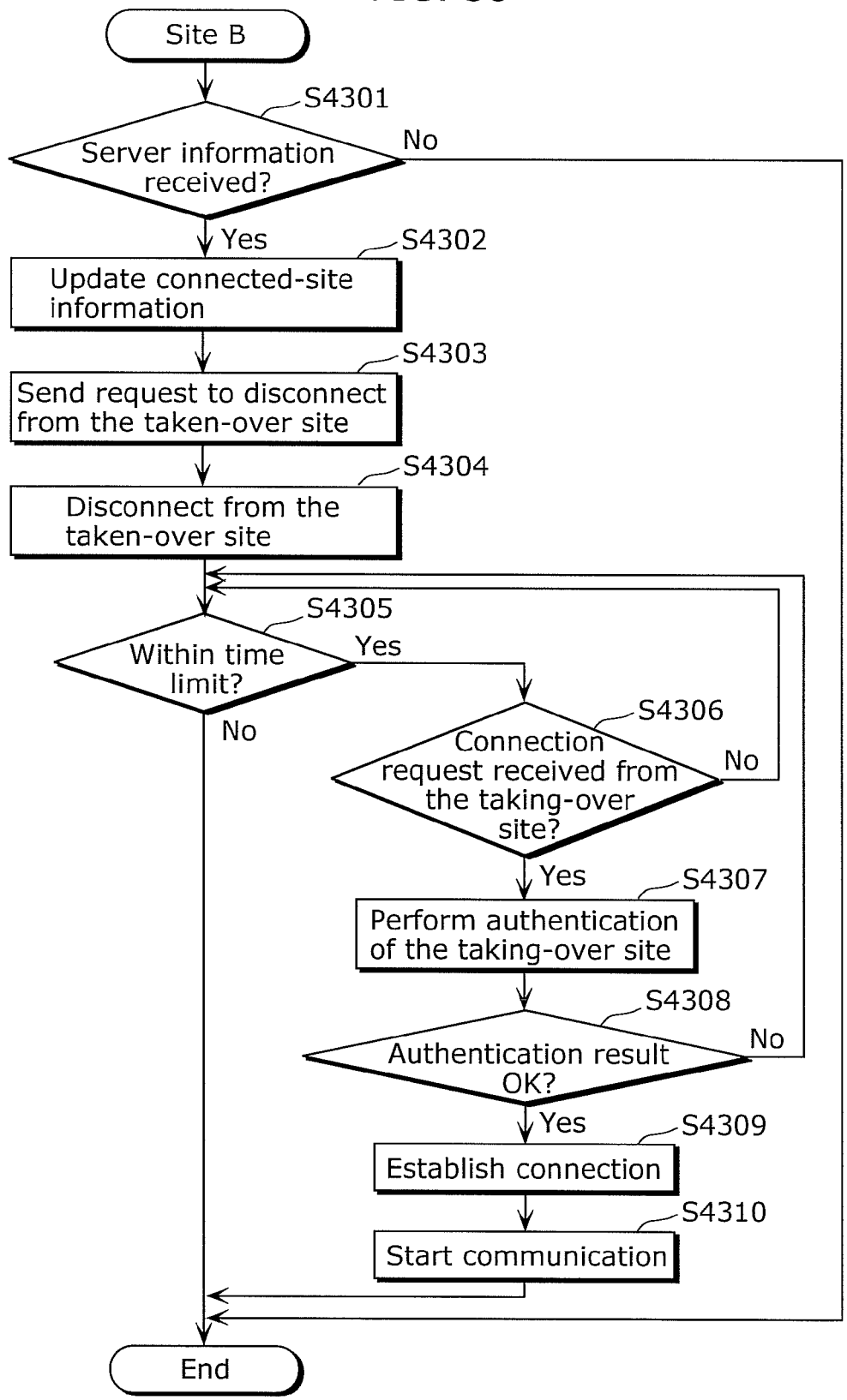
[FIG. 58]

FIG. 58 is a flowchart showing processing performed at the site B in the fourth embodiment shown in FIG. 52.

Firstly, the network receiving unit 4212 of the site B determines whether or not the server information has been received from the site A (S4301).

When the network receiving unit 4212 has not received the server information (No in S4301), the processing at the site B is terminated.

On the other hand, when the network receiving unit 4212 receives the server information (Yes in S4301), the server unit 4210 updates the connected-site information managed as the server information, using the information received by the network receiving unit 4212 (S4302).

Next, the connected-site management unit 4213 obtains, from the server unit 4210, the information indicating the connected-site change, and accordingly updates the connected-site information. Then, the connected-site management unit 4213 sends a disconnection request to the site A, which is the taken-over site, via the network sending unit 4211 (S4303). As a result, the connection with the site A, which is the taken-over site, is terminated (S4304).

Following this, the server unit 4210 determines whether or not the elapsed time is within the time limit (S4305). When the elapsed time exceeds the time limit (No in S4305), the processing at the site B is terminated.

When the elapsed time is within the time limit (Yes in S4305), the server unit 4210 determines whether or not the network receiving unit 4212 has received a connection request from the site E, which is the taking-over site (S4306). When the network receiving unit 4212 has not received the connection request (No in S4306), the server unit 4210 determines again whether or not the elapsed time is within the time limit (S4305).

When the network receiving unit 4212 receives the connection request (Yes in S4306), the server unit 4210 perform authentication of the participation of the site E in the video conference, as in the case of the first embodiment (S4307).

Here, when the site E is not approved normally (No in S4308), the server unit 4210 determines again whether the elapsed time is within the time limit (S4305).

On the other hand, when the site E is approved normally (Yes in S4308), the site B establishes connection with the site E (S4309). Then, the site B starts the video conferencing communication with the site E which is the taking-over site (S4310).

Figure 59:
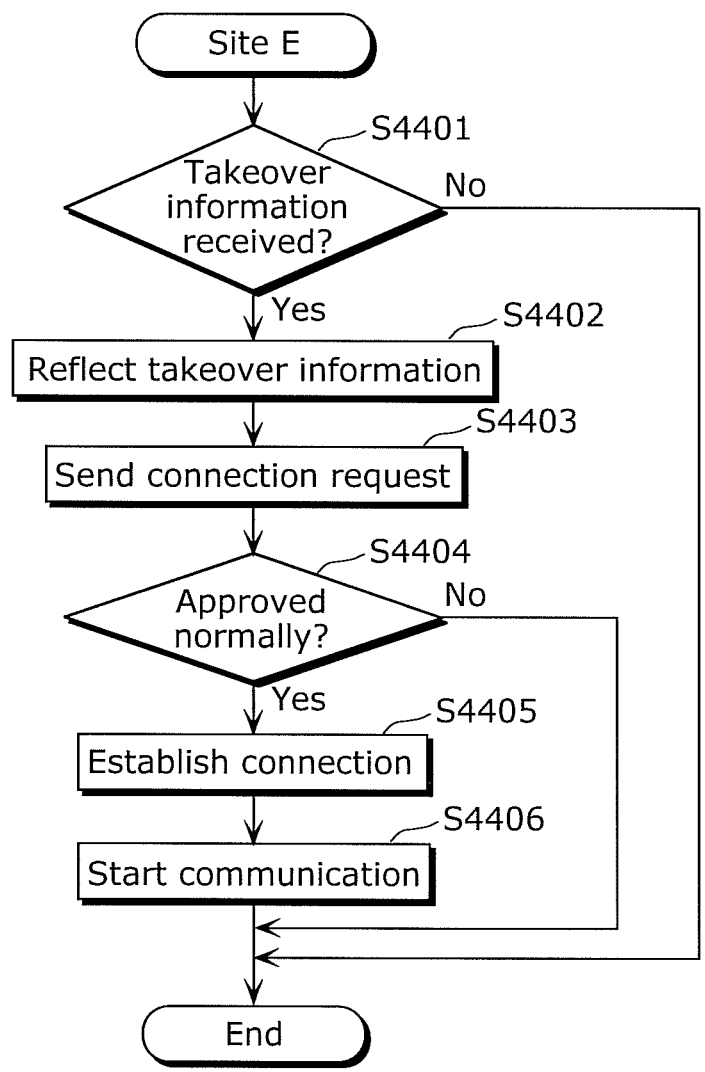
[FIG. 59]

FIG. 59 is a flowchart showing processing performed at the site E in the fourth embodiment shown in FIG. 52.

Firstly, the network receiving unit 4312 determines whether or not the takeover information has been received (S4401).

When the network receiving unit 4312 has not received the takeover information (No in S4401), the site B terminates the processing.

On the other hand, when receiving the takeover information (Yes in S4401), the network receiving unit 4312 sends the takeover information to the takeover setting unit 4324. The takeover setting unit 4324 configures the video conferencing apparatus 4300 on the basis of the takeover information (S4402). The processing performed here is the same as the processing (S1806) performed as shown in FIG. 17 in the first embodiment.

Next, the network sending unit 4311 sends a connection request to the site B which operates as the server (S4403). Then, the authentication of the participation of the site E is performed.

Here, when the participation is not approved normally (No in S4404), the processing at the site E is terminated.

On the other hand, when the participation is approved normally (Yes in S4404), the site E establishes connection with the site B (S4405) and thus starts communication with the site B (S4406).

In this way, the site E takes over the settings of the site A and starts the video conferencing communication.

FIG. 60 is a diagram showing a data structure of the takeover information in the fourth embodiment shown in FIG. 52.

The takeover information shown in FIG. 60 includes transfer information indicating that the transfer is unnecessary. Also, the takeover information includes the number of connected sites to which the taken-over site has been connected and the screen layout having been used at the taken-over site.

Moreover, the takeover information includes the IP addresses of the sites to which the taken-over site has been connected. Furthermore, the takeover information includes the resolutions, bit rates, and frame rates corresponding to the sites to which the taken-over site has been connected. Also, the takeover information includes the connection time length which is a time length of participating in the video conference, for example.

In this way, even with the relative simple configuration according to the fourth embodiment, the takeover from the site A to the site E can be performed.

It should be noted that not all the components included in the video conferencing apparatuses shown in FIGS. 53, 54, and 55 are necessary for solving the problem. The video conferencing communication is taken over as follows: the takeover information generation unit 4109 shown in FIG. 53 generates the takeover information based on the components corresponding to the video conferencing apparatus; the network sending unit 4111 sends the takeover information; the network receiving unit 4312 shown in FIG. 55 receives the takeover information; and the takeover setting unit 4324 configures the components corresponding to the video conferencing apparatus using the takeover information.

(Fifth Embodiment)

Figure 61:
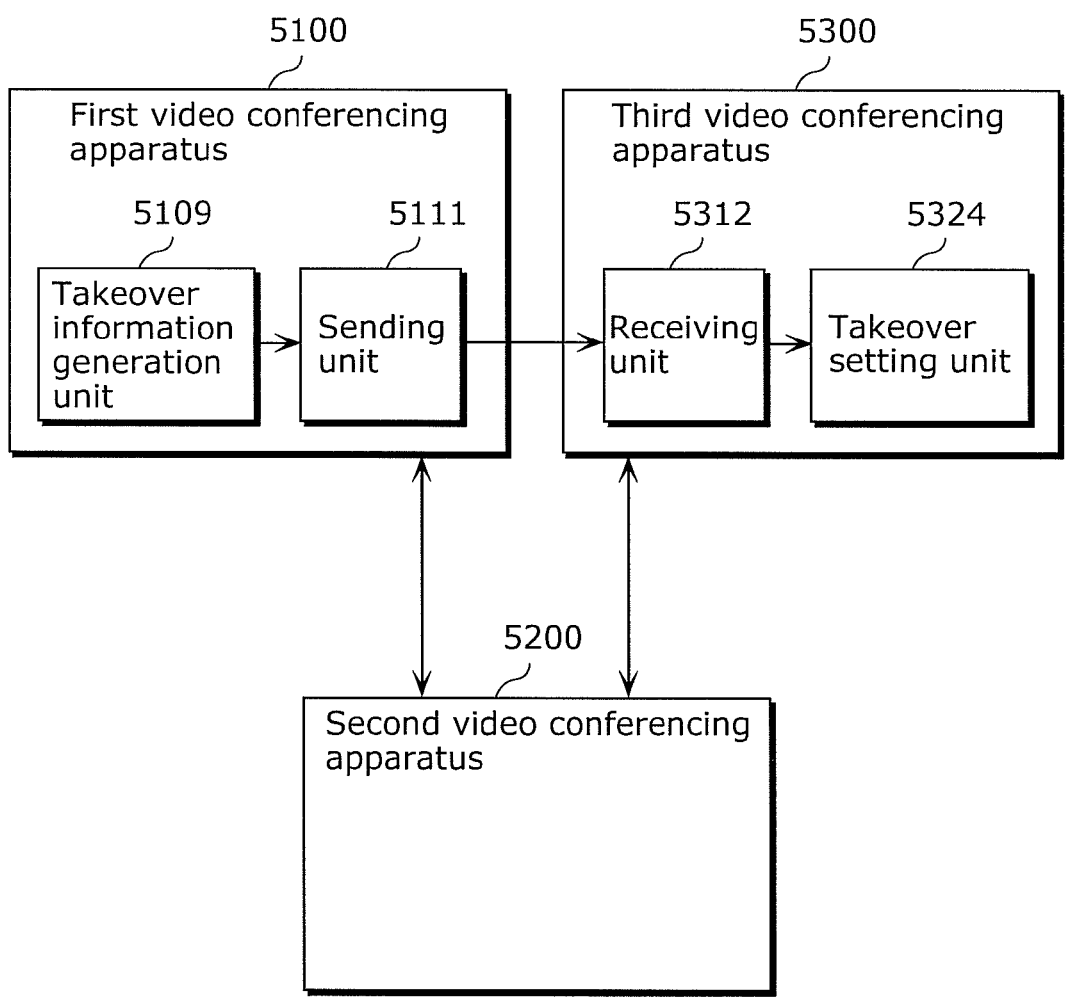
[FIG. 61]

FIG. 61 is a diagram showing a configuration of a video conferencing system in the fifth embodiment.

The video conferencing system shown in FIG. 61 includes a first video conferencing apparatus 5100, a second video conferencing apparatus 5200, and a third video conferencing apparatus 5300. The first video conferencing apparatus 5100 has a takeover information generation unit 5109 and a sending unit 5111. The third video conferencing apparatus 5300 has a receiving unit 5312 and the takeover setting unit 5324.

The takeover information generation unit 5109 generates takeover information including configuration information on a screen layout used in a video conference held between the first video conferencing apparatus 5100 and the second video conferencing apparatus 5200.

The sending unit 5111 sends the takeover information generated by the takeover information generation unit 5109.

The receiving unit 5312 receives the takeover information.

The takeover setting unit 5324 sets a screen layout of the third video conferencing apparatus 5300 using the takeover information received by the receiving unit 5312 so that the third video conferencing apparatus 5300 takes over the screen layout used in the video conference and has the video conference with the second video conferencing apparatus 5200 after the participation of the third video conferencing apparatus 5300 in the video conference is approved.

Figure 62:
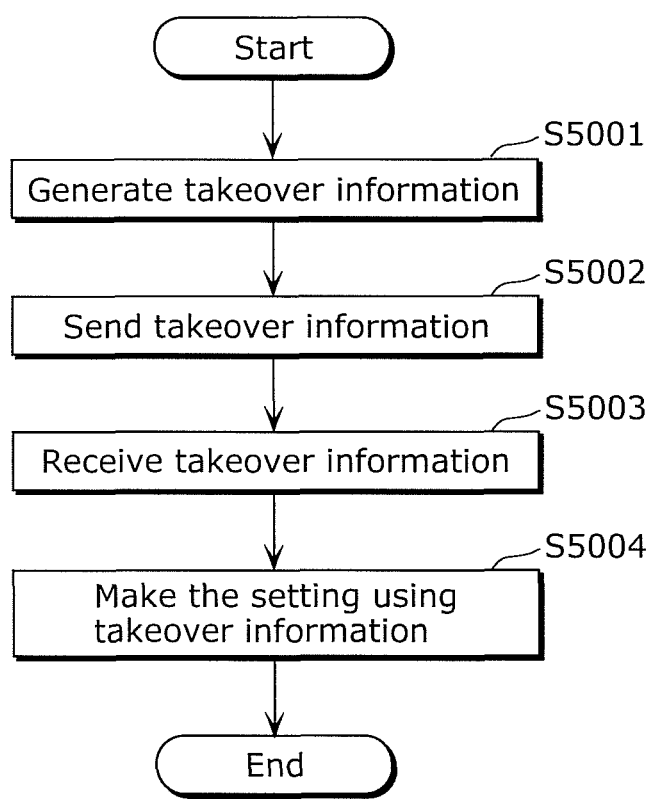
[FIG. 62]

FIG. 62 is a flowchart showing processing performed by the video conferencing system in the fifth embodiment.

Firstly, the takeover information generation unit 5109 generates the takeover information including the configuration information on the screen layout used in the video conference held between the first video conferencing apparatus 5100 and the second video conferencing apparatus 5200 (S5001).

Next, the sending unit 5111 sends the takeover information generated by the takeover information generation unit 5109 (S5002).

Then, the receiving unit 5312 receives the takeover information (S5003).

After the participation of the third video conferencing apparatus 5300 in the video conference is approved, the takeover setting unit 5324 sets the screen layout of the third video conferencing apparatus 5300 using the takeover information received by the receiving unit 5312 so that the third video conferencing apparatus 5300 takes over the screen layout and has the video conference with the second video conferencing apparatus 5200 (S5004).

Although the video conferencing system and the video conferencing apparatuses of the present invention have been described thus far based on the first to fifth embodiments, the present invention is not limited to these embodiments. Various modifications to the present embodiments that can be conceived by those skilled in the art, and modifications configured by arbitrarily combining the components in these embodiments are also included in the scope of the present invention. For example, a video conferencing apparatus which includes all the components provided in the video conferencing apparatuses is included in the scope of the present invention.

It should be noted that, as is the case with the video conferencing apparatuses shown in FIGS. 3, 4, 5, and 6, for example, the main components of the video conferencing apparatus may be implemented as an LSI which is an integrated circuit. Moreover, these main components may be realized as individual chips. Or, some or all of the main components may be realized as a single chip.

Although referred to as the LSI here, it may be referred to as an IC (Integrated Circuit), a system LSI, a super LSI, or an ultra LSI, depending on the scale of integration.

Moreover, a method for circuit integration is not limited to application of an LSI. It may be implemented using a dedicated circuit or a general purpose processor. An FPGA (Field Programmable Gate Array) which is programmable, or a reconfigurable processor for which the connections and settings of circuit cells inside the LSI are reconfigurable may be used.

Furthermore, when a circuit integration technology that replaces LSIs comes along owing to advances of the semiconductor technology or to a separate derivative technology, the components included in the video conferencing apparatuses should be understandably integrated using that technology.

Out of the components included in the video conferencing apparatuses, the unit which stores data may be configured as an independent component instead of being implemented as one chip.

It should be noted that the present invention can be realized not only as a video conferencing system and a video conferencing apparatus, but also as: a method which has, as steps, the processing units included in the video conferencing system and the video conferencing apparatus; a program which causes a computer to execute these steps; a recording medium, such as a computer-readable CD-ROM, having the program recorded thereon; and information, data, or a signal indicating the program. These program, information, data, and signal may be distributed via a communication network such as the Internet.

[Industrial Applicability]

The present invention can be applied to a video conferencing system and a video conferencing apparatus capable of being continuously used even when a user of the video conferencing system leaves for a different location.

REFERENCE SIGNS LIST

1100, 1200, 1300, 1400, 2100, 2200, 2300, 3100, 3200, 3300, 4100, 4200, 4300 Video conferencing apparatus
1101, 1201, 1301, 1401, 2101, 2201, 2301, 3101, 3201, 3301, 4101, 4201, 4301 Image input unit
1102, 1202, 1302, 1402, 2102, 2202, 2302, 3102, 3202, 3302, 4102, 4202, 4302 Audio input unit
1103, 1203, 1303, 1403, 2103, 2203, 2303, 3103, 3203, 3303, 4103, 4203, 4303 Coding control unit
1104, 1204, 1304, 1404, 2104, 2204, 2304, 3104, 3304, 4104, 4204, 4304 Image coding unit
1105, 1205, 1305, 1405, 2105, 2205, 2305, 3105, 3205, 3305, 4105, 4205, 4305 Audio coding unit
1106, 1206, 1306, 1406, 2106, 2206, 2306, 3106, 3206, 3306, 4106, 4206, 4306 Multiplexing unit
1107, 1207, 1307, 1407, 2107, 2207, 2307, 3107, 3207, 3307, 4107, 4207, 4307 Output packet storage unit
1108, 2108, 3308, 4108 Input unit
1109, 2109, 3109, 4109, 5109 Takeover information generation unit
1110, 1210, 2110, 2310, 3210, 4210 Server unit
1111, 1211, 1311, 1411, 2111, 2211, 2311, 3111, 3211, 4111, 4211, 4311 Network sending unit
1112, 1212, 1312, 1412, 2112, 2212, 2312, 3112, 3212, 4112, 4212, 4312 Network receiving unit
1113, 1213, 1313, 1413, 2113, 2213, 2313, 3113, 3213, 3313, 4113, 4213, 4313 Connected-site management unit
1114, 1214, 1314, 1414, 2114, 2214, 2314, 3114, 3214, 3314, 4114, 4214, 4314 Input packet storage unit
1115, 1215, 1315, 1415, 2115, 2215, 2315, 3115, 3215, 3315, 4115, 4215, 4315 Demultiplexing unit
1116, 1216, 1316, 1416, 2116, 2216, 2316, 3116, 3216, 3316, 4116, 4216, 4316 Image decoding unit
1117, 1217, 1317, 1417, 2117, 2217, 2317, 3117, 3217, 3317, 4117, 4217, 4317 Audio decoding unit
1118, 1218, 1318, 1418, 2118, 2218, 2318, 3118, 3218, 3318, 4118, 4218, 4318 Image output control unit
1119, 1219, 1319, 1419, 2119, 2219, 2319, 3119, 3219, 3319, 4119, 4219, 4319 Audio output control unit
1120, 1220, 1320, 1420, 2120, 2220, 2320, 3120, 3220, 3320, 4120, 4220, 4320 Image output unit
1121, 1221, 1321, 1421, 2121, 2221, 2321, 3121, 3221, 3321, 4121, 4221, 4321 Audio output unit
1122, 1322, 2122, 2322, 3122, 3322, 4122, 4322 Participation time measurement unit
1150, 1250, 1350, 1450, 2150, 2250, 2350, 3150, 3250, 3350, 4150, 4250, 4350 LSI
1223, 1423, 2223, 3223, 4223 Takeover-display setting unit
1225 Takeover information storage unit
1226, 1426 Authentication information input unit
1324, 2324, 3324, 4324, 5324 Takeover setting unit
2000 Memory card
2131 Validity period generation unit
2132, 2332 Memory card decoding unit
2133 Playback position holding unit
2234 Validity period measurement unit
2335 Playback position setting unit
3141, 3341 Radio sending unit
3142, 3342 Radio receiving unit
3243 First image coding unit
3244 Second image coding unit
3345 Takeover-request information generation unit
5100 First video conferencing apparatus
5111 Sending unit
5200 Second video conferencing apparatus
5300 Third video conferencing apparatus
5312 Receiving unit

The invention claimed is:

1. A video conferencing system comprising a first video conferencing apparatus, a second video conferencing apparatus, and a third video conferencing apparatus,
wherein said first video conferencing apparatus includes:
a takeover information generation unit configured to generate takeover information which (i) includes configuration information on a screen layout used in a video conference held between said first video conferencing apparatus and said second video conferencing apparatus, and (ii) is for having the video conference in place of said first video conferencing apparatus; and
a sending unit configured to send the takeover information generated by said takeover information generation unit of said first video conferencing apparatus, and
wherein said third video conferencing apparatus includes:
a receiving unit configured to receive the takeover information; and
a takeover setting unit configured to set a screen layout of said third video conferencing apparatus using the takeover information received by said receiving unit of said third video conferencing apparatus, so that said third video conferencing apparatus takes over the screen layout used in the video conference and has the video conference with said second video conferencing apparatus in place of said first video conferencing apparatus after participation of said third video conferencing apparatus in the video conference is approved.

2. The video conferencing system according to claim 1, wherein said takeover information generation unit of said first video conferencing apparatus is configured to generate the takeover information which includes information identifying said second video conferencing apparatus, and
wherein said takeover setting unit of said third video conferencing apparatus is further configured to set a connection destination of said third video conferencing apparatus using the takeover information, so that said third video conferencing apparatus has the video conference with said second video conferencing apparatus identified based on the takeover information.

3. The video conferencing system according to claim 1, wherein, when a physical screen characteristic of said third video conferencing apparatus is the same as that of said first video conferencing apparatus, said takeover setting unit of said third video conferencing apparatus is configured to set the screen layout of said third video conferencing apparatus using the takeover information.

4. The video conferencing system according to claim 1, wherein said second video conferencing apparatus further includes:
   a receiving unit configured to receive the takeover information;
   a takeover information storage unit configured to store the takeover information received by said receiving unit of said second video conferencing apparatus; and
   a sending unit configured to send the takeover information stored in said takeover information storage unit of said second video conferencing apparatus,
wherein said sending unit of said first video conferencing apparatus is configured to send the takeover information to said second video conferencing apparatus when said third video conferencing apparatus is incapable of receiving the takeover information, and
wherein said sending unit of said second video conferencing apparatus is configured to send the takeover information to said third video conferencing apparatus after said third video conferencing apparatus becomes capable of receiving the takeover information.

5. The video conferencing system according to claim 4, wherein, when a length of time from when said receiving unit of said second video conferencing apparatus receives the takeover information to when said third video conferencing apparatus becomes capable of receiving the takeover information is within a predetermined time limit, said sending unit of said second video conferencing apparatus is configured to send the takeover information to said third video conferencing apparatus, and
wherein when the length of time from when said receiving unit of said second video conferencing apparatus receives the takeover information to when said third video conferencing apparatus becomes capable of receiving the takeover information exceeds the predetermined time limit, said takeover information storage unit of said second video conferencing apparatus is configured to erase the takeover information.

6. The video conferencing system according to claim 1, wherein said sending unit of said first video conferencing apparatus is configured to send, to said second video conferencing apparatus, a connected-site change notice indicating a takeover from said first video conferencing apparatus to said third video conferencing apparatus,
wherein said third video conferencing apparatus further includes
   a sending unit configured to send a connection request to said second video conferencing apparatus after said receiving unit of said third video conferencing apparatus receives the takeover information, and
wherein said second video conferencing apparatus further includes:
   a receiving unit configured to receive the connected-site change notice and the connection request; and
   a server unit configured to approve the participation of said third video conferencing apparatus when said third video conferencing apparatus indicated as a taking-over apparatus in the connected-site change notice sent from said first video conferencing apparatus agrees with said third video conferencing apparatus from which the connection request is received.

7. The video conferencing system according to claim 6, wherein said server unit of said second video conferencing apparatus is configured to approve the participation of said third video conferencing apparatus when: said third video conferencing apparatus indicated as the taking-over apparatus in the connected-site change notice sent from said first video conferencing apparatus agrees with said third video conferencing apparatus from which the connection request is received; and a length of time from when the connected-site change notice is received to when the connection request is received is within a predetermined time limit.

8. The video conferencing system according to claim 1, wherein said first video conferencing apparatus further includes
   a server unit configured to operate as a server which authenticates participation in the video conference,
wherein said sending unit of said first video conferencing apparatus is configured to send, to said second video conferencing apparatus, information instructing said second video conferencing apparatus to operate as the server,
wherein said server unit of said first video conferencing apparatus is configured to stop operating as the server, and
wherein said second video conferencing apparatus further includes:
   a receiving unit configured to receive the information instructing said second video conferencing apparatus to operate as the server; and
   a server unit configured to start operating as the server when said receiving unit of said second video conferencing apparatus receives the information instructing said second video conferencing apparatus to operate as the server.

9. The video conferencing system according to claim 1, wherein said second video conferencing apparatus further includes:
   an image output unit configured to display an image captured by said third video conferencing apparatus;
   an authentication information input unit configured to receive information for authenticating the participation of said third video conferencing apparatus in the video conference, after the image captured by said third video conferencing apparatus is displayed; and
   a sending unit configured to send an image captured by said second video conferencing apparatus to said third video conferencing apparatus, after the information for authenticating the participation of said third video conferencing apparatus in the video conference is received by said authentication information input unit of said second video conferencing apparatus.

10. The video conferencing system according to claim 9, further comprising
a fourth video conferencing apparatus,
wherein said fourth video conferencing apparatus includes
a sending unit configured to send an image captured by said fourth video conferencing apparatus to said third video conferencing apparatus, after said second video conferencing apparatus approves the participation of said third video conferencing apparatus.

11. The video conferencing system according to claim 9, further comprising
a fourth video conferencing apparatus,
wherein said fourth video conferencing apparatus includes:
an image output unit configured to display an image captured by said third video conferencing apparatus;
an authentication information input unit configured to receive information for authenticating the participation of said third video conferencing apparatus in the video conference, after the image captured by said third video conferencing apparatus is displayed; and
a sending unit configured to send an image captured by said fourth video conferencing apparatus to said third video conferencing apparatus, after the information for authenticating the participation of said third video conferencing apparatus in the video conference is received by said authentication information input unit of said fourth video conferencing apparatus.

12. A video conferencing apparatus used as a first video conferencing apparatus in a video conferencing system which includes said first video conferencing apparatus and a second video conferencing apparatus, said first video conferencing apparatus comprising:
a takeover information generation unit configured to generate takeover information which (i) includes configuration information on a screen layout used in a video conference held between said first video conferencing apparatus and said second video conferencing apparatus, and (ii) is for having the video conference in place of said first video conferencing apparatus; and
a sending unit configured to send the takeover information generated by said takeover information generation unit of said first video conferencing apparatus.

13. A video conferencing apparatus used as a third video conferencing apparatus in a video conferencing system which includes a first video conferencing apparatus, a second video conferencing apparatus, and said third video conferencing apparatus, said third video conferencing apparatus comprising:
a receiving unit configured to receive takeover information which (i) includes configuration information on a screen layout used in a video conference held between said first video conferencing apparatus and said second video conferencing apparatus, and (ii) is for having the video conference in place of said first video conferencing apparatus; and
a takeover setting unit configured to set a screen layout of said third video conferencing apparatus using the takeover information received by said receiving unit of said third video conferencing apparatus, so that said third video conferencing apparatus takes over the screen layout used in the video conference and has the video conference with said second video conferencing apparatus in place of said first video conferencing apparatus after participation of said third video conferencing apparatus in the video conference is approved.

14. A video conferencing control method used by a video conferencing system which includes a first video conferencing apparatus, a second video conferencing apparatus, and a third video conferencing apparatus, said video conferencing control method comprising:
generating, by the first video conferencing apparatus, takeover information which (i) includes configuration information on a screen layout used in a video conference held between the first video conferencing apparatus and the second video conferencing apparatus, and (ii) is for having the video conference in place of the first video conferencing apparatus;
sending, by the first video conferencing apparatus, the takeover information generated in said generating;
receiving, by the third video conferencing apparatus, the takeover information; and
setting, by the third video conferencing apparatus, a screen layout of the third video conferencing apparatus using the takeover information received in said receiving, so that the third video conferencing apparatus takes over the screen layout used in the video conference and has the video conference with the second video conferencing apparatus in place of the first video conferencing apparatus after participation of the third video conferencing apparatus in the video conference is approved.

15. A video conferencing control method used by a video conferencing system which includes a first video conferencing apparatus and a second video conferencing apparatus, said video conferencing control method comprising:
generating, by the first video conferencing apparatus, takeover information which (i) includes configuration information on a screen layout used in a video conference held between the first video conferencing apparatus and the second video conferencing apparatus, and (ii) is for having the video conference in place of the first video conferencing apparatus; and
sending, by the first video conferencing apparatus, the takeover information generated in said generating.

16. A video conferencing control method used by a video conferencing system which includes a first video conferencing apparatus, a second video conferencing apparatus, and a third video conferencing apparatus, said video conferencing control method comprising:
receiving, by the third video conferencing apparatus, takeover information which (i) includes configuration information on a screen layout used in a video conference held between the first video conferencing apparatus and the second video conferencing apparatus, and (ii) is for having the video conference in place of the first video conferencing apparatus; and
setting, by the third video conferencing apparatus, a screen layout of the third video conferencing apparatus using the takeover information received in said receiving, so that the third video conferencing apparatus takes over the screen layout used in the video conference and has the video conference with the second video conferencing apparatus in place of the first video conferencing apparatus after participation of the third video conferencing apparatus in the video conference is approved.

17. A non-transitory computer-readable recording medium for use in a computer, the recording medium having a computer program recorded thereon for causing the computer to execute the video conferencing control method according to claim 15.

18. A non-transitory computer-readable recording medium for use in a computer, the recording medium having a computer program recorded thereon for causing the computer to execute the video conferencing control method according to claim 16.

* * * * *